(12) United States Patent
Mittapalli et al.

(10) Patent No.: US 12,503,969 B2
(45) Date of Patent: Dec. 23, 2025

(54) REDUCTANT DELIVERY SYSTEM FOR EXHAUST GAS AFTERTREATMENT SYSTEM

(71) Applicant: Cummins Emission Solutions Inc., Columbus, IN (US)

(72) Inventors: Mahendra Mittapalli, Pune (IN); Enoch Nanduru, Pune (IN); Samuel Johnson, East Wenatchee, WA (US); Ryan M. Johnson, Cottage Grove, WI (US); Kartiki Jagtap, Pune (IN); Vinay Kumar Joshi, Pune (IN); Aishwarya Pravin Joshi, Raleigh, NC (US)

(73) Assignee: Cummins Emission Solutions Inc., Columbus, IN (US)

( * ) Notice: Subject to any disclaimer, the term of this patent is extended or adjusted under 35 U.S.C. 154(b) by 228 days.

(21) Appl. No.: 17/782,085

(22) PCT Filed: Dec. 3, 2019

(86) PCT No.: PCT/US2019/064232
§ 371 (c)(1),
(2) Date: Jun. 2, 2022

(87) PCT Pub. No.: WO2021/112826
PCT Pub. Date: Jun. 10, 2021

(65) Prior Publication Data
US 2023/0003159 A1     Jan. 5, 2023

(51) Int. Cl.
*F01N 3/28*     (2006.01)
*F01N 3/20*     (2006.01)

(52) U.S. Cl.
CPC ......... *F01N 3/2892* (2013.01); *F01N 3/2073* (2013.01); *F01N 2240/20* (2013.01)

(58) Field of Classification Search
CPC ............ F01N 2240/20; F01N 2610/02; F01N 2610/1406; F01N 2610/1453; F01N 3/021;
(Continued)

(56) References Cited

U.S. PATENT DOCUMENTS

| 1,104,963 A | 7/1914 | Coanda |
| 3,699,407 A | 10/1972 | Gurtler et al. |

(Continued)

FOREIGN PATENT DOCUMENTS

| CN | 1864835 A | 11/2006 |
| CN | 101501308 A | 8/2009 |

(Continued)

OTHER PUBLICATIONS

International Search Report and written Opinion issued for PCT Application No. PCT/US2021/029282 issued Jul. 27, 2021.
(Continued)

*Primary Examiner* — Phutthiwat Wongwian
(74) *Attorney, Agent, or Firm* — Foley & Lardner LLP

(57) ABSTRACT

A reductant delivery system includes an inlet body, an outlet body, and an outer transfer tube. The inlet body includes an inlet body coupler, an inlet body outer transfer shell, and an inlet body inner shell. The inlet body coupler surrounds an inlet body inlet that is configured to receive exhaust gas. The inlet body outer transfer shell is coupled to the inlet body coupler. The inlet body outer transfer shell includes an inlet body outer transfer shell inner surface and an inlet body outer transfer shell outlet. The inlet body outer transfer shell outlet extends through the inlet body outer transfer shell inner surface. The inlet body inner shell includes an inlet body inner shell first flange, an inlet body inner shell second
(Continued)

flange, and an inlet body inner shell wall. The inlet body inner shell first flange is coupled to the inlet body outer transfer shell inner surface.

19 Claims, 36 Drawing Sheets

(58) Field of Classification Search
CPC .... F01N 3/2066; F01N 3/2073; F01N 3/2892; Y02T 10/12
See application file for complete search history.

(56) References Cited

U.S. PATENT DOCUMENTS

| | | | |
|---|---|---|---|
| 4,424,777 A | 1/1984 | Klomp |
| 6,444,177 B1 | 9/2002 | Muller et al. |
| 7,127,884 B2 | 10/2006 | Worner et al. |
| 7,581,387 B2 | 9/2009 | Bui et al. |
| 7,793,490 B2 | 9/2010 | Amon et al. |
| 7,836,688 B2 | 11/2010 | Woerner et al. |
| 7,866,143 B2 | 1/2011 | Buhmann et al. |
| 8,033,101 B2 | 10/2011 | Amon et al. |
| 8,230,678 B2 | 7/2012 | Aneja et al. |
| 8,375,708 B2 | 2/2013 | Forster et al. |
| 8,460,610 B2 | 6/2013 | Silver et al. |
| 8,607,555 B2 | 12/2013 | Kaiser et al. |
| 8,615,984 B2 | 12/2013 | Kornherr et al. |
| 8,695,330 B2 | 4/2014 | Davidson et al. |
| 8,776,509 B2 | 7/2014 | Wikaryasz et al. |
| 8,789,363 B2 | 7/2014 | Iverson et al. |
| 9,021,794 B2 | 5/2015 | Goss et al. |
| 9,133,744 B2 | 9/2015 | Birkby et al. |
| 9,248,404 B2 | 2/2016 | Brunel et al. |
| 9,266,075 B2 | 2/2016 | Chapman et al. |
| 9,267,417 B2 | 2/2016 | Baldwin et al. |
| D757,919 S | 5/2016 | Kimura |
| 9,328,640 B2 | 5/2016 | Iverson et al. |
| 9,346,017 B2 | 5/2016 | Greber |
| 9,352,276 B2 | 5/2016 | Sampath |
| 9,453,444 B2 | 9/2016 | Fischer et al. |
| 9,464,546 B2 | 10/2016 | Perrot et al. |
| 9,504,960 B2 | 11/2016 | Park |
| 9,581,067 B2 | 2/2017 | Guilbaud et al. |
| D781,071 S | 3/2017 | Callif et al. |
| 9,605,573 B2 | 3/2017 | Solbrig et al. |
| 9,644,516 B1 | 5/2017 | Chiruta et al. |
| 9,664,081 B2 | 5/2017 | Rusch et al. |
| 9,714,598 B2 | 7/2017 | Alano et al. |
| D794,100 S | 8/2017 | Mcdonald et al. |
| 9,726,064 B2 | 8/2017 | Alano |
| 9,737,908 B2 | 8/2017 | Hornback et al. |
| 9,776,135 B2 | 10/2017 | Boeshans et al. |
| D809,577 S | 2/2018 | Mcdonald et al. |
| D816,010 S | 4/2018 | Rike |
| 9,995,193 B2 | 6/2018 | Alano et al. |
| 10,024,217 B1 | 7/2018 | Johnson et al. |
| 10,030,564 B2 | 7/2018 | Cossard et al. |
| 10,174,658 B2 | 1/2019 | Dimpelfeld et al. |
| 10,190,465 B2 | 1/2019 | Alano et al. |
| D840,908 S | 2/2019 | Rike |
| 10,215,075 B2 | 2/2019 | Chapman et al. |
| 10,247,081 B2 | 4/2019 | Niaz |
| 10,273,853 B2 | 4/2019 | Golin |
| 10,273,854 B1 | 4/2019 | Abbassi et al. |
| D849,662 S | 5/2019 | Rike |
| 10,287,948 B1 | 5/2019 | Moulieres et al. |
| 10,287,954 B2 | 5/2019 | Chapman et al. |
| 10,294,843 B2 | 5/2019 | Alano et al. |
| 10,316,721 B1 | 6/2019 | Moulieres et al. |
| D855,090 S | 7/2019 | Mcdonald et al. |
| 10,337,379 B2 | 7/2019 | Dimpelfeld et al. |
| 10,337,380 B2 | 7/2019 | Willats et al. |
| 10,422,268 B2 | 9/2019 | Niaz |
| 10,533,478 B2 | 1/2020 | Alano |
| 10,577,995 B2 | 3/2020 | Ker et al. |
| 10,612,443 B2 | 4/2020 | Li et al. |
| 10,632,430 B1 | 4/2020 | Liu et al. |
| 10,731,536 B1 | 8/2020 | Chenoweth et al. |
| 10,787,946 B2 | 9/2020 | Rohde et al. |
| 10,808,587 B2 | 10/2020 | Ottaviani et al. |
| 10,823,032 B2 | 11/2020 | Willats et al. |
| 10,907,522 B2 | 2/2021 | Poinsot et al. |
| 10,914,218 B1 | 2/2021 | Chapman et al. |
| 10,920,635 B2 | 2/2021 | Kozakiewicz |
| 10,920,642 B2 | 2/2021 | Wang et al. |
| 10,933,387 B2 | 3/2021 | Cvelbar |
| 10,967,329 B2 | 4/2021 | Alano et al. |
| 11,085,346 B2 | 8/2021 | Tucker et al. |
| 11,105,241 B2 | 8/2021 | Tucker et al. |
| 11,143,084 B2 | 10/2021 | Wahlstrom |
| 11,193,412 B2 | 12/2021 | Cvelbar et al. |
| 11,230,958 B2 | 1/2022 | Tucker et al. |
| 11,242,788 B2 | 2/2022 | Kinnaird |
| 11,242,790 B2 | 2/2022 | Chapman et al. |
| 11,268,424 B2 | 3/2022 | Kimura et al. |
| 11,300,028 B2 | 4/2022 | Meunier |
| 11,313,266 B2 | 4/2022 | Tucker et al. |
| 11,428,140 B1 | 8/2022 | Kinnaird et al. |
| 11,459,927 B2 | 10/2022 | Rajashekharaiah et al. |
| 11,459,929 B2 | 10/2022 | Dimpelfeld et al. |
| 11,506,101 B2 | 11/2022 | Levato et al. |
| 11,591,943 B2 | 2/2023 | Hornback |
| 11,746,684 B2 | 9/2023 | Wahlstrom |
| 11,761,365 B2 | 9/2023 | Liu et al. |
| 12,173,632 B2 | 12/2024 | Johnson et al. |
| 2002/0023435 A1 | 2/2002 | Woerner et al. |
| 2004/0112883 A1 | 6/2004 | Bowden et al. |
| 2004/0237511 A1 | 12/2004 | Ripper et al. |
| 2005/0172615 A1 | 8/2005 | Mahr |
| 2005/0262843 A1 | 12/2005 | Monty |
| 2006/0150614 A1 | 7/2006 | Cummings |
| 2006/0153748 A1 | 7/2006 | Huthwohl et al. |
| 2006/0191254 A1 | 8/2006 | Bui et al. |
| 2006/0260104 A1 | 11/2006 | Himi |
| 2006/0266022 A1 | 11/2006 | Woerner et al. |
| 2006/0283181 A1 | 12/2006 | Crawley et al. |
| 2007/0144126 A1 | 6/2007 | Ohya et al. |
| 2007/0163241 A1 | 7/2007 | Meingast et al. |
| 2007/0245718 A1 | 10/2007 | Cheng et al. |
| 2007/0283683 A1 | 12/2007 | Bellinger |
| 2007/0289294 A1 | 12/2007 | Werni et al. |
| 2008/0087013 A1 | 4/2008 | Crawley et al. |
| 2008/0121179 A1 | 5/2008 | Park et al. |
| 2008/0127635 A1 | 6/2008 | Hirata et al. |
| 2008/0314033 A1 | 12/2008 | Aneja et al. |
| 2009/0000283 A1 | 1/2009 | Endicott et al. |
| 2009/0019843 A1 | 1/2009 | Levin et al. |
| 2009/0031717 A1 | 2/2009 | Blaisdell |
| 2009/0049829 A1 | 2/2009 | Kaiser et al. |
| 2009/0084094 A1 | 4/2009 | Goss et al. |
| 2009/0145119 A1 | 6/2009 | Farrell et al. |
| 2009/0158717 A1 | 6/2009 | Kimura et al. |
| 2009/0158721 A1 | 6/2009 | Wieland et al. |
| 2009/0158722 A1 | 6/2009 | Kojima et al. |
| 2009/0180937 A1 | 7/2009 | Nohl et al. |
| 2009/0229254 A1 | 9/2009 | Gibson |
| 2009/0272106 A1 | 11/2009 | Werni et al. |
| 2010/0083641 A1 | 4/2010 | Makartchouk et al. |
| 2010/0146942 A1 | 6/2010 | Mayr et al. |
| 2010/0146948 A1 | 6/2010 | Dacosta et al. |
| 2010/0187383 A1 | 7/2010 | Olsen et al. |
| 2010/0251719 A1 | 10/2010 | Mancini et al. |
| 2010/0319329 A1 | 12/2010 | Khadiya |
| 2011/0005232 A1 | 1/2011 | Williams et al. |
| 2011/0079003 A1 | 4/2011 | Sun et al. |
| 2011/0094206 A1 | 4/2011 | Liu et al. |
| 2011/0099078 A1 | 5/2011 | Davidson et al. |
| 2011/0146237 A1 | 6/2011 | Adelmann et al. |
| 2011/0146253 A1 | 6/2011 | Isada et al. |
| 2011/0194987 A1 | 8/2011 | Hodgson et al. |
| 2012/0003955 A1 | 1/2012 | Gabriel |
| 2012/0124983 A1 | 5/2012 | Hong |
| 2012/0204541 A1 | 8/2012 | Li et al. |
| 2012/0204542 A1 | 8/2012 | Norris et al. |

(56) References Cited

U.S. PATENT DOCUMENTS

| | | |
|---|---|---|
| 2012/0204544 A1 | 8/2012 | Uhrich et al. |
| 2012/0216513 A1 | 8/2012 | Greber et al. |
| 2013/0067891 A1 | 3/2013 | Hittle et al. |
| 2013/0097819 A1 | 4/2013 | Kojima |
| 2013/0213013 A1 | 8/2013 | Mitchell et al. |
| 2013/0333363 A1 | 12/2013 | Joshi et al. |
| 2014/0033686 A1 | 2/2014 | Fischer et al. |
| 2014/0193318 A1 | 7/2014 | Davidson et al. |
| 2014/0230418 A1 | 8/2014 | Perrot et al. |
| 2014/0260209 A1 | 9/2014 | Goss et al. |
| 2014/0325967 A1 | 11/2014 | Kimura |
| 2014/0373721 A1 | 12/2014 | Sandou et al. |
| 2015/0000389 A1 | 1/2015 | Runde et al. |
| 2015/0016214 A1 | 1/2015 | Mueller |
| 2015/0089923 A1 | 4/2015 | Henderson et al. |
| 2015/0110681 A1 | 4/2015 | Ferront et al. |
| 2015/0121855 A1 | 5/2015 | Munnannur et al. |
| 2015/0204227 A1 | 7/2015 | Eager |
| 2015/0218996 A1 | 8/2015 | Brandl et al. |
| 2015/0224870 A1 | 8/2015 | Shin et al. |
| 2015/0233276 A1 | 8/2015 | Cassity et al. |
| 2015/0360176 A1 | 12/2015 | Bui et al. |
| 2016/0061090 A1 | 3/2016 | Anand et al. |
| 2016/0069239 A1 | 3/2016 | Freeman et al. |
| 2016/0083060 A1 | 3/2016 | Kassianoff |
| 2016/0090887 A1 | 3/2016 | Mitchell et al. |
| 2016/0115847 A1 | 4/2016 | Chapman et al. |
| 2016/0138454 A1 | 5/2016 | Alano et al. |
| 2016/0158714 A1 | 6/2016 | Li et al. |
| 2016/0175784 A1 | 6/2016 | Harmon et al. |
| 2016/0194991 A1 | 7/2016 | Clayton et al. |
| 2016/0243510 A1 | 8/2016 | Denton et al. |
| 2016/0251990 A1 | 9/2016 | Dimpelfeld et al. |
| 2016/0326931 A1 | 11/2016 | Freeman et al. |
| 2016/0332126 A1 | 11/2016 | Nande et al. |
| 2016/0361694 A1 | 12/2016 | Brandl et al. |
| 2016/0376969 A1 | 12/2016 | Zhang et al. |
| 2017/0067387 A1 | 3/2017 | Khaled |
| 2017/0089246 A1 | 3/2017 | Greber et al. |
| 2017/0107882 A1 | 4/2017 | Chiruta et al. |
| 2017/0152778 A1 | 6/2017 | Li et al. |
| 2017/0327273 A1 | 11/2017 | Lee et al. |
| 2017/0361273 A1 | 12/2017 | Zoran et al. |
| 2017/0370262 A1 | 12/2017 | Zoran et al. |
| 2018/0078912 A1 | 3/2018 | Yadav et al. |
| 2018/0087428 A1 | 3/2018 | Barr |
| 2018/0142604 A1 | 5/2018 | Niaz |
| 2018/0266300 A1 | 9/2018 | Liu et al. |
| 2018/0306083 A1 | 10/2018 | Sampath et al. |
| 2018/0313247 A1 | 11/2018 | Bauknecht et al. |
| 2019/0063294 A1 | 2/2019 | Johnson et al. |
| 2019/0107025 A1 | 4/2019 | Brinkmeyer |
| 2019/0323397 A1 | 10/2019 | Pill et al. |
| 2020/0102873 A1 | 4/2020 | Ramolivo et al. |
| 2020/0123955 A1 | 4/2020 | Liu et al. |
| 2020/0325811 A1 | 10/2020 | Levin et al. |
| 2020/0332696 A1 | 10/2020 | Chapman et al. |
| 2021/0039056 A1 | 2/2021 | De Rudder et al. |
| 2021/0095587 A1 | 4/2021 | Cvelbar et al. |
| 2021/0199039 A1 | 7/2021 | Panunzio et al. |
| 2021/0301704 A1 | 9/2021 | Hornback |
| 2021/0301710 A1 | 9/2021 | Cvelbar et al. |
| 2021/0363907 A1 | 11/2021 | Poinsot et al. |
| 2021/0404367 A1 | 12/2021 | Alano et al. |
| 2022/0065148 A1 | 3/2022 | Sudries et al. |
| 2022/0090532 A1 | 3/2022 | Degner et al. |
| 2022/0099121 A1 | 3/2022 | Kumar |
| 2022/0162975 A1 | 5/2022 | Cvelbar et al. |
| 2022/0162976 A1 | 5/2022 | Alano et al. |
| 2022/0178296 A1 | 6/2022 | Hogan |
| 2022/0184567 A1 | 6/2022 | Geant |
| 2022/0316382 A1 | 10/2022 | De Rudder |
| 2022/0349330 A1 | 11/2022 | Chapman et al. |
| 2022/0379272 A1 | 12/2022 | Alano |
| 2023/0003159 A1 | 1/2023 | Mittapalli et al. |
| 2023/0141549 A1 | 5/2023 | Kalyanshetti |

FOREIGN PATENT DOCUMENTS

| | | |
|---|---|---|
| CN | 101815851 A | 8/2010 |
| CN | 102242662 A | 11/2011 |
| CN | 103429864 A | 12/2013 |
| CN | 105143628 | 12/2015 |
| CN | 105612325 A | 5/2016 |
| CN | 205559030 U | 9/2016 |
| CN | 106321199 A | 1/2017 |
| CN | 106377919 | 2/2017 |
| CN | 206144632 U | 5/2017 |
| CN | 206144633 U | 5/2017 |
| CN | 106968765 | 7/2017 |
| CN | 107435576 A | 12/2017 |
| CN | 108194176 A | 6/2018 |
| CN | 108252771 A | 7/2018 |
| CN | 108708781 | 10/2018 |
| CN | 209179849 U | 1/2019 |
| CN | 109477413 A | 3/2019 |
| CN | 208982145 U | 6/2019 |
| CN | 106014560 B | 7/2019 |
| CN | 209586479 U | 11/2019 |
| CN | 209855888 U | 12/2019 |
| CN | 110761876 A | 2/2020 |
| CN | 210195855 U | 3/2020 |
| CN | 210686097 U | 6/2020 |
| CN | 210858906 U | 6/2020 |
| CN | 211082028 U | 7/2020 |
| CN | 211116205 U | 7/2020 |
| CN | 211573625 U | 9/2020 |
| CN | 111810276 | 10/2020 |
| CN | 212130586 U | 12/2020 |
| CN | 212130587 U | 12/2020 |
| CN | 212296579 U | 1/2021 |
| CN | 112483224 A | 3/2021 |
| CN | 212744129 U | 3/2021 |
| CN | 214304014 U | 9/2021 |
| CN | 214836650 U | 11/2021 |
| CN | 214887318 U | 11/2021 |
| CN | 215109110 U | 12/2021 |
| CN | 215719044 U | 2/2022 |
| CN | 215719045 U | 2/2022 |
| CN | 216157745 U | 4/2022 |
| CN | 216617626 U | 5/2022 |
| CN | 217872989 U | 11/2022 |
| DE | 10021166 A1 | 11/2001 |
| DE | 10312212 | 11/2003 |
| DE | 10245297 B3 | 1/2004 |
| DE | 10 2004 043 931 | 3/2006 |
| DE | 10 2010 014 037 A1 | 11/2010 |
| DE | 11 2009 000 650 T5 | 1/2011 |
| DE | 11 2010 002 589 T5 | 11/2012 |
| DE | 10 2014 101 889 | 8/2015 |
| DE | 10 2014 102 798 A1 | 9/2015 |
| DE | 10 2016 208 814 A1 | 12/2016 |
| DE | 10 2016 222 743 A1 | 5/2017 |
| DE | 10 2016 115 030 A1 | 2/2018 |
| DE | 10 2018 127 387 A1 | 5/2019 |
| DE | 10 2007 051 510 B4 | 2/2021 |
| EP | 0 716 918 A2 | 6/1996 |
| EP | 0 757 163 A1 | 2/1997 |
| EP | 1 716 917 A1 | 11/2006 |
| EP | 2 151 560 | 2/2010 |
| EP | 2 769 762 A1 | 8/2014 |
| EP | 2 551 482 B1 | 1/2015 |
| EP | 2 546 488 B1 | 4/2015 |
| EP | 2 551 481 B1 | 8/2015 |
| EP | 3 085 913 A1 | 10/2016 |
| EP | 3 085 915 A1 | 10/2016 |
| EP | 3 085 916 A1 | 10/2016 |
| EP | 3 102 802 A1 | 12/2016 |
| EP | 2 570 178 B1 | 4/2017 |
| EP | 2 522 822 B1 | 6/2017 |
| EP | 2 796 684 B1 | 1/2018 |
| EP | 3 425 180 A1 | 1/2019 |

(56) References Cited

FOREIGN PATENT DOCUMENTS

| | | |
|---|---|---|
| EP | 3 699 407 A1 | 8/2020 |
| EP | 3 775 514 A1 | 2/2021 |
| FR | 2965011 A1 | 3/2012 |
| FR | 3010134 A1 | 3/2015 |
| FR | 2984953 B1 | 4/2015 |
| FR | 2977913 B1 | 6/2015 |
| FR | 3020835 A1 | 11/2015 |
| FR | 3020834 B1 | 6/2016 |
| FR | 3020835 B1 | 6/2016 |
| FR | 3098854 B1 | 7/2021 |
| FR | 3097775 B1 | 5/2022 |
| FR | 3102683 B1 | 6/2022 |
| FR | 3111664 B1 | 7/2022 |
| FR | 3110634 B1 | 9/2022 |
| GB | 2 385 545 A | 8/2003 |
| GB | 2 558 311 A | 7/2018 |
| IN | 201921025624 A | 1/2021 |
| JP | 2003-056274 | 2/2003 |
| JP | 2009-156077 A | 7/2009 |
| JP | 2010-180863 A | 8/2010 |
| JP | 2013-133774 A | 7/2013 |
| WO | WO-2009/024815 A1 | 2/2009 |
| WO | WO-2009/024815 A2 | 2/2009 |
| WO | WO-2010/146285 A1 | 12/2010 |
| WO | WO-2011/110885 A1 | 9/2011 |
| WO | WO-2012/110720 A1 | 8/2012 |
| WO | WO-2012/123660 A1 | 9/2012 |
| WO | WO-2015/119617 A1 | 8/2015 |
| WO | WO-2016/082850 A1 | 6/2016 |
| WO | WO-2016/111701 A1 | 7/2016 |
| WO | WO-2018/017164 A1 | 1/2018 |
| WO | WO-2018/075061 A1 | 4/2018 |
| WO | WO-2018/226626 A1 | 12/2018 |
| WO | WO-2019/029880 A1 | 2/2019 |
| WO | WO-2019143373 A1 * | 7/2019 |
| WO | WO-2020/009713 A1 | 1/2020 |
| WO | WO-2021/050819 A1 | 3/2021 |
| WO | WO-2021/112826 A1 | 6/2021 |
| WO | WO-2021/113246 A1 | 6/2021 |
| WO | WO-2021/173357 A1 | 9/2021 |
| WO | WO-2021/225824 A1 | 11/2021 |

OTHER PUBLICATIONS

Coanda effect, https://en.wikipedia.org/w/index.php?title=Coand%C4%83_effect&oldid=1000333406 (last visited Mar. 12, 2021).
Combined Search and Examination Report in UK Patent Application No. GB2205057.9, issued May 5, 2022.
Examination Report in U.K. Patent Application No. 1413056.1 issued Nov. 21, 2017.
Examination Report in UK Patent Application No. GB 1917608.0 issued Sep. 6, 2021.
Final Office Action in U.S. Appl. No. 17/695,580 issued Feb. 6, 2023.
First Examination Report in Indian Patent Application No. 201947050068, issued Jan. 13, 2021.
First Examination Report in Indian Patent Application No. 202147057999, issued Mar. 14, 2022.
First Office Action in Chinese Patent Application No. 201880001223.6, issued Dec. 17, 2020.
G. Comes, "Theoretical Modeling, Design and Simulation of an Innovative Diverting Valve Based on Coanda Effect", Fluids 2018, 3, 103, (2018).
International Search Report & Written Opinion in PCT Application No. PCT/US2012/022582 issued Oct. 25, 2012.
International Search Report and Written Opinion in PCT Application No. PCT/IB2019/054988 issued Jan. 29, 2020.
International Search Report and Written Opinion in PCT Application No. PCT/US2021/017551 issued Apr. 28, 2021.
International Search Report and Written Opinion in PCT Application No. PCT/US2022/014781 issued Apr. 25, 2022.
International Search Report and Written Opinion in PCT Application No. PCT/US2018/035959, issued Oct. 19, 2018.
Non-Final Office Action in U.S. Appl. No. 15/657,941 issued Aug. 6, 2019.
Non-Final Office Action in U.S. Appl. No. 16/618,716 issued Feb. 23, 2021.
Non-Final Office Action in U.S. Appl. No. 17/400,567 issued May 23, 2022.
Non-Final Office Action in U.S. Appl. No. 17/695,580 issued Jul. 27, 2022.
Non-Final Office Action in U.S. Appl. No. 17/923,804 issued Mar. 16, 2023.
Office Action in German Patent Application No. DE 11 2012 005 741.4 issued Dec. 7, 2022, included translation.
Preliminary Office Action in Brazilian Patent Application No. BR1120190253246, issued Apr. 26, 2022 (4 pages).
Search and Examination Report in UK Patent Application No. GB2116026.2 issued Dec. 20, 2021.
Search Report in UK Patent Application No. GB 2101393.3, issued Feb. 22, 2021 . . . .
Search Report Letter in UK Patent Application No. GB 2101393.3, issued Feb. 22, 2021.
US Office Action in U.S. Appl. No. 14/372,810 issued Mar. 8, 2017.
Office Action in U.S. Appl. No. 14/372,810 issued May 25, 2016.
Final US Office Action issued for U.S. Appl. No. 13/837,446 issued Jan. 5, 2015, 25 pages.
Foreign Office Action on DE 102014002750.3, DTD Jan. 24, 2022.
International Search Report and Written Opinion issued in PCT Patent Application No. PCT/US2020/062718, issued Feb. 19, 2021.
International Search Report and Written Opinion issued in PCT Application No. PCT/US2021/056073, issued Jan. 26, 2022.
International Search Report and Written Opinion issued in PCT Application No. PCT/US2019/064232 issued Feb. 12, 2020.
Office Action issue in U.S. Appl. No. 13/837,446, issued Aug. 29, 2014.
Non-Final Office Action in U.S. Appl. No. 29/835,755 issued Oct. 4, 2023.
Non-Final Office Action issued Oct. 4, 2023 in U.S. Appl. No. 29/835,777.
Office Action issued Sep. 13, 2023 in Chinese Patent Application No. 202180064965.5.
European Search Report in European Patent Application No. 20897056.6 issued Feb. 27, 2024.
International search report and written opinion for PCT Application No. PCT/US 2020/050318 isseud Dec. 8, 2020.
Final Office Action issued in U.S. Appl. No. 13/837,446 issued Jan. 5, 2015.
First Examination Report in IN 202247030005, DTD Jul. 13, 2022.
First Examination Report in IN 202247032735, DTD Jul. 22, 2022.
Office Action issued in German Patent Application No. DE 102014002750.3, issued Jan. 24, 2022, 5 pages.
International Search Report and Written Opinion in International Patent Application No. PCT/US2020/062718 Dtd Feb. 19, 2021.
International Search Report and Written Opinion issued in PCT Application No. PCT/US2021/029282 issued Jul. 27, 2021.
Search Report and Written Opinion issued in PCT Application No. PCT/US2019/064232 issued Feb. 12, 2020.
US Office Action issue in U.S. Appl. No. 13/837,446 issued Aug. 29, 2014.
Examination Report in UK Patent Application No. GB2305850.6 issued May 26, 2023.
Office Action in Chinese Patent Application No. 2021800162220 issued Mar. 17, 2023.
Office Action in Chinese Patent Application No. 202210283795.6, dated Mar. 20, 2023.
Extended European Search Report in European Patent Application No. 19955166.4 dated Jul. 10, 2023.
Office Action in U.S. Appl. No. 18/033,021 issued Jul. 18, 2023.
Office Action in U.S. Appl. No. 18/945,215, issued Apr. 23, 2025.
Office Action in German Patent Application No. 11 2022 004 119.6 issued Aug. 7, 2024.
Office Action in U.S. Appl. No. 18/381,116 issued Mar. 28, 2024.

* cited by examiner

REDUCTANT DELIVERY SYSTEM FOR EXHAUST GAS AFTERTREATMENT SYSTEM

CROSS-REFERENCE TO RELATED APPLICATION

This application is a National Stage of PCT Application No. PCT/US2019/064232, filed Dec. 3, 2019, the contents of which are hereby incorporated by reference in their entirety.

TECHNICAL FIELD

The present application relates generally to a reductant delivery system for an exhaust gas aftertreatment system for an internal combustion engine.

BACKGROUND

For internal combustion engines, such as diesel engines, nitrogen oxide ($NO_x$) compounds may be emitted in exhaust gas. It may be desirable to reduce $NO_x$ emissions to comply with environmental regulations, for example. To reduce $NO_x$ emissions, a reductant may be dosed into the exhaust by a dosing system and within an exhaust gas aftertreatment system. The reductant facilitates conversion of a portion of the exhaust gas into non-$NO_x$ emissions, such as nitrogen ($N_2$), carbon dioxide ($CO_2$), and water ($H_2O$), thereby reducing $NO_x$ emissions.

SUMMARY

In one embodiment, a reductant delivery system includes an inlet body, an outlet body, and an outer transfer tube. The inlet body includes an inlet body coupler, an inlet body outer transfer shell, and an inlet body inner shell. The inlet body coupler surrounds an inlet body inlet that is configured to receive exhaust gas. The inlet body outer transfer shell is coupled to the inlet body coupler. The inlet body outer transfer shell includes an inlet body outer transfer shell inner surface and an inlet body outer transfer shell outlet. The inlet body outer transfer shell outlet extends through the inlet body outer transfer shell inner surface. The inlet body inner shell includes an inlet body inner shell first flange, an inlet body inner shell second flange, and an inlet body inner shell wall. The inlet body inner shell first flange is coupled to the inlet body outer transfer shell inner surface. The inlet body inner shell second flange is coupled to the inlet body outer transfer shell inner surface. The inlet body inner shell wall is contiguous with the inlet body inner shell first flange and the inlet body inner shell second flange, and separated from the inlet body outer transfer shell inner surface. The outlet body includes an outlet body coupler and an outlet body shell. The outlet body coupler surrounds an outlet body outlet that is configured to provide the exhaust gas. The outlet body shell is coupled to the outlet body coupler. The outlet body shell includes an outlet body shell inlet. The outer transfer tube is coupled to the inlet body outer transfer shell around the inlet body outer transfer shell outlet and coupled to the outlet body shell around the outlet body shell inlet.

In another embodiment, a reductant delivery system includes an inlet body and an injection mount. The inlet body includes an inlet body coupler, an inlet body outer transfer shell, an inlet body inner shell, and an inlet body outer mounting shell. The inlet body coupler surrounds an inlet body inlet that is configured to receive exhaust gas. The inlet body outer transfer shell is coupled to the inlet body coupler. The inlet body outer transfer shell includes an inlet body outer transfer shell inner surface and an inlet body outer transfer shell outlet. The inlet body outer transfer shell outlet extends through the inlet body outer transfer shell inner surface. The inlet body inner shell includes an inlet body inner shell first flange, an inlet body inner shell second flange, and an inlet body inner shell wall. The inlet body inner shell first flange is coupled to the inlet body outer transfer shell inner surface. The inlet body inner shell second flange is coupled to the inlet body outer transfer shell inner surface. The inlet body inner shell wall is contiguous with the inlet body inner shell first flange and the inlet body inner shell second flange, and separated from the inlet body outer transfer shell inner surface. The inlet body outer mounting shell is coupled to the inlet body coupler and the inlet body outer transfer shell. The inlet body outer mounting shell includes an inlet body outer mounting shell inner surface, an inlet body outer mounting shell dividing surface, an inlet body outer mounting shell projecting surface, an inlet body outer mounting shell outer mounting surface, and an injection aperture. The inlet body outer mounting shell dividing surface is contiguous with the inlet body outer mounting shell inner surface and extends from the inlet body outer mounting shell inner surface towards the inlet body inner shell. The inlet body outer mounting shell projecting surface is contiguous with the inlet body outer mounting shell dividing surface and the inlet body outer mounting shell inner surface. The inlet body outer mounting shell outer mounting surface is opposite the inlet body outer mounting shell projecting surface. The injection aperture is disposed in the inlet body outer mounting shell projecting surface and the inlet body outer mounting shell outer mounting surface and extends through the inlet body outer mounting shell and the inlet body outer mounting shell outer mounting surface. The injection mount is coupled to the inlet body outer mounting shell outer mounting surface around the injection aperture and configured to be coupled to a dosing module.

In yet another embodiment, a reductant delivery system includes an inlet body, an outlet body, and an injection mount. The inlet body includes an inlet body coupler, an inlet body outer transfer shell, an inlet body outer mounting shell, and an inlet body outer mounting shell. The inlet body coupler surrounds an inlet body inlet that is configured to receive exhaust gas and that is defined by an inlet body inlet center point. The inlet body outer transfer shell is coupled to the inlet body coupler. The inlet body outer transfer shell includes an inlet body outer transfer shell inner surface and an inlet body outer transfer shell outlet. The inlet body outer transfer shell outlet extends through the inlet body outer transfer shell inner surface. The inlet body outer mounting shell is coupled to the inlet body coupler and the inlet body outer transfer shell. The inlet body outer mounting shell includes an inlet body outer mounting shell inner surface and an inlet body outer mounting shell dividing surface. The inlet body outer mounting shell dividing surface is contiguous with the inlet body outer mounting shell inner surface and extends from the inlet body outer mounting shell inner surface towards the inlet body inlet center point. The inlet body outer mounting shell projecting surface is contiguous with the inlet body outer mounting shell dividing surface and the inlet body outer mounting shell inner surface. The inlet body outer mounting shell outer mounting surface is opposite the inlet body outer mounting shell projecting surface. The injection aperture is disposed in the inlet body outer mounting shell projecting surface and the inlet body outer mounting shell outer mounting surface and extends through the inlet body outer mounting shell and the inlet body outer mounting shell outer mounting surface. The outlet body includes an outlet body coupler and an outlet body shell. The outlet body coupler surrounds an outlet body outlet that is configured to provide the exhaust gas. The outlet body shell is coupled to the outlet body coupler. The outlet body shell includes an outlet body shell inlet. The outer transfer tube is coupled to the inlet body outer transfer shell around the inlet body outer transfer shell outlet and coupled to the outlet body shell around the outlet body shell inlet. The injection mount is coupled to the inlet body outer mounting shell outer mounting surface around the injection aperture and configured to be coupled to a dosing module.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
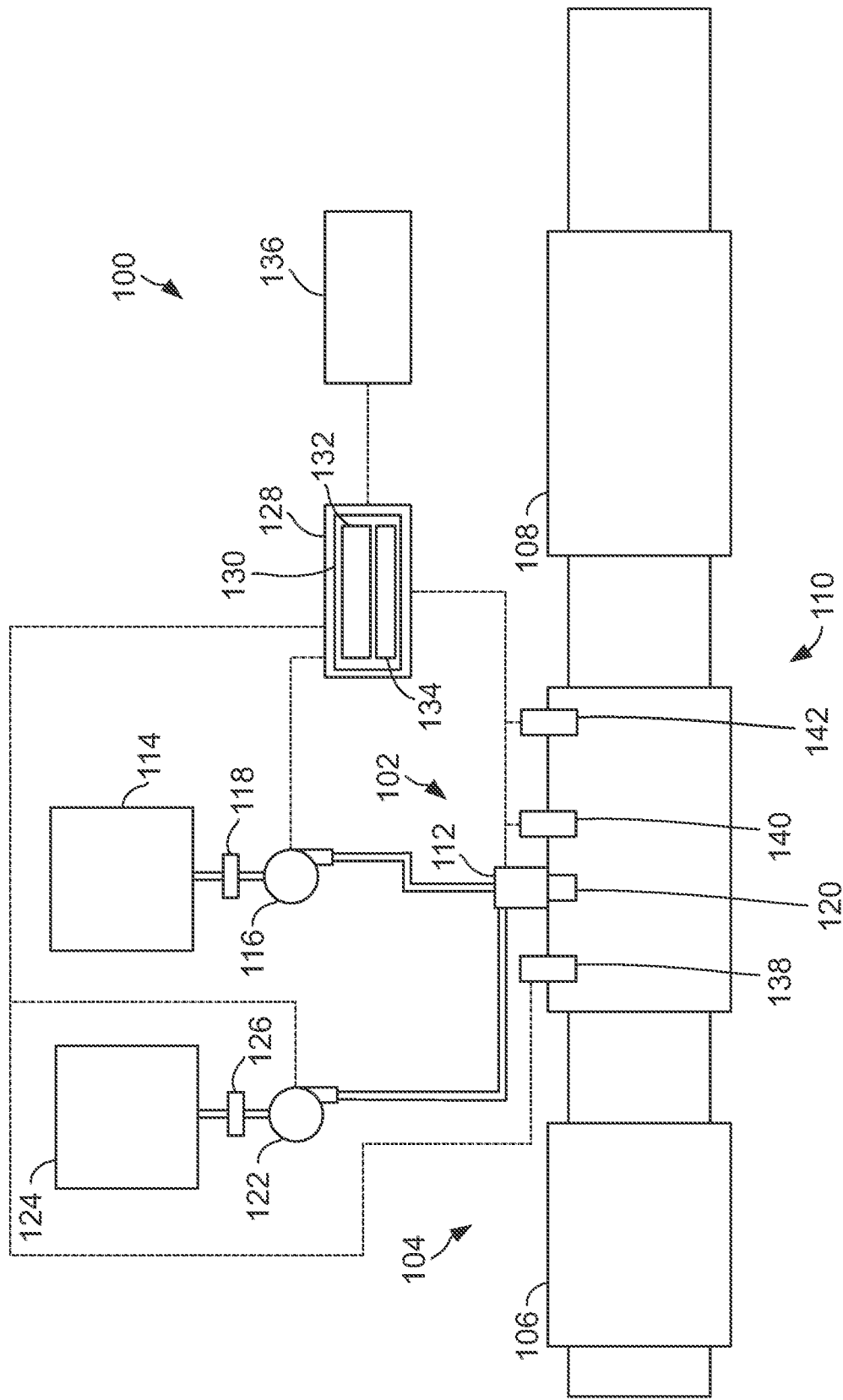
FIG. 1 is a block schematic diagram of an example exhaust gas aftertreatment system.
Figure 2:
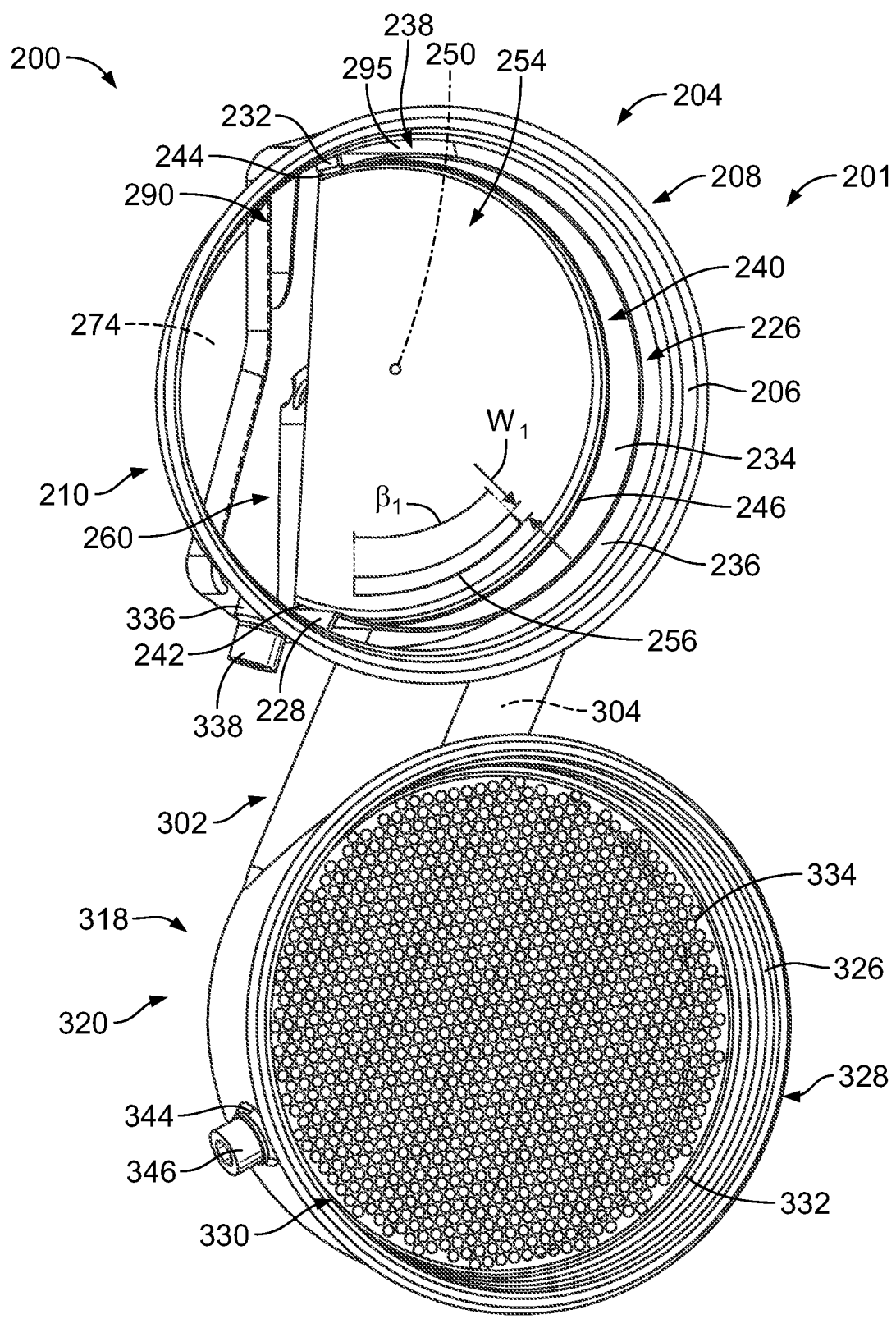
FIG. 2 is a perspective view of an example reductant delivery system for the exhaust gas aftertreatment system shown in FIG. 1.

It will be recognized that some or all of the Figures are schematic representations for purposes of illustration. The Figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and for treating exhaust gas of an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gas that contains constituents, such as $NO_x$, $N_2$, $CO_2$, and/or $H_2O$. In some applications, an exhaust gas aftertreatment system is utilized to dose the exhaust gas with a reductant so as to reduce $NO_x$ emissions in the exhaust gas. These exhaust gas aftertreatment systems may include a decomposition chamber within which the reductant is provided and mixed with the exhaust gas.

Exhaust gas aftertreatment systems are defined by a space claim. The space claim is the amount of physical space that an exhaust gas aftertreatment system consumes when installed (e.g., on a vehicle, etc.) and the location (e.g., coordinates relative to a vehicle coordinate system, etc.) of the physical space that is consumed by the exhaust gas aftertreatment system when installed. In some applications, the physical space available for use by an exhaust gas aftertreatment system is limited due to the locations of surrounding components, wiring or piping requirements, or other similar constraints. As such, it is often desirable to minimize the space claim of an exhaust gas aftertreatment system as much as possible so that the exhaust gas aftertreatment system can be utilized in as large a number of applications as possible. The decomposition chamber within which the reductant is provided and mixed with the exhaust gas constitutes a significant portion of the space claim.

Implementations described herein are related to an exhaust gas aftertreatment system which includes a reductant delivery system that includes an inlet body for receiving exhaust gas from upstream components and providing exhaust gas with reductant, an outlet body for providing exhaust gas to downstream components, and two transfer tubes for conveying exhaust gas from the inlet body to the outlet body. The inlet body may include a dividing plate, a diverter, and an inner shell for variously directing and splitting the exhaust gas received from the upstream components and variously enhancing swirl of the exhaust gas and reductant. The transfer tubes may be nested such that one transfer tube extends within the other, thereby causing the exhaust gas flowing between the transfer tubes to heat the inner transfer tube. The reductant delivery system described herein is capable of being used across multiple different applications (e.g., different internal combustion engines, different exhaust gas aftertreatment systems, etc.) and is easily scalable.

The transfer tubes are coupled to the inlet body and outlet body at an angle (e.g., along a tangent of the outlet body, etc.). As a result, the length of the transfer tubes may be increased without substantially increasing the distance between the inlet body and outlet body. As a result, a mixing length of the exhaust gas, and therefore a uniformity index (UI) of the reductant in the exhaust gas can be increased without substantially increasing the space claim of the reductant delivery system.

II. Example Exhaust Gas Aftertreatment System

FIG. 1 depicts an exhaust gas aftertreatment system 100 having an example reductant delivery system 102 for an exhaust gas conduit system 104. The exhaust gas aftertreatment system 100 also includes a particulate filter (e.g., a diesel particulate filter (DPF)) 106 and a selective catalytic reduction (SCR) catalyst member 108.

The particulate filter 106 is configured to remove particulate matter, such as soot, from exhaust gas flowing in the exhaust gas conduit system 104. The particulate filter 106 includes an inlet, where the exhaust gas is received, and an outlet, where the exhaust gas exits after having particulate matter substantially filtered from the exhaust gas and/or converting the particulate matter into carbon dioxide. In some implementations, the particulate filter 106 may be omitted.

The reductant delivery system 102 includes a decomposition chamber 110 (e.g., decomposition reactor, reactor pipe, decomposition tube, reactor tube, etc.). The decomposition chamber 110 is configured to convert a reductant into ammonia. The reductant may be, for example, urea, diesel exhaust fluid (DEF), Adblue®, a urea water solution (UWS), an aqueous urea solution (e.g., AUS32, etc.), and other similar fluids. The decomposition chamber 110 includes an inlet fluidly coupled to (e.g., fluidly configured to communicate with, etc.) the particulate filter 106 to receive the exhaust gas containing $NO_x$ emissions and an outlet for the exhaust gas, $NO_x$ emissions, ammonia, and/or reductant to flow to the SCR catalyst member 108.

The reductant delivery system 102 also includes a dosing module 112 (e.g., doser, etc.) configured to dose the reductant into the decomposition chamber 110. The dosing module 112 may include an insulator interposed between a portion of the dosing module 112 and the portion of the decomposition chamber 110 on which the dosing module 112 is mounted.

The dosing module 112 is fluidly coupled to a reductant source 114. The reductant source 114 may include multiple reductant sources 114. The reductant source 114 may be, for example, a diesel exhaust fluid tank containing Adblue®. A reductant pump 116 (e.g., supply unit, etc.) is used to pressurize the reductant from the reductant source 114 for delivery to the dosing module 112. In some embodiments, the reductant pump 116 is pressure controlled (e.g., controlled to obtain a target pressure, etc.). The reductant pump 116 includes a reductant filter 118. The reductant filter 118 filters (e.g., strains, etc.) the reductant prior to the reductant being provided to internal components (e.g., pistons, vanes, etc.) of the reductant pump 116. For example, the reductant filter 118 may inhibit or prevent the transmission of solids (e.g., solidified reductant, contaminants, etc.) to the internal components of the reductant pump 116. In this way, the reductant filter 118 may facilitate prolonged desirable operation of the reductant pump 116. In some embodiments, the reductant pump 116 is coupled to (e.g., attached to, fixed to, welded to, integrated with, etc.) a chassis of a vehicle associated with the exhaust gas aftertreatment system 100.

The dosing module 112 includes at least one injector 120. Each injector 120 is configured to dose the reductant into the exhaust gas (e.g., within the decomposition chamber 110, etc.). In some embodiments, the reductant delivery system 102 also includes an air pump 122. In these embodiments, the air pump 122 draws air from an air source 124 (e.g., air intake, etc.) and through an air filter 126 disposed upstream of the air pump 122. Additionally, the air pump 122 provides the air to the dosing module 112 via a conduit. In these embodiments, the dosing module 112 is configured to mix the air and the reductant into an air-reductant mixture and to provide the air-reductant mixture into the decomposition chamber 110. In other embodiments, the reductant delivery system 102 does not include the air pump 122 or the air source 124. In such embodiments, the dosing module 112 is not configured to mix the reductant with air.

The dosing module 112 and the reductant pump 116 are also electrically or communicatively coupled to a reductant delivery system controller 128. The reductant delivery system controller 128 is configured to control the dosing module 112 to dose the reductant into the decomposition chamber 110. The reductant delivery system controller 128 may also be configured to control the reductant pump 116.

The reductant delivery system controller 128 includes a processing circuit 130. The processing circuit 130 includes a processor 132 and a memory 134. The processor 132 may include a microprocessor, an application-specific integrated circuit (ASIC), a field-programmable gate array (FPGA), etc., or combinations thereof. The memory 134 may include, but is not limited to, electronic, optical, magnetic, or any other storage or transmission device capable of providing a processor, ASIC, FPGA, etc. with program instructions. This memory 134 may include a memory chip, Electrically Erasable Programmable Read-Only Memory (EEPROM), Erasable Programmable Read Only Memory (EPROM), flash memory, or any other suitable memory from which the reductant delivery system controller 128 can read instructions. The instructions may include code from any suitable programming language. The memory 134 may include various modules that include instructions which are configured to be implemented by the processor 132.

In various embodiments, the reductant delivery system controller 128 is configured to communicate with a central controller 136 (e.g., engine control unit (ECU), engine control module (ECM), etc.) of an internal combustion engine having the exhaust gas aftertreatment system 100. In some embodiments, the central controller 136 and the reductant delivery system controller 128 are integrated into a single controller.

In some embodiments, the central controller 136 is communicable with a display device (e.g., screen, monitor, touch screen, heads up display (HUD), indicator light, etc.). The display device may be configured to change state in response to receiving information from the central controller 136. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 136. By changing state, the display device may provide an indication to a user (e.g., operator, etc.) of a status (e.g., operation, in need of service, etc.) of the reductant delivery system 102.

The decomposition chamber 110 is located upstream of the SCR catalyst member 108. As a result, the reductant is injected by the injector 120 upstream of the SCR catalyst member 108 such that the SCR catalyst member 108 receives a mixture of the reductant and exhaust gas. The reductant droplets undergo the processes of evaporation, thermolysis, and hydrolysis to form non-$NO_x$ emissions (e.g., gaseous ammonia, etc.) within the decomposition chamber 110, the SCR catalyst member 108, and/or the exhaust gas conduit system 104.

The SCR catalyst member 108 is configured to assist in the reduction of $NO_x$ emissions by accelerating a $NO_x$ reduction process between the reductant and the $NO_x$ of the exhaust gas into diatomic nitrogen, water, and/or carbon dioxide. The SCR catalyst member 108 includes an inlet fluidly coupled to the decomposition chamber 110 from which exhaust gas and reductant are received and an outlet fluidly coupled to an end of the exhaust gas conduit system 104.

The reductant delivery system 102 also includes an upstream temperature sensor 138 (e.g., thermocouple, etc.). The upstream temperature sensor 138 is configured to determine a temperature of the exhaust gas upstream of the injector 120 (e.g., within the decomposition chamber 110, within the exhaust gas conduit system 104, etc.). The upstream temperature sensor 138 is electrically or communicatively coupled to the reductant delivery system controller 128 and configured to provide an upstream temperature of the exhaust gas to the reductant delivery system controller 128.

The reductant delivery system 102 also includes a pressure sensor 140 (e.g., pressure differential sensor, capacitive pressure sensor, etc.). The pressure sensor 140 is configured to determine a pressure of the exhaust gas (e.g., within the decomposition chamber 110, within the exhaust gas conduit system 104, etc.). The pressure sensor 140 is electrically or communicatively coupled to the reductant delivery system controller 128 and configured to provide a pressure of the exhaust gas to the reductant delivery system controller 128.

The reductant delivery system 102 also includes a downstream temperature sensor 142 (e.g., thermocouple, etc.). The downstream temperature sensor 142 is configured to determine a temperature of the exhaust gas downstream of the injector 120 (e.g., within the decomposition chamber 110, within the exhaust gas conduit system 104, etc.). The downstream temperature sensor 142 is electrically or communicatively coupled to the reductant delivery system controller 128 and configured to provide a downstream stream temperature of the exhaust gas to the reductant delivery system controller 128.

The exhaust gas aftertreatment system 100 may further include an oxidation catalyst (e.g., a diesel oxidation catalyst (DOC)) fluidly coupled to the exhaust gas conduit system 104 (e.g., downstream of the SCR catalyst member 108 or upstream of the particulate filter 106) to oxidize hydrocarbons and carbon monoxide in the exhaust gas.

In some implementations, the particulate filter 106 may be positioned downstream of the decomposition chamber 110. For instance, the particulate filter 106 and the SCR catalyst member 108 may be combined into a single unit. In some implementations, the dosing module 112 may instead be positioned downstream of a turbocharger or upstream of a turbocharger.

While the exhaust gas aftertreatment system 100 has been shown and described in the context of use with a diesel internal combustion engine, it is understood that the exhaust gas aftertreatment system 100 may be used with other internal combustion engines, such as gasoline internal combustion engines, hybrid internal combustion engines, propane internal combustion engines, and other similar internal combustion engines.

III. First Example Reductant Delivery System

FIGS. 2-10 illustrate a reductant delivery system 200, according to an example embodiment. The reductant delivery system 200 is the reductant delivery system 102 in various embodiments. The reductant delivery system 200 includes a reductant delivery system body 201 (e.g., shell, frame, assembly, etc.). The reductant delivery system body 201 includes an inlet body 204 (e.g., shell, frame, assembly, etc.). The inlet body 204 includes an inlet body inlet 206 (e.g., opening, aperture, etc.). The inlet body inlet 206 is configured to receive exhaust gas from the exhaust gas conduit system 104. In some embodiments, the reductant delivery system 200 is positioned downstream of the particulate filter 106 such that the inlet body inlet 206 receives exhaust gas from the particulate filter 106.

The inlet body 204 includes an inlet body coupler 208 (e.g., body, etc.). The inlet body coupler 208 borders (e.g., circumscribes, etc.) the inlet body inlet 206. The inlet body coupler 208 is coupled to (e.g., attached to, fixed to, welded to, integrated with, etc.) the exhaust gas conduit system 104 around (e.g., about, etc.) the inlet body inlet 206. In various embodiments, the inlet body coupler 208 is circular.

The inlet body 204 also includes an inlet body outer mounting shell 210 (e.g., body, frame, etc.). The inlet body outer mounting shell 210 includes an inlet body outer mounting shell coupling surface 212 (e.g., face, etc.). In various embodiments, the inlet body outer mounting shell coupling surface 212 is disposed along a circular arc. The inlet body outer mounting shell coupling surface 212 is in contact with an inlet body coupler coupling surface 214

(e.g., face, etc.) of the inlet body coupler 208. In various embodiments, the inlet body coupler coupling surface 214 is disposed along a circular arc. In various embodiments, the inlet body outer mounting shell coupling surface 212 is coupled to an inlet body coupler coupling surface 214 (e.g., face, etc.) of the inlet body coupler 208.

The inlet body 204 also includes an inlet body outer transfer shell 216 (e.g., body, frame, etc.). The inlet body outer transfer shell 216 includes an inlet body outer transfer shell coupling surface 218 (e.g., face, etc.). In various embodiments, the inlet body outer transfer shell coupling surface 218 is disposed along a circular arc. In some embodiments, the inlet body outer mounting shell coupling surface 212 is disposed along a circular arc having a first radius and the inlet body outer transfer shell coupling surface 218 is disposed along a circular arc having the first radius. In some embodiments, the inlet body outer mounting shell coupling surface 212 and the inlet body outer transfer shell coupling surface 218 are both disposed along the same circle. In various embodiments, the inlet body outer transfer shell coupling surface 218 is coupled to the inlet body coupler coupling surface 214.

The inlet body outer mounting shell 210 includes an inlet body outer mounting shell mating surface 220 (e.g., face, etc.). The inlet body outer mounting shell mating surface 220 is contiguous with the inlet body outer mounting shell coupling surface 212. Similarly, the inlet body outer transfer shell 216 includes an inlet body outer transfer shell mating surface 222 (e.g., face, etc.). The inlet body outer transfer shell mating surface 222 is contiguous with the inlet body outer transfer shell coupling surface 218. In various embodiments, the inlet body outer mounting shell mating surface 220 is coupled to the inlet body outer transfer shell mating surface 222 such that the inlet body outer mounting shell 210 is coupled to the inlet body outer transfer shell 216. Collectively, the inlet body outer mounting shell 210 and the inlet body outer transfer shell 216 define an inlet body cavity 224 (e.g., void, region, space, etc.).

The inlet body 204 also includes an inlet body inner shell 226 (e.g., body, frame, etc.). The inlet body inner shell 226 is contained within the inlet body cavity 224. The inlet body inner shell 226 includes an inlet body inner shell first flange 228 (e.g., rib, etc.). The inlet body inner shell first flange 228 is in contact with an inlet body outer mounting shell inner surface 230 (e.g., face, etc.) of the inlet body outer mounting shell 210. In various embodiments, the inlet body inner shell first flange 228 is coupled to the inlet body outer mounting shell inner surface 230. In some embodiments, the inlet body outer mounting shell inner surface 230 is opposite the inlet body outer mounting shell coupling surface 212.

The inlet body inner shell 226 also includes an inlet body inner shell second flange 232 (e.g., rib, etc.). The inlet body inner shell second flange 232 is in contact with (e.g., interfaces with, etc.) the inlet body outer mounting shell inner surface 230. In various embodiments, the inlet body inner shell second flange 232 is coupled to the inlet body outer mounting shell inner surface 230.

The inlet body inner shell 226 also includes an inlet body inner shell wall 234. The inlet body inner shell wall 234 is contiguous with the inlet body inner shell first flange 228 and the inlet body inner shell second flange 232. The inlet body inner shell first flange 228 and the inlet body inner shell second flange 232 cooperate to separate the inlet body inner shell wall 234 from the inlet body outer mounting shell inner surface 230 and an inlet body outer transfer shell inner surface 236 (e.g., face, etc.) of the inlet body outer transfer shell 216. In some embodiments, the inlet body outer transfer shell inner surface 236 is opposite the inlet body outer transfer shell coupling surface 218. In various embodiments, the inlet body inner shell wall 234 is disposed along a circular arc.

The inlet body 204 also includes a dividing plate 238 (e.g., flange, wall, etc.). The dividing plate 238 is at least partially contained within the inlet body inner shell wall 234. The dividing plate 238 includes a dividing plate coupling surface 240 (e.g., face, etc.). In various embodiments, the dividing plate coupling surface 240 is disposed along a circular arc. In other embodiments, the dividing plate coupling surface 240 is disposed along an elliptical arc.

The dividing plate coupling surface 240 includes a dividing plate coupling surface first end 242, a dividing plate coupling surface second end 244, and a dividing plate coupling surface middle portion 246 extending between the dividing plate coupling surface first end 242 and the dividing plate coupling surface second end 244. The dividing plate coupling surface first end 242 is located proximate the inlet body inner shell first flange 228 and is in contact with and/or coupled to the inlet body inner shell wall 234. The dividing plate coupling surface second end 244 is located proximate the inlet body inner shell second flange 232 and is in contact with and/or coupled to the inlet body inner shell wall 234. The dividing plate coupling surface middle portion 246 is separated from the inlet body inner shell wall 234.

The dividing plate coupling surface middle portion 246 has a dividing plate coupling surface middle portion center point 247. The dividing plate coupling surface middle portion center point 247 is coupled to the inlet body inner shell wall 234.

The inlet body inlet 206 is disposed along an inlet body inlet plane 248. The dividing plate coupling surface first end 242 is separated from the inlet body inlet plane 248 by a first distance $D_1$. In some embodiments, the $D_1$ is approximately equal to (e.g., within 5% of, etc.) 85 millimeters (mm). The dividing plate coupling surface second end 244 is separated from the inlet body inlet plane 248 by a second distance $D_2$. In some embodiments, the $D_2$ is approximately equal to 52 mm. In various embodiments, the $D_1$ is greater than the $D_2$. As a result, velocity of the exhaust gas out of the inlet body 204 may be increased because a cross-sectional area between the dividing plate 238 and the inlet body inner shell 226 decreases along the inlet body inner shell wall 234. In some embodiments, the $D_1$ is equal to the $D_2$. In other embodiments, the $D_1$ is less than the $D_2$.

The inlet body inlet 206 is defined by an inlet body inlet center point 250 (e.g., centroid, etc.). The inlet body inlet 206 is bisected by a reductant delivery system body bisecting plane 252. The reductant delivery system body bisecting plane 252 bisects the reductant delivery system body 201 and intersects the inlet body inlet center point 250.

The dividing plate coupling surface first end 242 and/or the inlet body inner shell first flange 228 is angularly separated from the reductant delivery system body bisecting plane 252 by a first angular distance $\alpha_1$. In some embodiments, the $\alpha_1$ is approximately equal to 30°. The dividing plate coupling surface second end 244 and/or the inlet body inner shell second flange 232 is angularly separated from the reductant delivery system body bisecting plane 252 by a second angular distance $\alpha_2$. In some embodiments, the $\alpha_2$ is approximately equal to 9.5°. In various embodiments, the $\alpha_1$ is greater than the $\alpha_2$. In some embodiments, the $\alpha_1$ is equal to the $\alpha_2$. In other embodiments, the $\alpha_1$ is less than the $\alpha_2$.

The dividing plate 238 includes a dividing plate panel 254 (e.g., face, surface, portion, etc.). The dividing plate panel 254 is contiguous with the dividing plate coupling surface 240. In various embodiments, the dividing plate panel 254 is angled (e.g., tilted, inclined, etc.) relative to the inlet body inlet plane 248.

The dividing plate panel 254 includes a dividing plate panel slot 256 (e.g., aperture, opening, window, etc.). The dividing plate panel slot 256 facilitates flow of the exhaust gas through the dividing plate panel 254 as opposed to around the dividing plate panel 254. The dividing plate panel slot 256 is defined by a first arc length $\beta_1$ along the dividing plate panel 254. In some embodiments, the $\beta_1$ is approximately equal to 55°. The dividing plate panel slot 256 is also defined by a first width $W_1$ along the dividing plate panel 254. In some embodiments, the $W_1$ is approximately equal to 10 mm. In various embodiments, the $W_1$ is constant along the $\beta_1$.

The inlet body inner shell 226 also includes an inlet body inner shell endcap 258. The inlet body inner shell endcap 258 is contiguous with the inlet body inner shell wall 234. The inlet body inner shell endcap 258 is separated from the inlet body outer transfer shell mating surface 222 and the inlet body outer mounting shell inner surface 230.

The inlet body 204 also includes a diverter 260 (e.g., shield, flange, etc.). The diverter 260 is at least partially contained within the inlet body inner shell wall 234. The diverter 260 includes a diverter wall edge 262 (e.g., face, etc.). In various embodiments, the diverter wall edge 262 is coupled to the inlet body inner shell wall 234. The diverter 260 also includes a diverter endcap edge 264 (e.g., face, etc.) that is contiguous with the diverter wall edge 262. In various embodiments, the diverter endcap edge 264 is coupled to the inlet body inner shell endcap 258. The diverter 260 also includes a diverter panel edge 266 (e.g., face, etc.) that is contiguous with the diverter wall edge 262. In various embodiments, the diverter panel edge 266 is coupled to the dividing plate panel 254.

The diverter 260 includes a diverter base 268 and a diverter end 270. The diverter wall edge 262, the diverter endcap edge 264, and the diverter panel edge 266 extend along the diverter base 268. The diverter endcap edge 264 and the diverter panel edge 266 extend along the diverter end 270. However, the diverter wall edge 262 does not extend along the diverter end 270. The diverter base 268 is disposed along a plane (e.g., is planar, is flat, etc.). The diverter base 268 is angularly separated from the reductant delivery system body bisecting plane 252 by a third angular distance $\alpha_3$. In some embodiments, the $\alpha_3$ is approximately equal to 10.5°. Unlike the diverter base 268, the diverter end 270 is not disposed along a plane. Instead, the diverter end 270 is curved (e.g., curled, bent, deflected, etc.) relative to the diverter base 268 and is defined by a second arc length $\beta_2$ along the inlet body inlet plane 248. In some embodiments, the $\beta_2$ is approximately equal to 72° (e.g., 72.3°, etc.).

Figure 7:
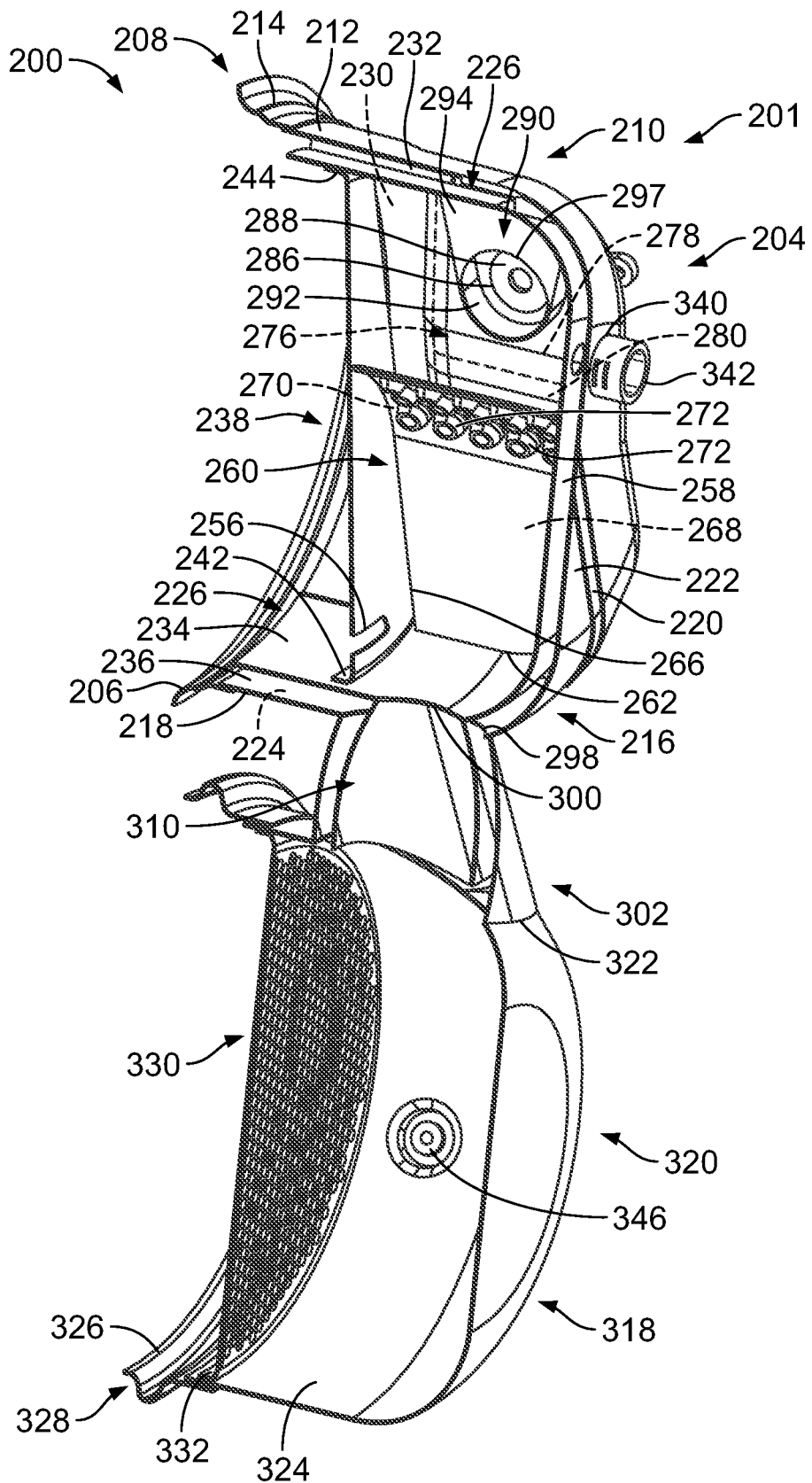
FIG. 7 is a perspective view of the reductant delivery system shown in FIG. 6.
Figure 8:
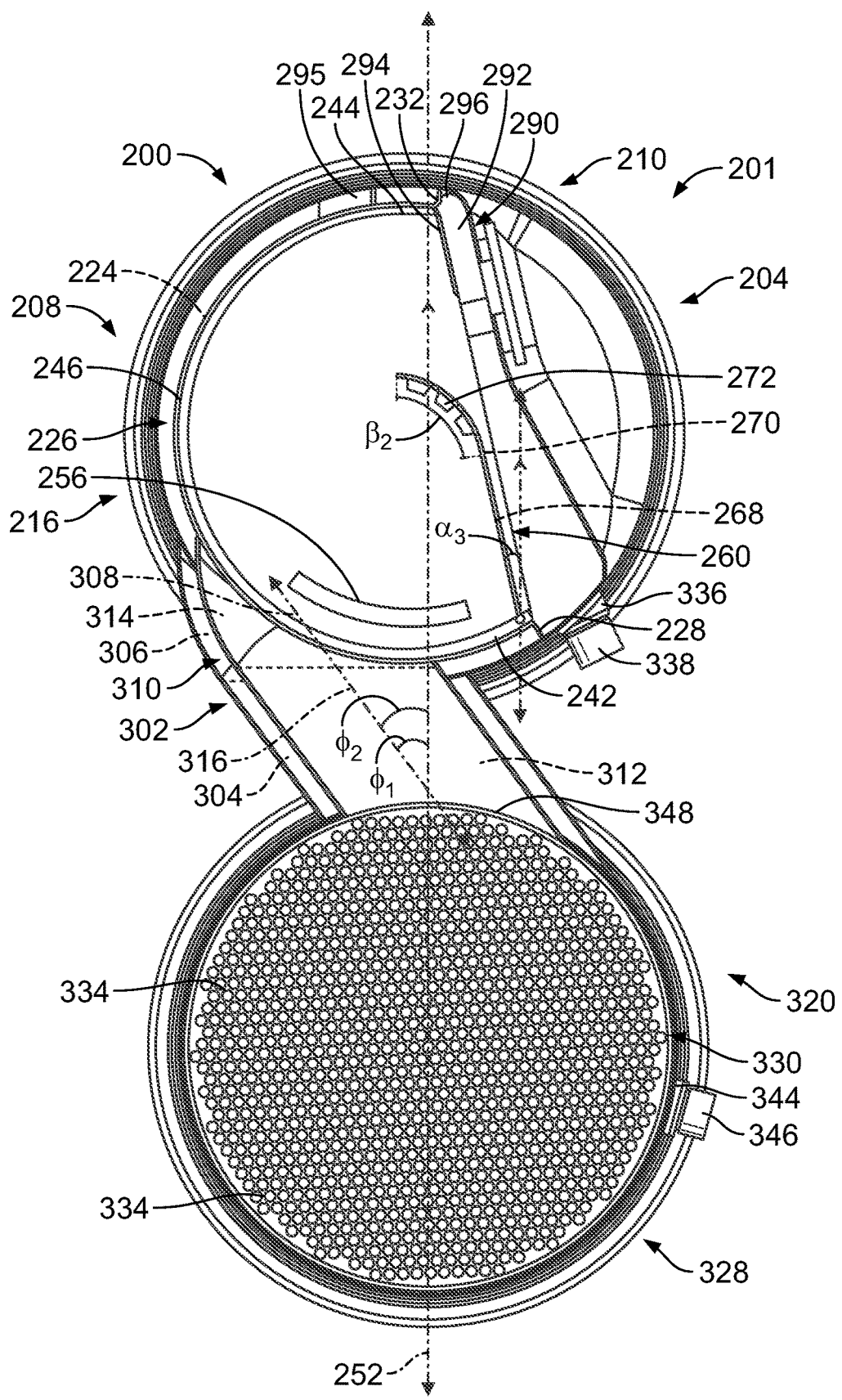
FIG. 8 is a rear view of the reductant delivery system shown in FIG. 4, taken along plane B-B.

The diverter end 270 includes at least one diverter end aperture 272 (e.g., opening, hole, perforation, etc.). In various embodiments, the diverter end 270 includes a plurality of diverter end apertures 272. In some embodiments, the diverter end apertures 272 are disposed uniformly (e.g., in rows and columns, etc.) along the diverter end 270 between the diverter wall edge 262 and the diverter panel edge 266. In one embodiment, the diverter end 270 includes fifteen diverter end apertures 272, the diverter end apertures 272 being arranged in three rows and five columns. In some embodiments, each diverter end aperture 272 is elliptical. In some of these embodiments, each diverter end aperture 272 is elliptical and has a major axis that is approximately equal to 8.7 mm (e.g., 8.67 mm, etc.) and a minor axis that is approximately equal to 7 mm. In various embodiments, each diverter end aperture 272 is circular and defined by a diameter. In other embodiments, each diverter end aperture 272 is square, rectangular, polygonal, or otherwise similarly shaped. The number and size of the diverter end apertures 272 is related to a backpressure of the reductant delivery system 200. By increasing the number of diverter end apertures 272 and/or by increasing the size of the diverter end apertures 272, the backpressure of the reductant delivery system 200 is decreased. Additionally, increasing the number/size of the diverter end apertures 272 may decrease impingement of reductant near the diverter base 268 because a recirculation zone adjacent to the diverter base 268 is reduced due to flushing facilitated by the diverter end apertures 272. By decreasing the number/size of the diverter end apertures 272, additional flow is provided around the diverter end 270, thereby increasing heat transfer and shear on the inlet body inner shell wall 234. In some embodiments, such as is shown in FIG. 7, the diverter end apertures 272 are each formed within a truncated cone extending away from the inlet body outer mounting shell 210. As a result of being formed within a truncated cone, flow into each diverter end aperture 272 is collected and concentrated prior to flowing through the diverter end aperture 272.

The inlet body outer mounting shell 210 also includes an inlet body outer mounting shell dividing surface 274 (e.g., face, panel, etc.). The inlet body outer mounting shell dividing surface 274 is contiguous with the inlet body outer mounting shell inner surface 230. The inlet body outer mounting shell dividing surface 274 is disposed along a plane that is parallel to the inlet body inlet plane 248 and separated from the inlet body inlet plane 248 a third distance $D_3$. In some embodiments, the $D_3$ is approximately equal to 79 mm (e.g., 78.9 mm, etc.). In various embodiments, the $D_3$ is greater than the $D_2$ and less than the $D_1$.

The inlet body outer mounting shell 210 also includes an inlet body outer mounting shell projecting surface 276 (e.g., face, panel, etc.). The inlet body outer mounting shell projecting surface 276 is contiguous with the inlet body outer mounting shell inner surface 230 and the inlet body outer mounting shell dividing surface 274. The inlet body outer mounting shell projecting surface 276 includes an inlet body outer mounting shell inner mounting surface 278 (e.g., face, panel, etc.) and an inlet body outer mounting shell diverting surface 280 (e.g., face, panel, etc.). The inlet body outer mounting shell inner mounting surface 278 is angularly separated from the reductant delivery system body bisecting plane 252 (e.g., a plane parallel to the reductant delivery system body bisecting plane 252, etc.) by a fourth angular distance $\alpha_4$. In some embodiments, the $\alpha_4$ is approximately equal to 11° (e.g., 10.6°, etc.). The inlet body outer mounting shell diverting surface 280 is angularly separated from the reductant delivery system body bisecting plane 252 (e.g., a plane parallel to the reductant delivery system body bisecting plane 252, etc.) by a fifth angular distance $\alpha_5$. In some embodiments, the $\alpha_5$ is approximately equal to 25° (e.g., 25.6°, etc.). In various embodiments, the $\alpha_5$ is greater than the $\alpha_4$. In some embodiments, the $\alpha_1$ is greater than the $\alpha_5$, the $\alpha_5$ is greater than the $\alpha_2$, and the $\alpha_2$ is greater than the $\alpha_4$.

The inlet body outer mounting shell 210 also includes an inlet body outer mounting shell recess 282 (e.g., depression, etc.). The inlet body outer mounting shell recess 282 is opposite the inlet body outer mounting shell projecting surface 276 and the inlet body outer mounting shell dividing surface 274. The inlet body outer mounting shell recess 282 includes an inlet body outer mounting shell outer mounting surface 284 (e.g., face, panel, etc.). The inlet body outer mounting shell outer mounting surface 284 is opposite the inlet body outer mounting shell inner mounting surface 278.

The inlet body outer mounting shell 210 includes an injection aperture 286 (e.g., opening, hole, window, etc.). The injection aperture 286 extends through the inlet body outer mounting shell outer mounting surface 284 and the inlet body outer mounting shell inner mounting surface 278. The injection aperture 286 is configured to receive an injection mount 288 (e.g., mounting plate, etc.). The injection mount 288 is configured to be coupled to the dosing module 112 and/or the injector 120 such that the dosing module 112 and/or the injector 120 is positioned to provide reductant into the inlet body outer mounting shell 210 via the injection aperture 286. The inlet body outer mounting shell outer mounting surface 284 is generally disposed along a plane and facilitates coupling of the injection mount 288 at various orientations (e.g., rotational positions, clockings, etc.), thereby accommodating various configurations of the dosing module 112 and/or the injector 120.

Figure 9:
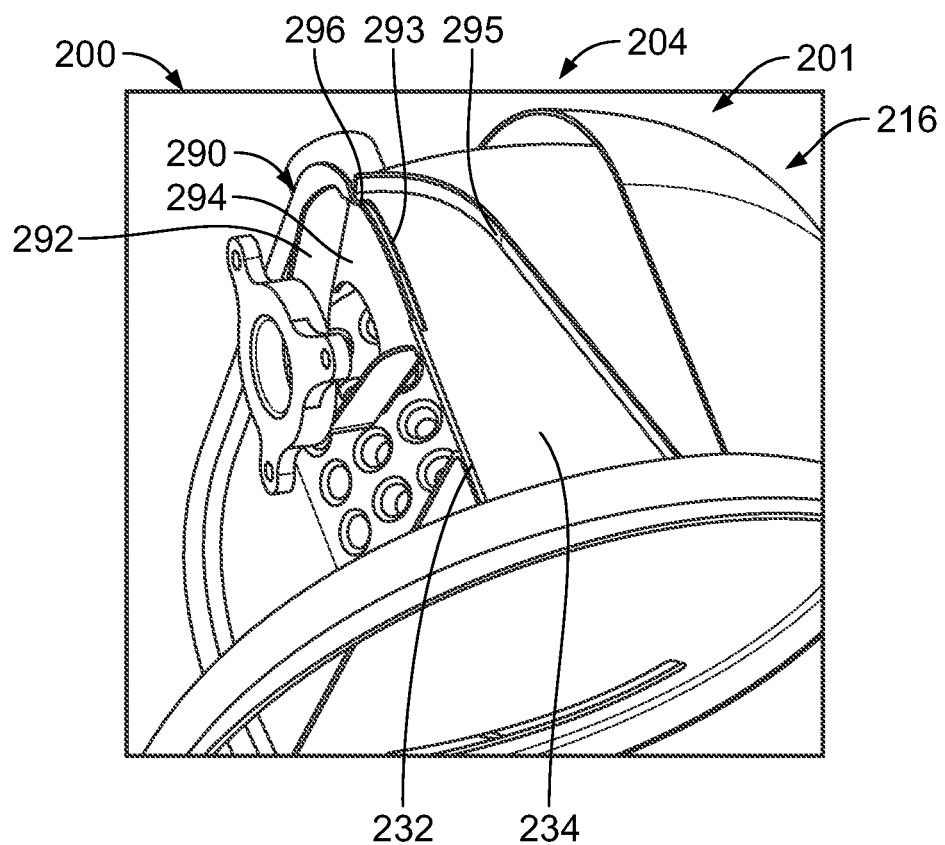
FIG. 9 is a top perspective view of the reductant delivery system shown in FIG. 2 with some components hidden.
Figure 10:
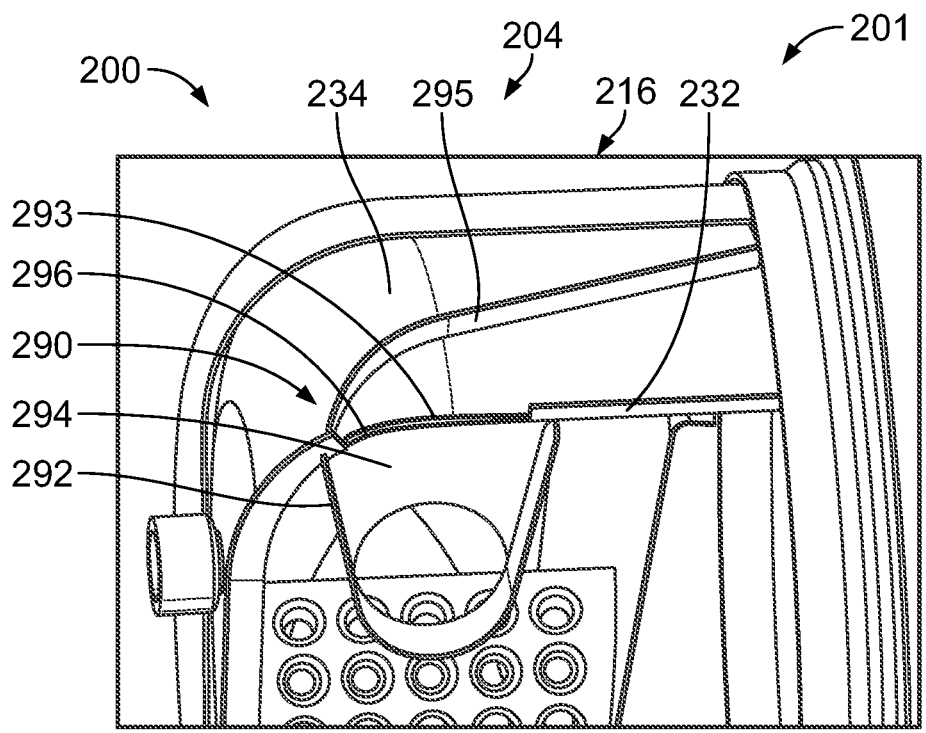
FIG. 10 is another top perspective view of the reductant delivery system shown in FIG. 2 with some components hidden.
Figure 11:
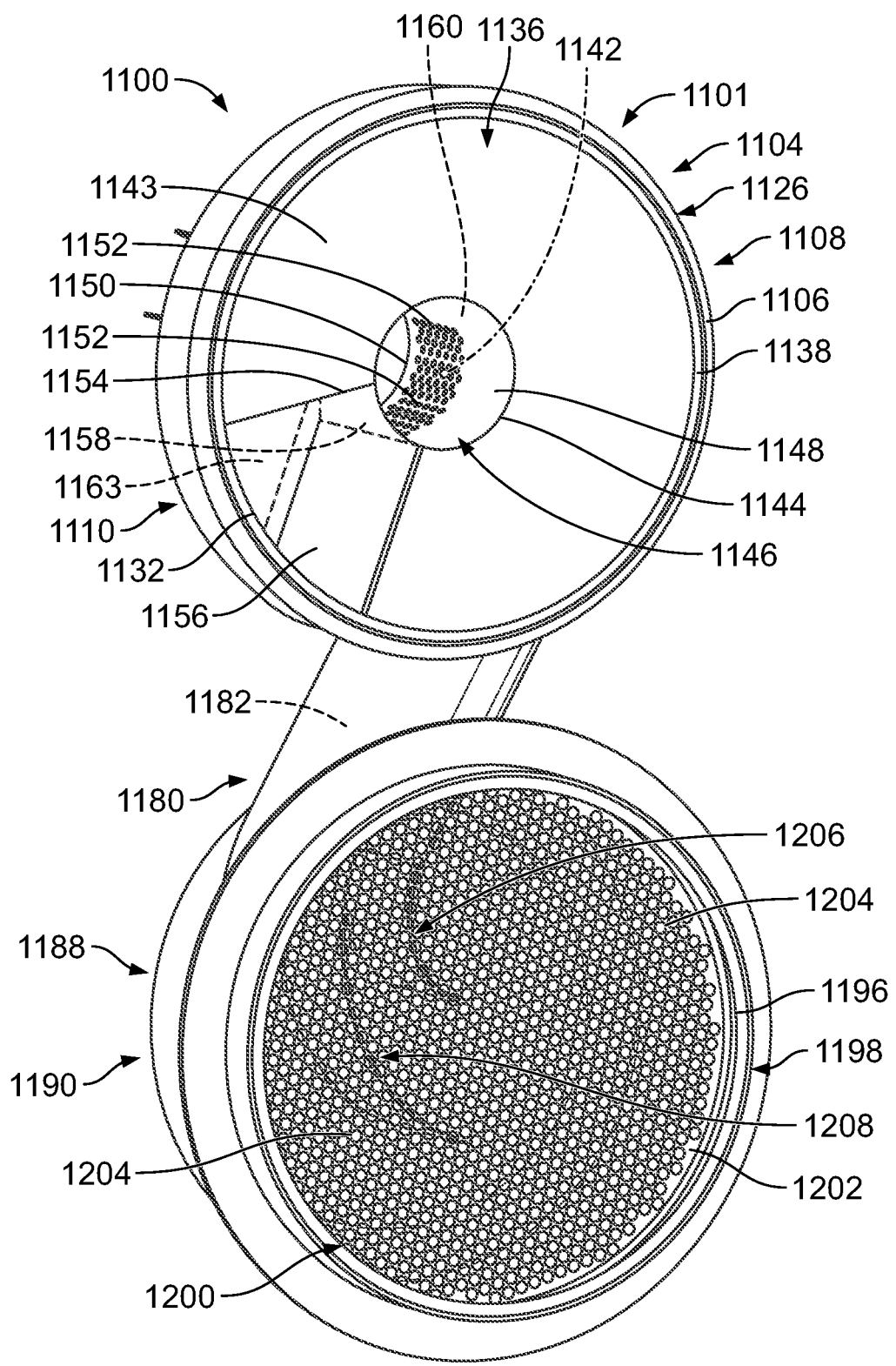
FIG. 11 is a perspective view of an example reductant delivery system for the exhaust gas aftertreatment system shown in FIG. 1.
Figure 12:
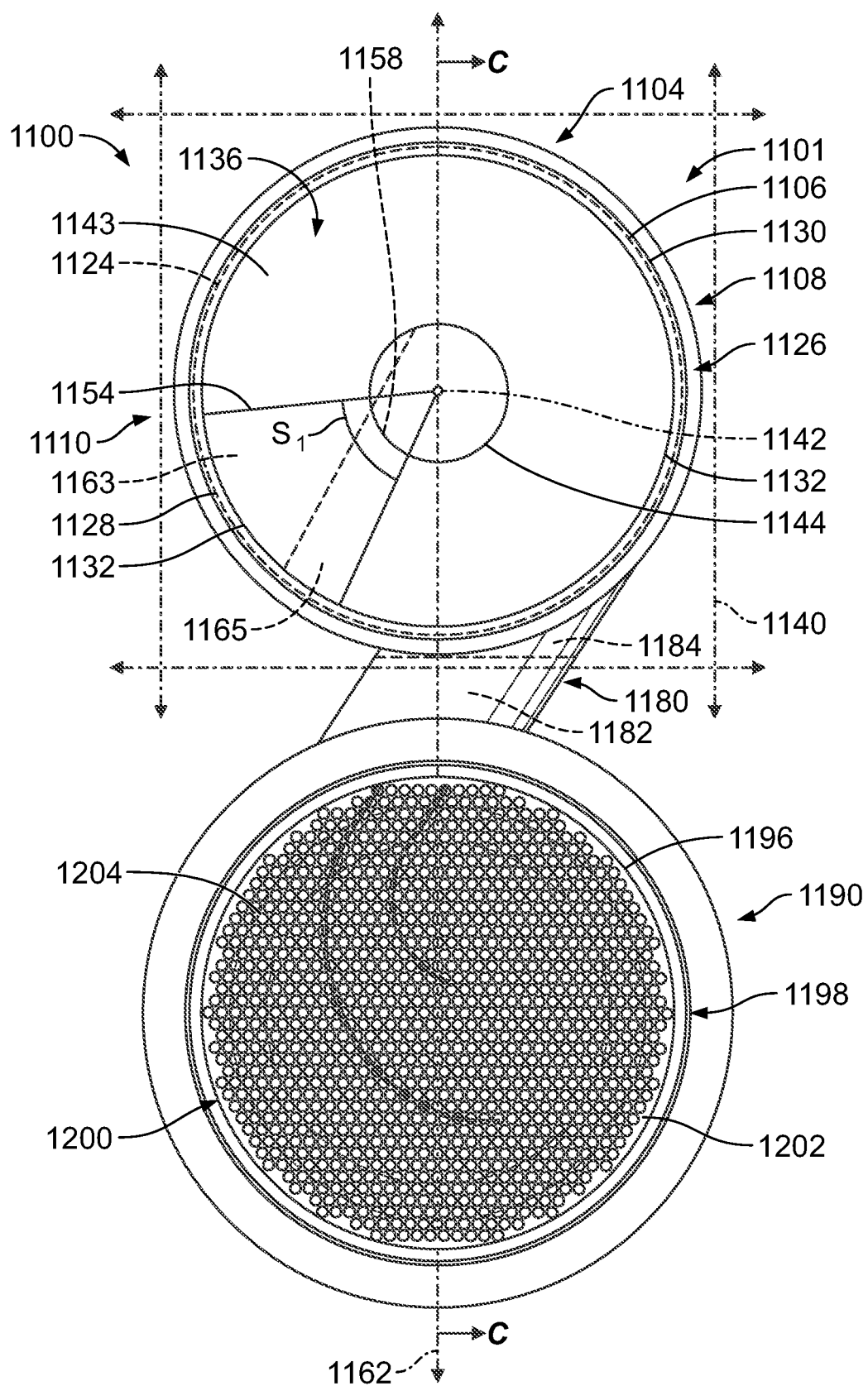
FIG. 12 is a front view of the reductant delivery system shown in FIG. 11.

The inlet body 204 also includes a shroud assembly 290 (e.g., cover, etc.). The shroud assembly 290 is disposed along the inlet body outer mounting shell inner mounting surface 278 and is configured to partially shield the reductant provided through the injection aperture 286 from exhaust gas. The shroud assembly 290 includes a shroud flange 292 (e.g., band, etc.). The shroud flange 292 is coupled to the inlet body outer mounting shell inner mounting surface 278 around the injection aperture 286. The shroud flange 292 extends around an inlet body inner shell second flange aperture 293 formed in the inlet body inner shell second flange 232. For example, the shroud flange 292 may be coupled to the inlet body inner shell second flange 232 around the inlet body inner shell second flange aperture 293. The shroud assembly 290 also includes a shroud plate 294 (e.g., cover, etc.). The shroud plate 294 is coupled to the shroud flange 292 and the inlet body inner shell wall 234, but is not coupled to the inlet body outer mounting shell 210. As shown in FIG. 9, where the inlet body outer mounting shell 210 is hidden, the shroud assembly 290 also includes a shroud guide 295 (e.g., fin, wall, barrier, etc.). The shroud guide 295 is coupled to the inlet body inner shell wall 234 and the shroud flange 292 and/or the shroud plate 294. A portion of the shroud guide 295 proximate the inlet body inlet plane 248 extends parallel to the inlet body inner shell second flange 232. A shroud inlet 296 (e.g., aperture, window, hole, etc.) is formed between the shroud plate 294, the shroud flange 292, the shroud guide 295, the inlet body inner shell second flange 232 (e.g., around the inlet body inner shell second flange aperture 293, etc.), and the inlet body outer mounting shell inner surface 230 and/or the inlet body outer mounting shell inner mounting surface 278. The shroud inlet 296 receives exhaust gas and provides exhaust gas into the shroud assembly 290, and therefore around the injection aperture 286. This exhaust gas assists (e.g., aids, etc.) propulsion of the reductant towards the diverter 260. The shroud guide 295 directs a portion of the exhaust gas flowing between the inlet body inner shell wall 234 and the inlet body outer transfer shell inner surface 236 into the shroud inlet 296. The shroud assembly 290 also includes a shroud outlet 297 formed between the shroud flange 292 and the shroud plate 294. The injection assist portion of the first portion of the exhaust gas exits the shroud assembly 290 via the shroud outlet 297 (e.g., after the reductant has been provided into the exhaust gas, etc.).

The inlet body outer transfer shell 216 includes an inlet body outer transfer shell outlet 298 (e.g., aperture, opening, etc.). The inlet body outer transfer shell outlet 298 extends through the inlet body outer transfer shell inner surface 236 and is adjacent the inlet body inner shell wall 234. In various embodiments, the inlet body outer transfer shell outlet 298 is elliptical. In other embodiments, the inlet body outer transfer shell outlet 298 is circular, square, rectangular, or otherwise similarly shaped.

The inlet body inner shell 226 also includes an inlet body inner shell outlet 300 (e.g., aperture, opening, etc.). The inlet body inner shell outlet 300 extends through the inlet body inner shell wall 234 and is adjacent the inlet body outer transfer shell outlet 298. In various embodiments, the inlet body inner shell outlet 300 and the inlet body outer transfer shell outlet 298 are concentric (e.g., concentric ellipses, concentric circles, etc.). In various embodiments, the inlet body inner shell outlet 300 is elliptical. In other embodiments, the inlet body inner shell outlet 300 is circular, square, rectangular, or otherwise similarly shaped.

The reductant delivery system body 201 also includes an outer transfer tube 302 (e.g., conduit, pipe, connector, etc.). The outer transfer tube 302 is coupled to the inlet body outer transfer shell 216 around the inlet body outer transfer shell outlet 298. The outer transfer tube 302 includes an outer transfer tube straight portion 304 and an outer transfer tube curved portion 306. The outer transfer tube straight portion 304 is contiguous with the outer transfer tube curved portion 306 and separated from the inlet body outer transfer shell 216 by the outer transfer tube curved portion 306. The outer transfer tube curved portion 306 gradually curves from the outer transfer tube straight portion 304 and towards the inlet body outer transfer shell 216 so as to facilitate a flush mating of the outer transfer tube curved portion 306 against the inlet body outer transfer shell 216 (e.g., due to a rounded shape of the inlet body outer transfer shell 216, etc.).

The outer transfer tube straight portion 304 is centered on an outer transfer tube center axis 308. The outer transfer tube center axis 308 extends through the inlet body outer transfer shell outlet 298 and intersects the inlet body inner shell 226. In various embodiments, the outer transfer tube straight portion 304 has an elliptical cross-section along a plane that is orthogonal to the inlet body inlet plane 248, intersects the outer transfer tube center axis 308, and intersects the reductant delivery system body bisecting plane 252. In other embodiments, the outer transfer tube straight portion 304 has a circular, square, rectangular, or otherwise similarly shaped cross-section along a plane that is orthogonal to the inlet body inlet plane 248, intersects the outer transfer tube center axis 308, and intersects the reductant delivery system body bisecting plane 252.

The outer transfer tube center axis 308 is separated from the reductant delivery system body bisecting plane 252 by a first separation angle $\varphi_1$ along a plane parallel to the inlet body inlet plane 248. In some embodiments, the $\varphi_1$ is approximately equal to 33° (e.g., 33.6°, etc.). In various embodiments, the $\varphi_1$ is less than 50°.

The reductant delivery system body 201 also includes an inner transfer tube 310 (e.g., conduit, pipe, connector, etc.). The inner transfer tube 310 is coupled to the inlet body inner shell 226 around the inlet body inner shell outlet 300. The inner transfer tube 310 extends within the outer transfer tube 302 (e.g., the inner transfer tube 310 is partially contained within the outer transfer tube 302, the inner transfer tube 310 is nested within the outer transfer tube 302, etc.). The inner transfer tube 310 includes an inner transfer tube straight portion 312 and an inner transfer tube curved portion 314. The inner transfer tube straight portion 312 is contiguous with the inner transfer tube curved portion 314 and separated from the inlet body inner shell 226 by the inner transfer tube curved portion 314. The inner transfer tube curved portion 314 gradually curves from the inner transfer tube straight portion 312 and towards the inlet body inner shell 226 so as to facilitate a flush mating of the inner transfer tube curved portion 314 against the inlet body inner shell 226 (e.g., due to a rounded shape of the inlet body inner shell 226, etc.).

The inner transfer tube straight portion 312 is centered on an inner transfer tube center axis 316. The inner transfer tube center axis 316 extends through the inlet body inner shell outlet 300 and intersects the inlet body inner shell 226. In various embodiments, the inner transfer tube straight portion 312 has an elliptical cross-section along a plane that is orthogonal to the inlet body inlet plane 248, intersects the inner transfer tube center axis 316, and intersects the reductant delivery system body bisecting plane 252. In other embodiments, the inner transfer tube straight portion 312 has a circular, square, rectangular, or otherwise similarly shaped cross-section along a plane that is orthogonal to the inlet body inlet plane 248, intersects the inner transfer tube center axis 316, and intersects the reductant delivery system body bisecting plane 252. In various embodiments, the inner transfer tube center axis 316 is coincident with the outer transfer tube center axis 308.

The inner transfer tube center axis 316 is separated from the reductant delivery system body bisecting plane 252 by a second separation angle $\varphi_2$ along a plane parallel to the inlet body inlet plane 248. In various embodiments, the $\varphi_2$ is less than approximately equal to 50°. In some embodiments, the $\varphi_1$ is approximately equal to the $\varphi_2$. In various embodiments, the $\varphi_1$ and/or the $\varphi_2$ is approximately equal to between 20° and 60°, inclusive (e.g., 19°, 20°, 25°, 37°, 40°, 45°, 50°, 60°, 61°, etc.).

In an example embodiment, the outer transfer tube straight portion 304 has an elliptical cross-section (along a plane that is orthogonal to the inlet body inlet plane 248, intersects the outer transfer tube center axis 308, and intersects the reductant delivery system body bisecting plane 252) with a semi-major axis of $P_1$ and a semi-minor axis of $Q_1$ and the inner transfer tube straight portion 312 has an elliptical cross-section (along a plane that is orthogonal to the inlet body inlet plane 248, intersects the inner transfer tube center axis 316, and intersects the reductant delivery system body bisecting plane 252) with a semi-major axis of $P_2$ and a semi-minor axis of $Q_2$. In various embodiments, $$P_2 = K * P_1 \quad (1)$$

$$Q_2 = K * Q_1 \quad (2)$$

the $P_2$ is a product of the $P_1$ and a factor K, and the $Q_2$ is a product of the $Q_1$ and the K. In these embodiments, an annular elliptical space between the inner transfer tube straight portion 312 and the outer transfer tube straight portion 304 is formed that creates an approximately constant distance between the inner transfer tube straight portion 312 and the outer transfer tube straight portion 304 (e.g., along a perimeter of the inner transfer tube straight portion 312, etc.).

The outer transfer tube straight portion 304 is coupled to an outlet body shell 318 (e.g., body, frame, etc.) of an outlet body 320 (e.g., shell, frame, assembly, etc.) of the reductant delivery system body 201. Specifically, the outer transfer tube straight portion 304 is coupled to the outlet body shell 318 around an outlet body shell inlet 322 (e.g., aperture, opening, etc.). In various embodiments, the inlet body 204 is only coupled to the outlet body 320 through the outer transfer tube 302. The outlet body shell inlet 322 extends through an outlet body shell inner surface 324 (e.g., face, etc.) of the outlet body shell 318. In various embodiments, the outlet body shell inlet 322 is elliptical. In other embodiments, the outlet body shell inlet 322 is circular, square, rectangular, or otherwise similarly shaped.

The relationship between the outlet body shell inlet 322, the inlet body outer transfer shell outlet 298, and the inlet body inner shell outlet 300 causes the reductant delivery system 200 to be generally Z-shaped or generally S-shaped. This shape enables the exhaust gas to travel for a longer period of time within the outer transfer tube 302 and the inner transfer tube 310 for the same distance between the inlet body 204 and the outlet body 320 (e.g., between a center point of the inlet body 204 and a center point of the outlet body 320, etc.) than if the outlet body shell inlet 322, the inlet body outer transfer shell outlet 298, and the inlet body inner shell outlet 300 were arranged so that the reductant delivery system was generally B-shaped or generally I-shaped.

The outlet body 320 does not include an inner shell similar to the inlet body inner shell 226, a dividing plate similar to the dividing plate 238, or a diverter similar to the diverter 260. Rather than being coupled to an inner shell of the outlet body 320, the inner transfer tube straight portion 312 is not coupled to the outlet body 320. The inner transfer tube straight portion 312 does not extend substantially extend into the outlet body shell 318 (e.g., a portion of the inner transfer tube straight portion 312 that is positioned within the outlet body shell 318 has a maximum length that is less than 5% of a diameter of the outlet body shell 318, etc.). In this way, the inner transfer tube straight portion 312 does not create an impedance to flow within the outlet body shell 318 (e.g., flow swirling within the outlet body shell 318, etc.).

The outlet body 320 also includes an outlet body outlet 326 (e.g., opening, aperture, etc.). The outlet body outlet 326 is configured to provide exhaust gas to the exhaust gas conduit system 104. In some embodiments, the reductant delivery system 200 is positioned upstream of the SCR catalyst member 108 such that the SCR catalyst member 108 receives exhaust gas from the outlet body outlet 326.

The outlet body 320 also includes an outlet body coupler 328 (e.g., body, etc.). The outlet body coupler 328 borders the outlet body outlet 326. The outlet body coupler 328 is coupled to the exhaust gas conduit system 104 around the outlet body outlet 326. In various embodiments, the outlet body coupler 328 is circular.

The outlet body 320 also includes a perforated plate 330 (e.g., wall, flange, etc.). The perforated plate 330 extends across a diameter of the outlet body shell 318. The perforated plate 330 includes a perforated plate coupling surface 332 (e.g., face, etc.). In various embodiments, the perforated plate coupling surface 332 is disposed along a circle. In other embodiments, the perforated plate coupling surface 332 is disposed along an ellipse.

The perforated plate 330 also includes a plurality of perforated plate perforations 334 (e.g., apertures, openings, holes, etc.). The perforated plate 330 is coupled to the outlet body shell 318 such that exhaust gas flowing from the outlet body outlet 326 first passes through the perforated plate 330 via one of the perforated plate perforations 334 (e.g., such that none of the exhaust gas can bypass the perforated plate 330, etc.).

In various embodiments, the outlet body 320 also includes at least one flow guide. Each of the flow guides may be coupled to the perforated plate 330 and/or the outlet body shell inner surface 324. Each of the flows guides extends within the outlet body shell 318. In some embodiments, the flow guides are coupled to both the perforated plate 330 and the outlet body shell inner surface 324. The flow guides may further increase uniformity of the flow of the exhaust gas from the outlet body outlet 326.

In operation, the exhaust gas flows into the inlet body inlet 206 (e.g., from the exhaust gas conduit system 104, etc.). As is described herein, the exhaust gas flowing through the reductant delivery system 200 is variously directed, diverted, and split so as to facilitate enhanced mixing and decomposition of reductant into the exhaust gas and mitigate impingement of reductant on various surfaces of the reductant delivery system 200. In these ways, the reductant delivery system 200 can be more desirable than other systems which do not include similar mechanisms for enhancing mixing and decomposition of reductant into the exhaust gas and mitigating impingement of reductant (e.g., due to additional cleaning of reductant deposits in these systems, etc.).

A first portion of the exhaust gas flows between the inlet body outer mounting shell inner surface 230 and the inlet body inner shell 226 (e.g., between the inlet body outer mounting shell inner surface 230 and the inlet body inner shell first flange 228, between the inlet body outer mounting shell inner surface 230 and the inlet body inner shell second flange 232, etc.) and subsequently along the inlet body outer mounting shell projecting surface 276. Prior to flowing along the inlet body outer mounting shell projecting surface 276, some of the first portion of the exhaust gas flows against the inlet body outer mounting shell dividing surface 274 and/or the dividing plate 238 (e.g., the dividing plate panel 254, etc.). The first portion of the exhaust gas then flows between the dividing plate 238, the inlet body inner shell 226, and the diverter 260 and into the inner transfer tube curved portion 314 via the inlet body inner shell outlet 300.

Prior to flowing into the inner transfer tube curved portion 314, an injection assist portion of the first portion of the exhaust gas flows into the shroud assembly 290 via the shroud inlet 296 (e.g., between the shroud plate 294, the shroud flange 292, and the inlet body outer mounting shell projecting surface 276, etc.). The injection assist portion flows between the inlet body inner shell first flange 228, the inlet body inner shell second flange 232, the inlet body outer mounting shell inner surface 230, and the inlet body outer transfer shell inner surface 236 is directed into the shroud inlet 296 by the shroud guide 295. The injection assist portion of the exhaust gas flows around the injection aperture 286 and is provided with reductant via the injection aperture 286 (e.g., from the injector 120 and/or the dosing module 112). The exhaust gas then exits the shroud assembly 290 via the shroud outlet 297. The injection assist portion of the exhaust gas aides in propelling the reductant out of the injection aperture 286 and towards the inner transfer tube curved portion 314. Specifically, the shroud assembly 290 protects (e.g., shields, etc.) the flow of the exhaust gas and reductant towards the inner transfer tube curved portion 314 from the flow of the exhaust gas towards the inlet body inner shell endcap 258, thereby enabling additional reductant to be provided to the inner transfer tube curved portion 314 (e.g., rather than being propelled against the inlet body inner shell endcap 258, etc.). In various embodiments, the injection assist portion may be approximately equal to 5%, 4%, 3%, 2%, or other similar values of the total exhaust flow into the inlet body inlet 206.

Also prior to flowing into the inner transfer tube curved portion 314, some of the first portion of the exhaust gas flows along the diverter base 268 and the diverter end 270. Due to the $\alpha_3$ and the $\beta_2$, the exhaust gas is provided from the diverter 260 to the inlet body inner shell 226 and towards the inner transfer tube curved portion 314.

Some of the exhaust gas flowing along the diverter end 270 flows through the diverter end 270 via the at least one diverter end aperture 272. At least some of the least one diverter end aperture 272 may be centered on an axis which intersects the inlet body inner shell outlet 300. As a result, the exhaust gas flowing through the at least one diverter end aperture 272 may be directed towards the inlet body inner shell outlet 300 (e.g., as opposed to being directed towards the inlet body inner shell wall 234, etc.). This exhaust gas may assist in propelling exhaust gas within the inlet body inner shell 226 toward the inner transfer tube curved portion 314.

A second portion of the exhaust gas, different from the exhaust gas that flows along the inlet body outer mounting shell projecting surface 276, flows through the dividing plate panel slot 256. The dividing plate panel slot 256 is positioned adjacent the inner transfer tube curved portion 314. In some embodiments, the dividing plate panel slot 256 is centered on an axis that extends over the inlet body inner shell outlet 300 (e.g., such that the dividing plate panel slot 256 overlaps the inlet body inner shell outlet 300, etc.). The exhaust gas exiting the dividing plate panel slot 256 is propelled into the inner transfer tube curved portion 314. The dividing plate panel slot 256 functions to reduce a backpressure of the reductant delivery system 200, thereby making the reductant delivery system 200 more desirable. Additionally, the dividing plate panel slot 256 provides relatively hot exhaust gas (e.g., exhaust gas that has not been mixed with reductant, etc.) along the inlet body inner shell wall 234 proximate the diverter base 268. As a result, impingement of reductant on the inlet body inner shell wall 234 proximate the diverter base 268 is mitigated.

A third portion of the exhaust gas flows between the inlet body inner shell first flange 228, the inlet body inner shell second flange 232, the inlet body outer mounting shell inner surface 230, and the inlet body outer transfer shell inner surface 236. The exhaust gas flows along the inlet body inner shell 226, thereby heating the inlet body inner shell 226 and mitigating impingement of reductant on the inlet body inner shell 226. The exhaust gas flows around the inner transfer tube curved portion 314 and is propelled into the outer transfer tube curved portion 306. This third portion of the exhaust gas may not be provided with reductant and may be relatively hot compared to the exhaust gas flowing within the inner transfer tube curved portion 314 (e.g., because the exhaust gas flowing within the inner transfer tube curved portion 314 has been provided with reductant) and the inner transfer tube straight portion 312 (e.g., because the exhaust gas flowing within the inner transfer tube straight portion 312 has been provided with reductant).

The exhaust gas flowing within the inner transfer tube curved portion 314 flows to the inner transfer tube straight portion 312 and the exhaust gas flowing within the outer transfer tube curved portion 306 flows to the outer transfer tube straight portion 304. The exhaust gas flowing within the outer transfer tube curved portion 306 heats the inner transfer tube curved portion 314 and/or the inner transfer tube straight portion 312, thereby mitigating impingement of reductant on the inner transfer tube curved portion 314 and/or the inner transfer tube straight portion 312. Similarly, the exhaust gas flowing within the outer transfer tube straight portion 304 heats the inner transfer tube curved portion 314 and/or the inner transfer tube straight portion 312, thereby mitigating impingement of reductant on the inner transfer tube curved portion 314 and/or the inner transfer tube straight portion 312. The inner transfer tube curved portion 314 prohibits exhaust gas from passing through the inner transfer tube curved portion 314 to the outer transfer tube curved portion 306 and/or the outer transfer tube straight portion 304. The inner transfer tube straight portion 312 prohibits exhaust gas from passing through the inner transfer tube straight portion 312 to the outer transfer tube curved portion 306 and/or the outer transfer tube straight portion 304. In various embodiments, the portion of the exhaust gas flowing within the inner transfer tube 310 may be approximately equal to 70%, 67%, 65%, 63%, 60%, or other similar values of the total exhaust flow into the inlet body inlet 206. In various embodiments, the portion of the exhaust gas flowing within the outer transfer tube 302 (e.g., between the inner transfer tube 310 and the outer transfer tube 310, etc.) may be approximately equal to 40%, 37%, 35%, 32%, 30%, 25%, or other similar values of the total exhaust flow into the inlet body inlet 206.

The exhaust gas flowing within the inner transfer tube straight portion 312 flows into the outlet body shell 318 and the exhaust gas flowing within the outer transfer tube straight portion 304 flows into the outlet body shell 318. The exhaust gas flowing within the outlet body shell 318 may flow along the outlet body shell inner surface 324 so as to cause the exhaust gas to swirl. This swirl may be enhanced by the $\varphi_1$ and the $\varphi_2$ which effectively cause the exhaust gas to flow into the outlet body shell 318 semi-tangentially (e.g., as opposed to axially, as opposed to radially, etc.). The exhaust gas flowing within the outlet body shell 318 then flows through the perforated plate 330 and exits the outlet body 320 via the outlet body outlet 326. By flowing through the perforated plate 330, the flow of the exhaust gas may be straightened, thereby enhancing the uniformity of the exhaust gas that flows towards components of the exhaust gas aftertreatment system 100 (e.g., the SCR catalyst member 108, etc.) that are downstream of the reductant delivery system 200.

Figure 3:
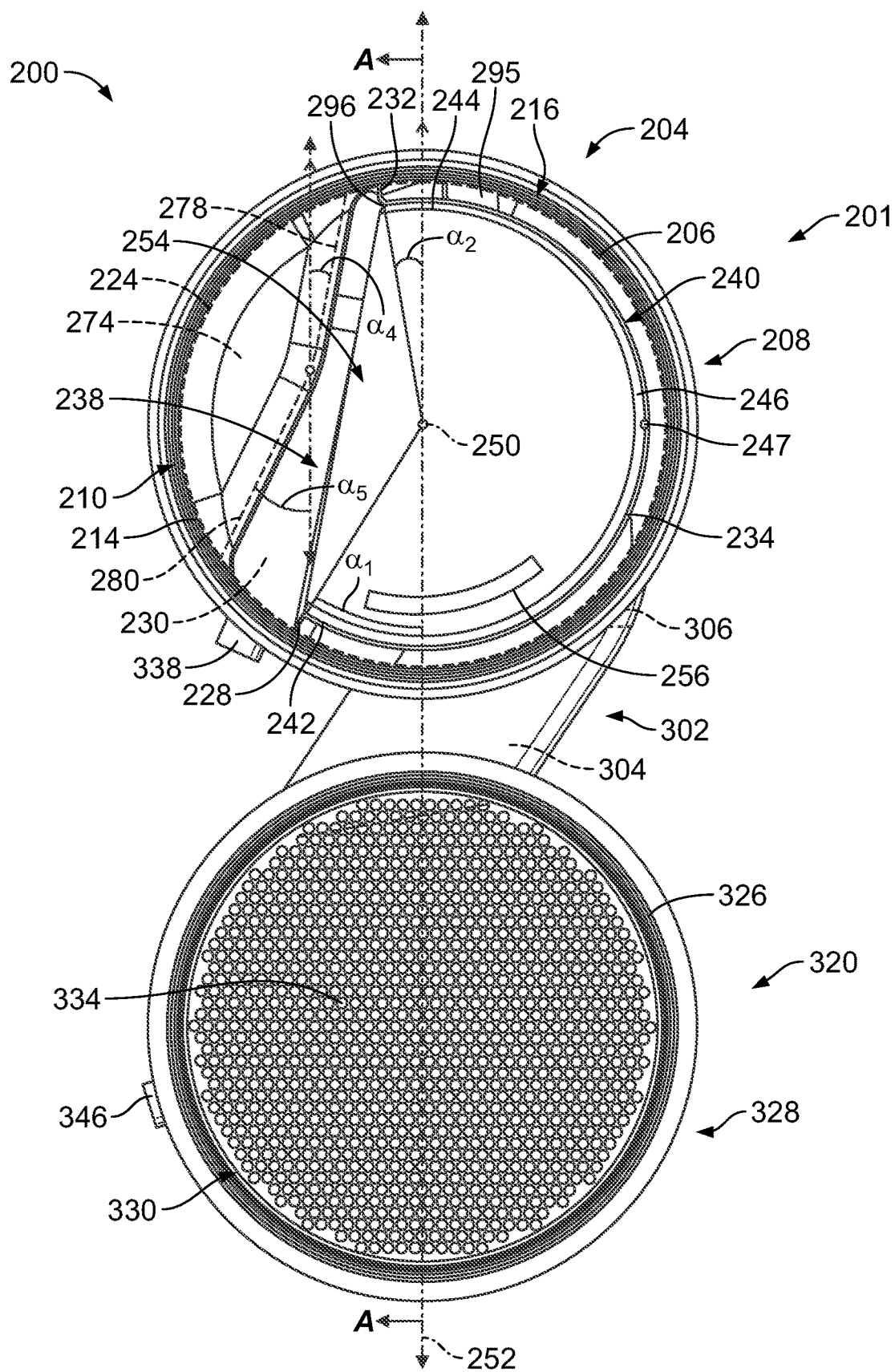
FIG. 3 is a front view of the reductant delivery system shown in FIG. 2.
Figure 4:
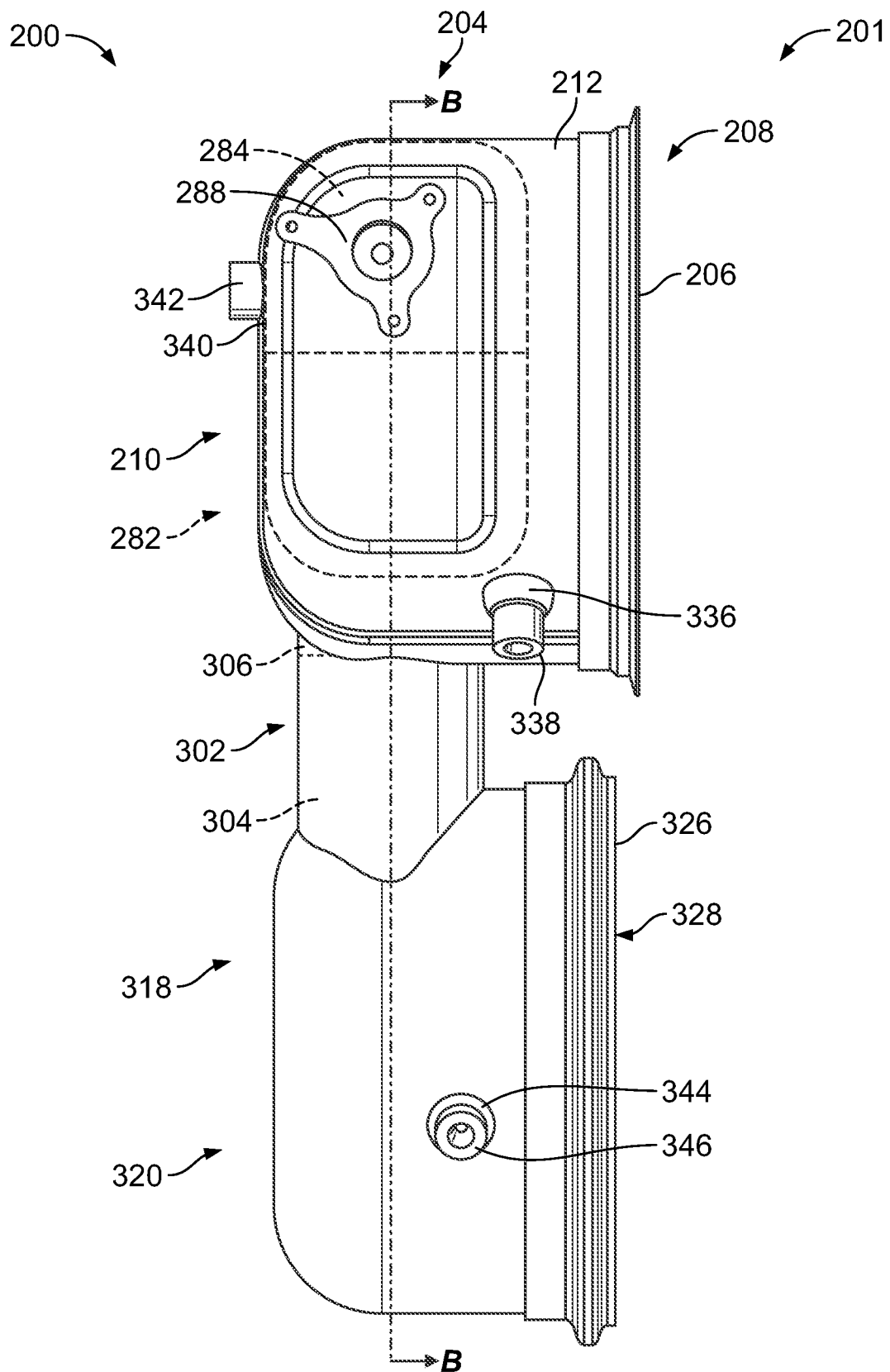
FIG. 4 is a side view of the reductant delivery system shown in FIG. 2.

The inlet body outer mounting shell 210 also includes an inlet body outer mounting shell first sensor coupling mount 336 (e.g., projection, etc.). The inlet body outer mounting shell first sensor coupling mount 336 extends (e.g., projects, protrudes, etc.) from an outer surface of the inlet body outer mounting shell 210. As shown in FIG. 3, the inlet body outer mounting shell first sensor coupling mount 336 is centered on an axis that extends between the inlet body outer mounting shell diverting surface 280 and the inlet body inner shell 226. Additionally, the inlet body outer mounting shell first sensor coupling mount 336 is located upstream of the injection aperture 286. As a result, a sensor coupled to the inlet body outer mounting shell first sensor coupling mount 336 is subjected to a relatively high flow rate of the exhaust gas (e.g., due to being positioned between the inlet body outer mounting shell diverting surface 280 and the inlet body inner shell 226, etc.) and is substantially isolated from reductant, thereby enabling accurate measurements to be obtained by the sensor (e.g., because the sensor is not covered in reductant deposits, etc.). In other embodiments, the inlet body outer mounting shell first sensor coupling mount 336 may be located in other locations.

The reductant delivery system 200 also includes an inlet body outer mounting shell temperature sensor coupling 338. The inlet body outer mounting shell temperature sensor coupling 338 is coupled to the inlet body outer mounting shell first sensor coupling mount 336 and configured to be coupled to the upstream temperature sensor 138. The inlet body outer mounting shell first sensor coupling mount 336 is configured to provide exhaust gas to the upstream temperature sensor 138 and/or to receive the upstream temperature sensor 138 such that the upstream temperature sensor 138 extends into the inlet body outer mounting shell 210. The upstream temperature sensor 138 may determine a temperature of the exhaust gas prior to the exhaust gas flowing into the outer transfer tube curved portion 306 or the inner transfer tube curved portion 314.

Figure 5:
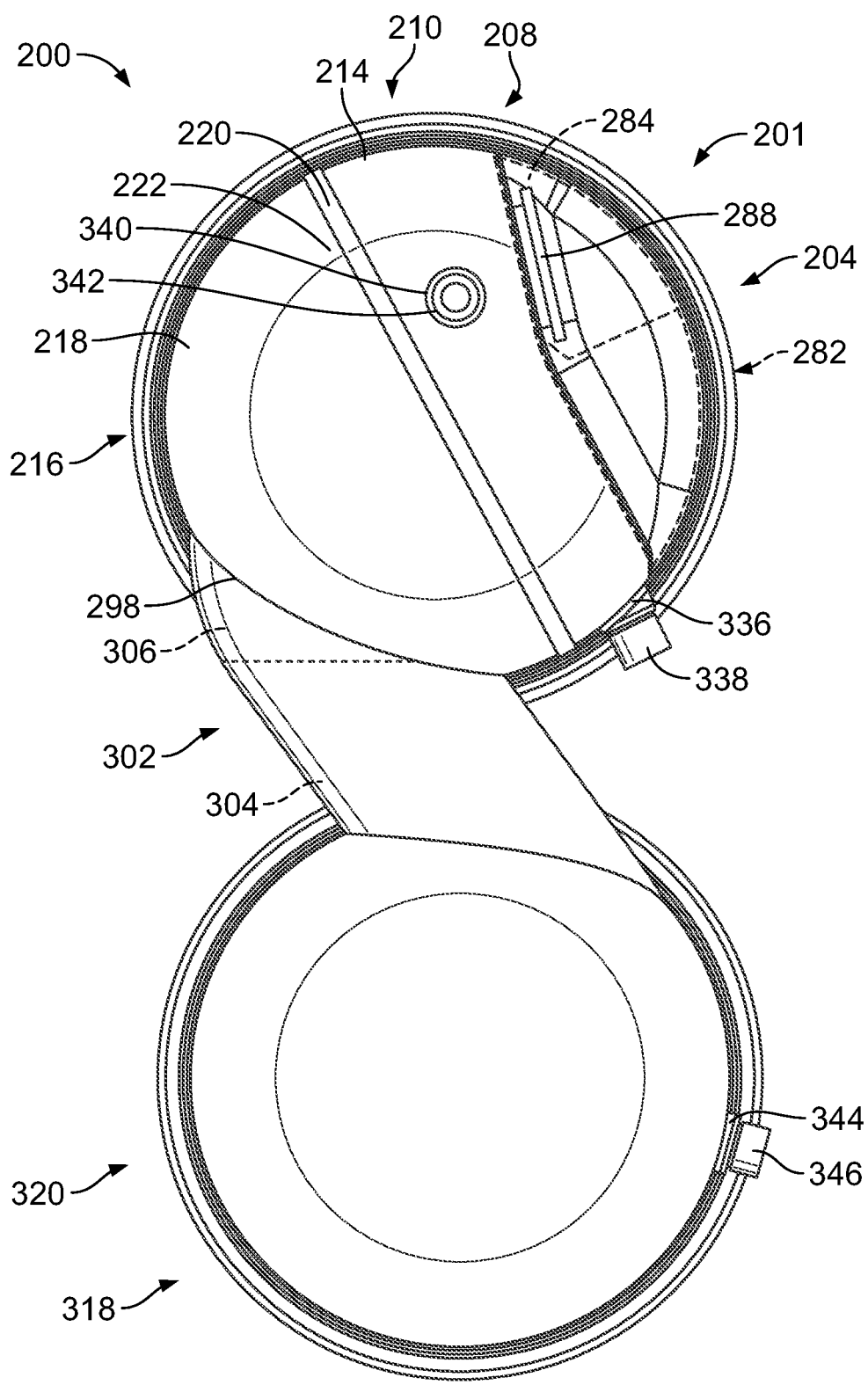
FIG. 5 is a rear view of the reductant delivery system shown in FIG. 2.
Figure 6:
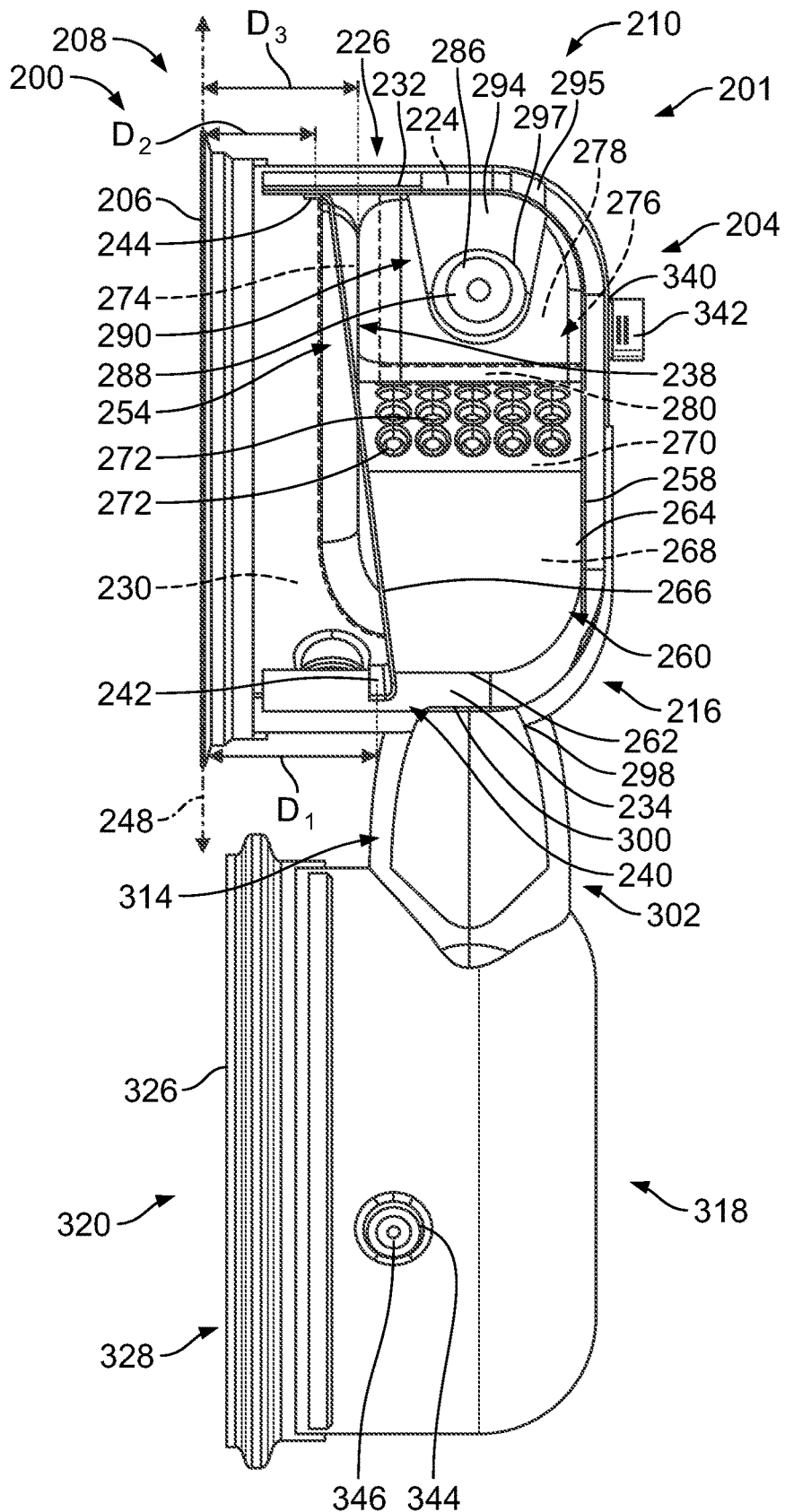
FIG. 6 is a side view of the reductant delivery system shown in FIG. 3, taken along plane A-A.

The inlet body outer mounting shell 210 also includes an inlet body outer mounting shell second sensor coupling mount 340 (e.g., projection, etc.). The inlet body outer mounting shell second sensor coupling mount 340 extends (e.g., projects, protrudes, etc.) from an outer surface of the inlet body outer mounting shell 210. As shown in FIG. 5, the inlet body outer mounting shell second sensor coupling mount 340 is centered on an axis that extends through the inlet body inlet 206 (e.g., orthogonally to the inlet body inlet plane 248, etc.). The reductant delivery system 200 also includes an inlet body outer mounting shell pressure sensor coupling 342. The inlet body outer mounting shell pressure sensor coupling 342 is coupled to the inlet body outer mounting shell second sensor coupling mount 340 and configured to be coupled to the pressure sensor 140. The inlet body outer mounting shell second sensor coupling mount 340 is configured to provide exhaust gas to the pressure sensor 140 and/or to receive the pressure sensor 140 such that the pressure sensor 140 extends into the inlet body outer mounting shell 210. The pressure sensor 140 may determine a pressure of the exhaust gas prior to the exhaust gas flowing into the outer transfer tube curved portion 306 or the inner transfer tube curved portion 314.

The outlet body shell 318 also includes an outlet body shell sensor coupling mount 344 (e.g., projection, etc.). The outlet body shell sensor coupling mount 344 extends (e.g., projects, protrudes, etc.) from an outer surface of the outlet body shell 318. The outlet body shell sensor coupling mount 344 is centered on an axis that extends across the outlet body shell 318. The outlet body shell sensor coupling mount 344 may be located such that the outlet body shell sensor coupling mount 344 is opposite a target location on the outlet body shell inner surface 324 (e.g., depending on an application of the reductant delivery system 200, depending on space claim requirements for the reductant delivery system 200, etc.).

The reductant delivery system 200 also includes an outlet body shell temperature sensor coupling 346. The outlet body shell temperature sensor coupling 346 is coupled to the outlet body shell sensor coupling mount 344 and configured to be coupled to the downstream temperature sensor 142. The outlet body shell temperature sensor coupling 346 is configured to provide exhaust gas to the downstream temperature sensor 142 and/or to receive the downstream temperature sensor 142 such that the downstream temperature sensor 142 extends into the outlet body shell 318. The downstream temperature sensor 142 may determine a temperature of the exhaust gas after the exhaust gas flows into the outlet body shell (e.g., via the outer transfer tube straight portion 304, via the inner transfer tube straight portion 312, etc.).

In various embodiments, an inner transfer tube straight portion outlet 348 of the inner transfer tube straight portion 312 is curved along a radius of the outlet body shell 318. In this way, the inner transfer tube straight portion 312 may be located so as to not substantially impede a swirl flow created within the outlet body shell 318.

Rather than the inlet body outer mounting shell 210 and the inlet body outer transfer shell 216 being separate components that are coupled together, it is understood that the inlet body outer mounting shell 210 and the inlet body outer transfer shell 216 may also be structurally integrated (e.g., formed from a one-piece construction, etc.), in some embodiments.

IV. Second Example Reductant Delivery System

FIGS. 11-19 illustrate a reductant delivery system 1100, according to an example embodiment. The reductant delivery system 1100 is the reductant delivery system 102 in various embodiments. The reductant delivery system 1100 is similar to the reductant delivery system 200. The reductant delivery system 1100 includes a reductant delivery system body 1101 (e.g., shell, frame, assembly, etc.). The reductant delivery system body 1101 includes an inlet body 1104 (e.g., shell, frame, assembly, etc.). The inlet body 1104 includes an inlet body inlet 1106 (e.g., opening, aperture, etc.). The inlet body inlet 1106 is configured to receive exhaust gas from the exhaust gas conduit system 104. In some embodiments, the reductant delivery system 1100 is positioned downstream of the particulate filter 106 such that the inlet body inlet 1106 receives exhaust gas from the particulate filter 106.

The inlet body 1104 includes an inlet body coupler 1108 (e.g., body, etc.). The inlet body coupler 1108 borders the inlet body inlet 1106. The inlet body coupler 1108 is coupled to the exhaust gas conduit system 104 around the inlet body inlet 1106. In various embodiments, the inlet body coupler 1108 is circular.

The inlet body 1104 also includes an inlet body outer mounting shell 1110 (e.g., body, frame, etc.). The inlet body outer mounting shell 1110 includes an inlet body outer mounting shell coupling surface 1112 (e.g., face, etc.). In various embodiments, the inlet body outer mounting shell coupling surface 1112 is disposed along a circular arc. The inlet body outer mounting shell coupling surface 1112 is in contact with an inlet body coupler coupling surface 1114 (e.g., face, etc.) of the inlet body coupler 1108. In various embodiments, the inlet body coupler coupling surface 1114 is disposed along a circular arc. In various embodiments, the inlet body outer mounting shell coupling surface 1112 is coupled to the inlet body coupler coupling surface 1114.

The inlet body 1104 also includes an inlet body outer transfer shell 1116 (e.g., body, frame, etc.). The inlet body outer transfer shell 1116 includes an inlet body outer transfer shell coupling surface 1118 (e.g., face, etc.) that is in contact with the inlet body coupler coupling surface 1114. In various embodiments, the inlet body outer transfer shell coupling surface 1118 is disposed along a circular arc. In some embodiments, the inlet body outer mounting shell coupling surface 1112 is disposed along a circular arc having a first radius and the inlet body outer transfer shell coupling surface 1118 is disposed along a circular arc having the first radius. In some embodiments, the inlet body outer mounting shell coupling surface 1112 and the inlet body outer transfer shell coupling surface 1118 are both disposed along the same circle. In various embodiments, the inlet body outer transfer shell coupling surface 1118 is coupled to the inlet body coupler coupling surface 1114.

The inlet body outer mounting shell 1110 includes an inlet body outer mounting shell mating surface 1120 (e.g., face, etc.). The inlet body outer mounting shell mating surface 1120 is contiguous with the inlet body outer mounting shell coupling surface 1112. Similarly, the inlet body outer transfer shell 1116 includes an inlet body outer transfer shell mating surface 1122 (e.g., face, etc.). The inlet body outer transfer shell mating surface 1122 is contiguous with the inlet body outer transfer shell coupling surface 1118. In various embodiments, the inlet body outer mounting shell mating surface 1120 is coupled to the inlet body outer transfer shell mating surface 1122 such that the inlet body outer mounting shell 1110 is coupled to the inlet body outer transfer shell 1116. Collectively, the inlet body outer mounting shell 1110 and the inlet body outer transfer shell 1116 define an inlet body cavity 1124 (e.g., void, region, space, etc.).

The inlet body 1104 also includes an inlet body inner shell 1126 (e.g., body, frame, etc.). The inlet body inner shell 1126 is contained within the inlet body cavity 1124. The inlet body inner shell 1126 does not include flanges similar to the inlet body inner shell first flange 228 or the inlet body inner shell second flange 232. The inlet body inner shell 1126 is separated from an inlet body outer mounting shell inner surface 1128 (e.g., face, etc.) of the inlet body outer mounting shell 1110 and an inlet body outer transfer shell inner surface 1130 (e.g., face, etc.) of the inlet body outer transfer shell 1116. In some embodiments, the inlet body outer mounting shell inner surface 1128 is opposite the inlet body outer mounting shell coupling surface 1112. In some embodiments, the inlet body outer transfer shell inner surface 1130 is opposite the inlet body outer transfer shell mating surface 1122.

The inlet body inner shell 1126 includes an inlet body inner shell wall 1132. The inlet body inner shell 1126 also includes an inlet body inner shell endcap surface 1134. The inlet body inner shell endcap surface 1134 is contiguous with the inlet body inner shell wall 1132. The inlet body inner shell endcap surface 1134 is separated from the inlet body outer transfer shell mating surface 1122 and the inlet body outer mounting shell inner surface 1128. As is explained in more detail herein, the inlet body inner shell endcap surface 1134 is shaped to match the inlet body outer mounting shell inner surface 1128 and the inlet body outer transfer shell inner surface 1130, such that a gap between the inlet body inner shell endcap surface 1134 and the inlet body outer mounting shell inner surface 1128 is substantially constant along the inlet body outer mounting shell inner surface 1128 and is approximately equal to a gap between the inlet body inner shell endcap surface 1134 and the inlet body outer transfer shell inner surface 1130 that is substantially constant along the inlet body outer transfer shell inner surface 1130. In some embodiments, this gap is approximately equal to 8.5 mm.

The inlet body 1104 also includes a dividing plate 1136 (e.g., flange, wall, etc.). The dividing plate 1136 is at least partially contained within the inlet body inner shell wall 1132. The dividing plate 1136 includes a dividing plate coupling surface 1138 (e.g., face, etc.). The dividing plate coupling surface 1138 is coupled to the inlet body inner shell wall 1132. In various embodiments, the dividing plate coupling surface 1138 is coupled to the inlet body inner shell wall 1132 along the length of the dividing plate coupling surface 1138 (e.g., such that flow of the exhaust gas between the dividing plate coupling surface 1138 and the inlet body inner shell wall 1132 is prohibited, etc.). In other embodiments, the dividing plate coupling surface 1138 is not coupled to the inlet body inner shell wall 1132 along the length of the dividing plate coupling surface 1138, and is instead coupled to the inlet body inner shell wall 1132 at one or more locations along the dividing plate coupling surface 1138 (e.g., such that flow of the exhaust gas between the dividing plate coupling surface 1138 and the inlet body inner shell wall 1132 is facilitated, etc.). In various embodiments, the dividing plate coupling surface 1138 is disposed along a circular arc. In other embodiments, the dividing plate coupling surface 1138 is disposed along an elliptical arc.

The inlet body inlet 1106 is disposed along an inlet body inlet plane 1140. The dividing plate coupling surface 1138 is separated from the inlet body inlet plane 1140 by a fourth distance $D_4$. In various embodiments, the $D_4$ is constant along the dividing plate coupling surface 1138 (e.g., the dividing plate coupling surface 1138 is parallel to the inlet body inlet plane 1140, etc.). In some embodiments, the $D_4$ is approximately equal to between 5 mm and 29 mm, inclusive. In one embodiment, the $D_4$ is approximately equal to 28.6 mm.

The inlet body inlet 1106 is defined by an inlet body inlet center point 1142 (e.g., centroid, etc.). The dividing plate 1136 includes a dividing plate panel 1143 (e.g., face, surface, portion, etc.). The dividing plate panel 1143 is contiguous with the dividing plate coupling surface 1138. In various embodiments, the dividing plate panel 1143 is parallel to the inlet body inlet plane 1140. In other embodiments, the dividing plate panel 1143 is angled (e.g., tilted, inclined, etc.) relative to the inlet body inlet plane 1140.

The dividing plate panel 1143 includes a dividing plate opening 1144 (e.g., aperture, etc.). The dividing plate opening 1144 is configured to receive the exhaust gas from the inlet body inlet 1106. The dividing plate opening 1144 facilitates flow of the exhaust gas through the dividing plate panel 1143 as opposed to around the dividing plate panel 1143. In various embodiments, the dividing plate opening 1144 is centered on the inlet body inlet center point 1142. The dividing plate opening 1144 may be circular, square, triangular, or otherwise similarly shaped.

The inlet body 1104 also includes a distributor tube 1146. The distributor tube 1146 may be cylindrical, a triangular prism, a square prism, a rectangular prism, or otherwise similarly shaped. The distributor tube 1146 includes a distributor tube first end 1148 that is coupled to the dividing plate panel 1143 around the dividing plate opening 1144. The distributor tube first end 1148 is configured to receive the exhaust gas from the dividing plate opening 1144. The distributor tube 1146 also includes a distributor tube second end 1150 that is coupled to the inlet body inner shell endcap surface 1134. The exhaust gas received by the distributor tube first end 1148 is passed within the distributor tube 1146 towards the distributor tube second end 1150.

The distributor tube 1146 also includes a plurality of distributor tube apertures 1152 (e.g., perforations, openings, holes, etc.). Each of the distributor tube apertures 1152 is configured to facilitate passage of the exhaust gas from the distributor tube 1146 out of the distributor tube 1146. After exiting the distributor tube 1146, the exhaust gas flows between the dividing plate 1136, the distributor tube 1146, the inlet body inner shell wall 1132, and the inlet body inner shell endcap surface 1134. In various embodiments, at least some of the distributor tube apertures 1152 are located closer to the distributor tube second end 1150 than to the distributor tube first end 1148. In some embodiments, at least a majority (e.g., more than half, all, etc.) of the distributor tube apertures 1152 are located closer to the distributor tube second end 1150 than to the distributor tube first end 1148. In various embodiments, a diameter of each of the distributor tube apertures 1152 is between ten times less than a diameter of the dividing plate opening 1144 and fifty times less than a diameter of the dividing plate opening 1144, inclusive. In some embodiments, a diameter of each of the distributor tube apertures 1152 is approximately equal to 6.35 mm. In some embodiments, a diameter of the dividing plate opening 1144 is approximately equal to 100 mm.

The dividing plate panel 1143 also includes a dividing plate window 1154 (e.g., opening, aperture, window, etc.). The dividing plate window 1154 is configured to receive the exhaust gas from the inlet body inlet 1106 separate from the dividing plate opening 1144. The dividing plate window 1154 facilitates flow of the exhaust gas through the dividing plate panel 1143 as opposed to around the dividing plate panel 1143. After exiting the dividing plate window 1154, the exhaust gas flows between the dividing plate 1136, the distributor tube 1146, the inlet body inner shell wall 1132, and the inlet body inner shell endcap surface 1134.

In an example embodiment, the dividing plate window 1154 is shaped like a truncated sector of a circle that is centered on the inlet body inlet center point 1142. When measured along the inlet body inlet plane 1140 (e.g., from the inlet body inlet center point 1142, etc.), the dividing plate window 1154 in such an embodiment has a first sector angle $S_1$. In various embodiments, the $S_1$ is approximately equal to between 20° and 90°, inclusive (e.g., 19°, 20°, 25°, 37°, 40°, 45°, 50°, 90°, 91°, etc.). The dividing plate window 1154 may be contiguous with the dividing plate opening 1144 and/or the dividing plate coupling surface 1138. Rather than being shaped like a truncated sector of a circle that is centered on the inlet body inlet center point 1142, the dividing plate window 1154 may also be shaped like a truncated sector of a circle that is not centered on the inlet body inlet center point 1142. Additionally, the dividing plate window 1154 may not be shaped like a truncated sector of a circle, and instead may be circular, square, triangular, or otherwise similarly shaped.

The inlet body 1104 also includes a separation panel 1156. The separation panel 1156 is coupled to the dividing plate panel 1143, the distributor tube 1146, the inlet body inner shell wall 1132, and the inlet body inner shell endcap surface 1134. In various embodiments, the separation panel 1156 is coupled to the dividing plate panel 1143 along the dividing plate window 1154. The separation panel 1156 functions to ensure that exhaust gas flowing between the dividing plate panel 1143, the distributor tube 1146, the inlet body inner shell wall 1132, and the inlet body inner shell endcap surface 1134 either must flow through the distributor tube 1146 via the distributor tube apertures 1152 or around the distributor tube 1146 via the dividing plate window 1154.

The distributor tube 1146 includes a distributor tube panel portion 1158 and a distributor tube transfer portion 1160, each extending between the distributor tube first end 1148 and the distributor tube second end 1150. None of the distributor tube apertures 1152 are located on the distributor tube panel portion 1158 (e.g., the distributor tube apertures 1152 are not located on the distributor tube panel portion 1158). Instead, all of the distributor tube apertures 1152 are located on the distributor tube transfer portion 1160. As a result, the exhaust gas cannot pass through the distributor tube panel portion 1158. When measured along the inlet body inlet plane 1140 (e.g., from the inlet body inlet center point 1142, etc.), the distributor tube panel portion 1158 is disposed along an arc having a first central angle $\tau_1$. As a result, the distributor tube transfer portion 1160 is disposed along an arc having a central angle equal to 360°−$\tau_1$. In various embodiments, the $\tau_1$ is approximately equal to between 20° and 200°, inclusive (e.g., 19°, 20°, 25°, 37°, 40°, 45°, 50°, 90°, 200°, 201°, etc.). In some embodiments, the $\tau_1$ is equal to or greater than the $S_1$, and the distributor tube panel portion 1158 and/or the dividing plate window 1154 are positioned such that, when viewed along the inlet body inlet plane 1140, only the distributor tube panel portion 1158 is contained within a sector of a circle that is centered on the inlet body inlet center point 1142 having a diameter equal to the diameter of the distributor tube 1146, where the sector has a sector angle equal to the $S_1$ (e.g., the distributor tube transfer portion 1160 is not contained within the sector).

The distributor tube apertures 1152 are separated from the separation panel 1156 by a third separation angle $\varphi_3$ along a plane parallel to the inlet body inlet plane 1140. In various embodiments, the $\varphi_3$ is less than 10°. When measured along the inlet body inlet plane 1140 (e.g., from the inlet body inlet center point 1142, etc.), the distributor tube apertures 1152 are distributed within a second sector angle $S_2$. In various embodiments, the $S_2$ is approximately equal to between 80° and 180°, inclusive (e.g., 79°, 80°, 90°, 100°, 140°, 145°, 150°, 180°, 181°, etc.).

The inlet body inlet 1106 is bisected by a reductant delivery system body bisecting plane 1162. The reductant delivery system body bisecting plane 1162 bisects the reductant delivery system body 1101 and intersects the inlet body inlet center point 1142.

Figure 13:
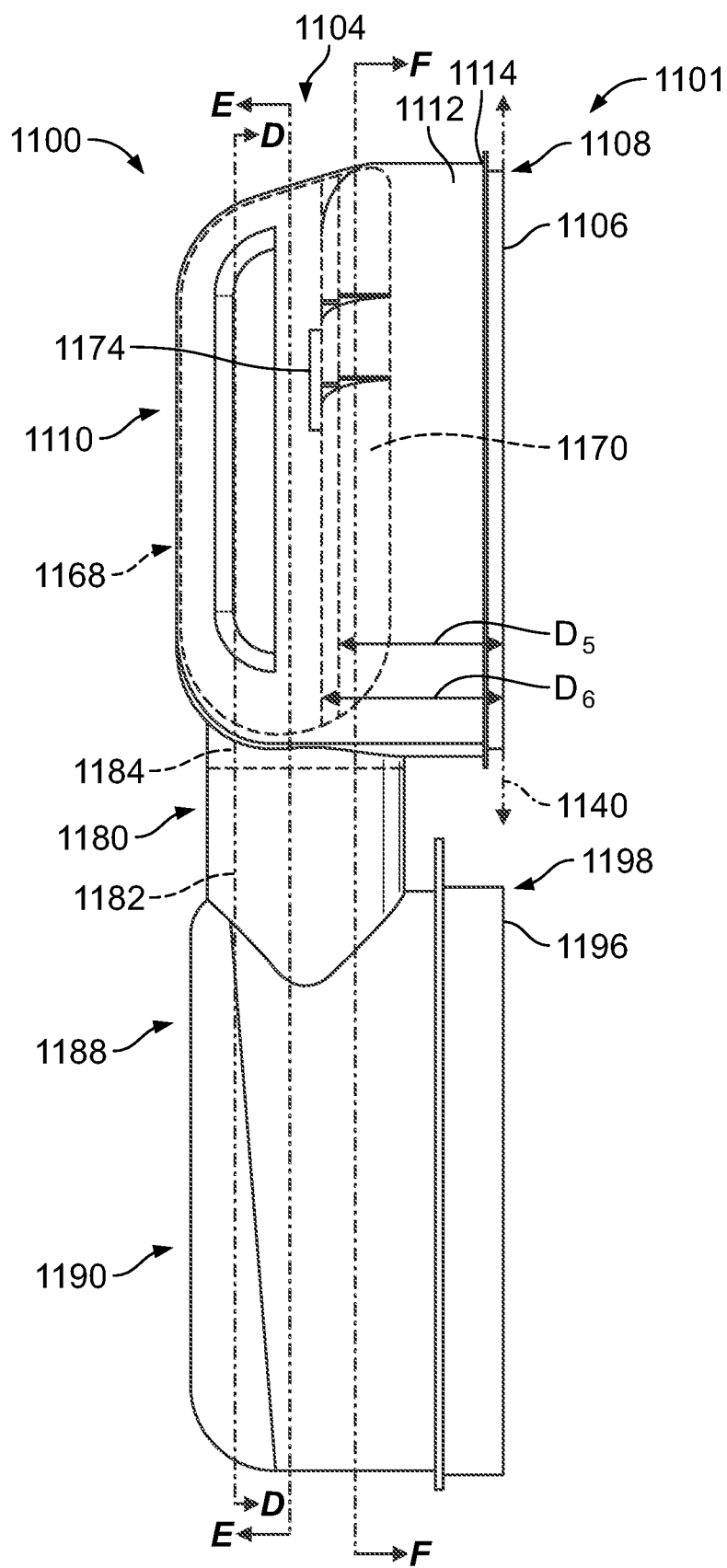
FIG. 13 is a side view of the reductant delivery system shown in FIG. 11.
Figure 14:
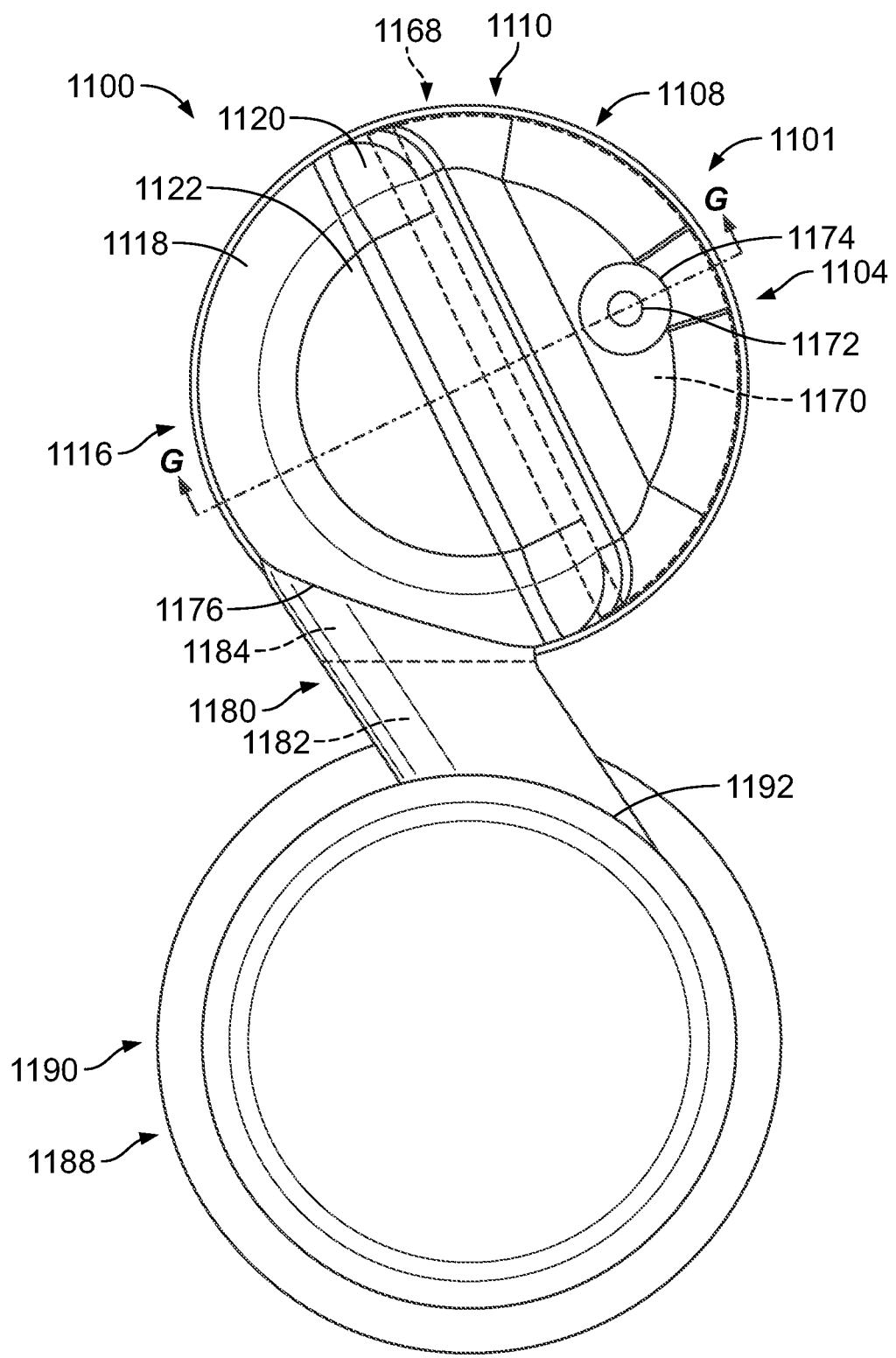
FIG. 14 is a rear view of the reductant delivery system shown in FIG. 11.
Figure 15:
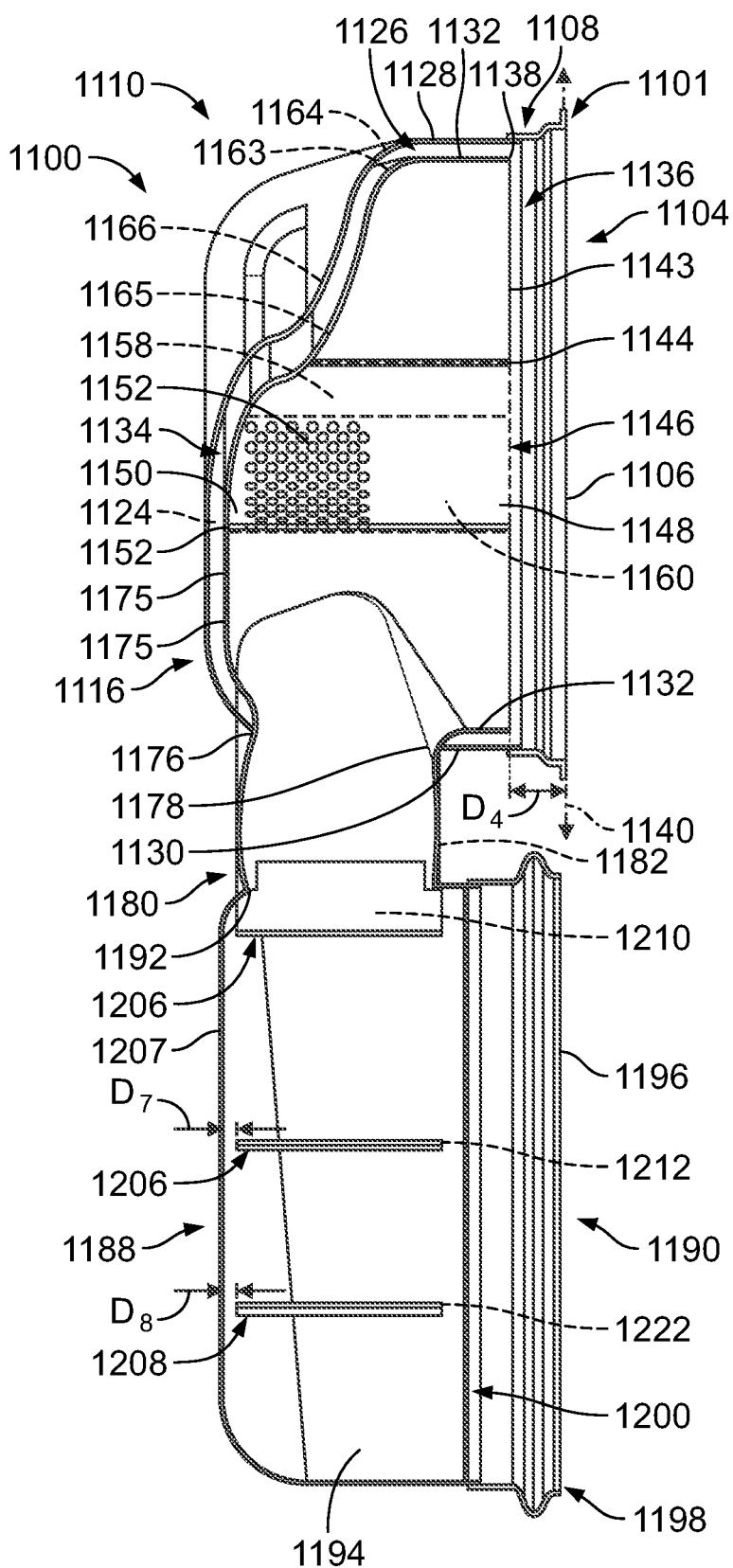
FIG. 15 is a side view of the reductant delivery system shown in FIG. 12, taken along plane C-C.
Figure 16:
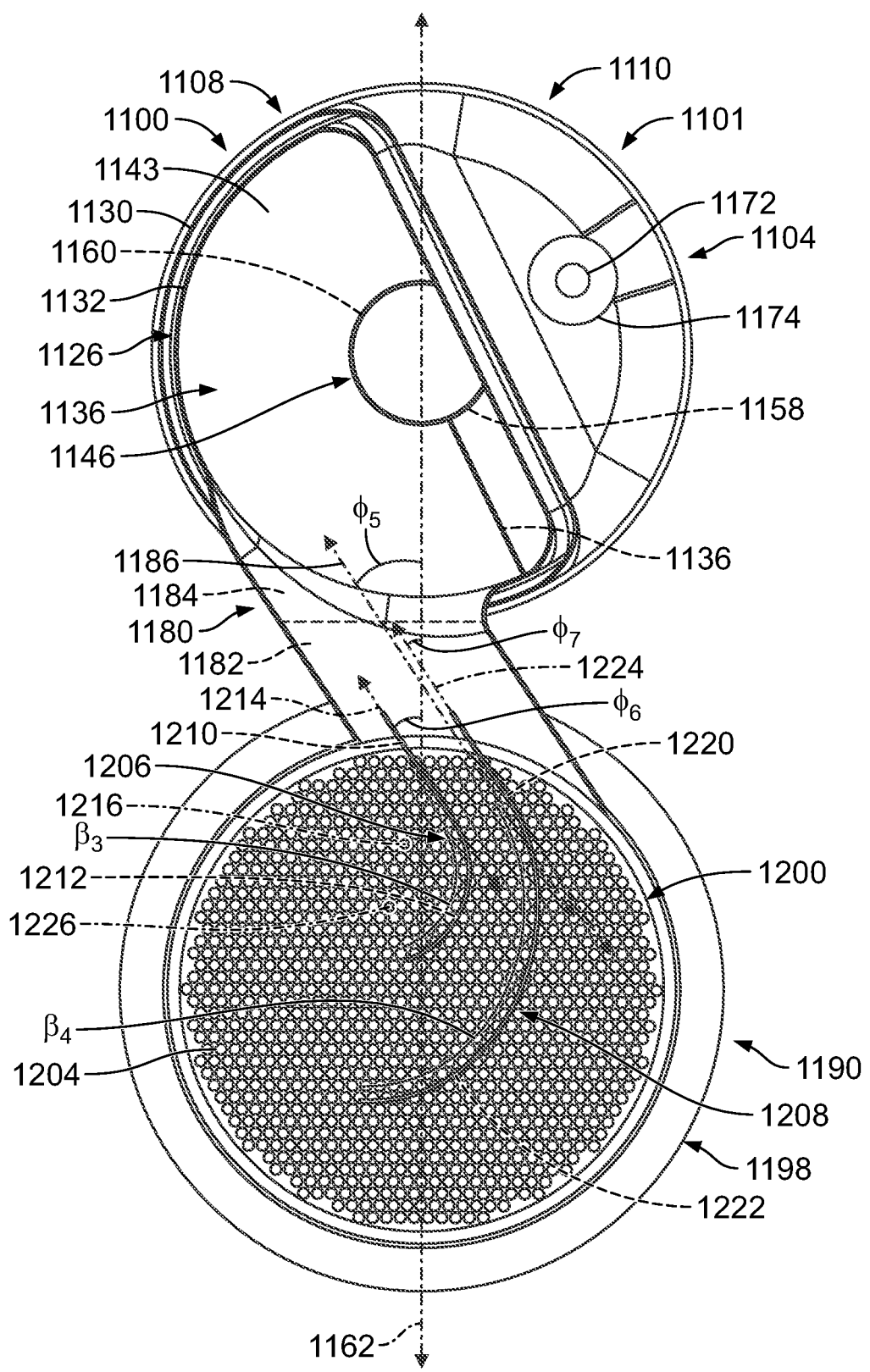
FIG. 16 is a rear view of the reductant delivery system shown in FIG. 13, taken along plane D-D.
Figure 17:
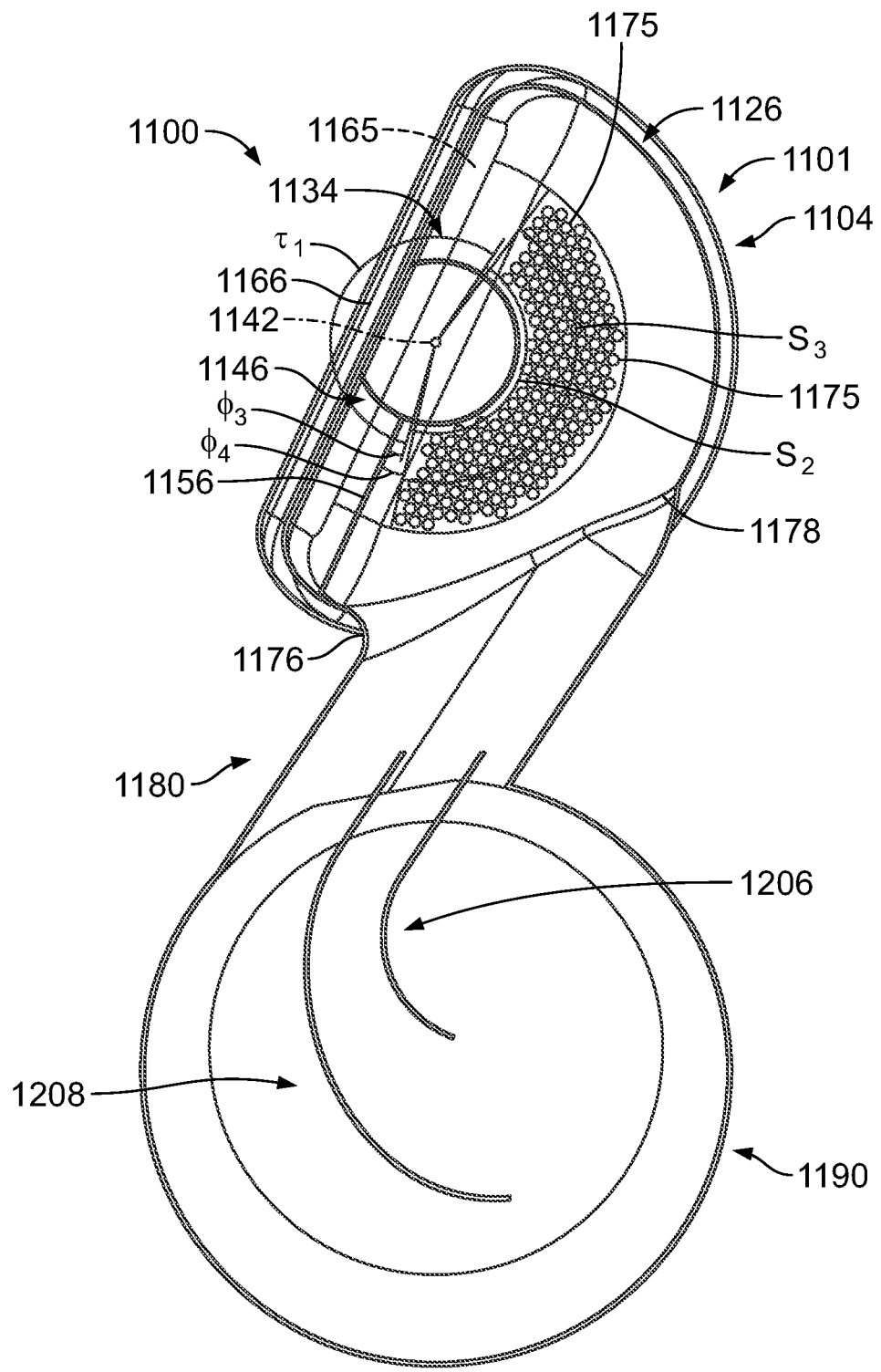
FIG. 17 is a side view of the reductant delivery system shown in FIG. 13, taken along plane E-E.
Figure 18:
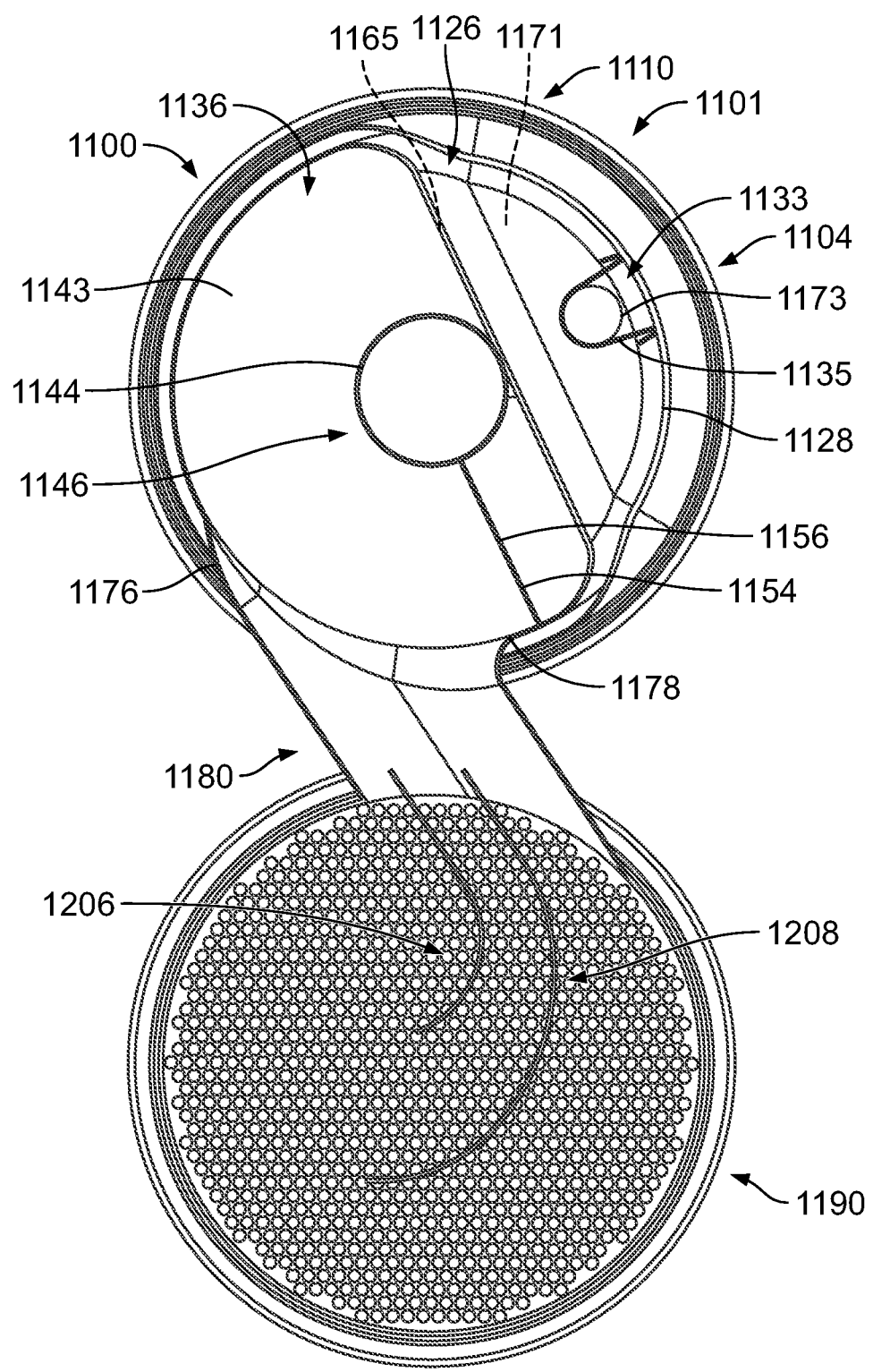
FIG. 18 is a side view of the reductant delivery system shown in FIG. 13, taken along plane F-F.
Figure 19:
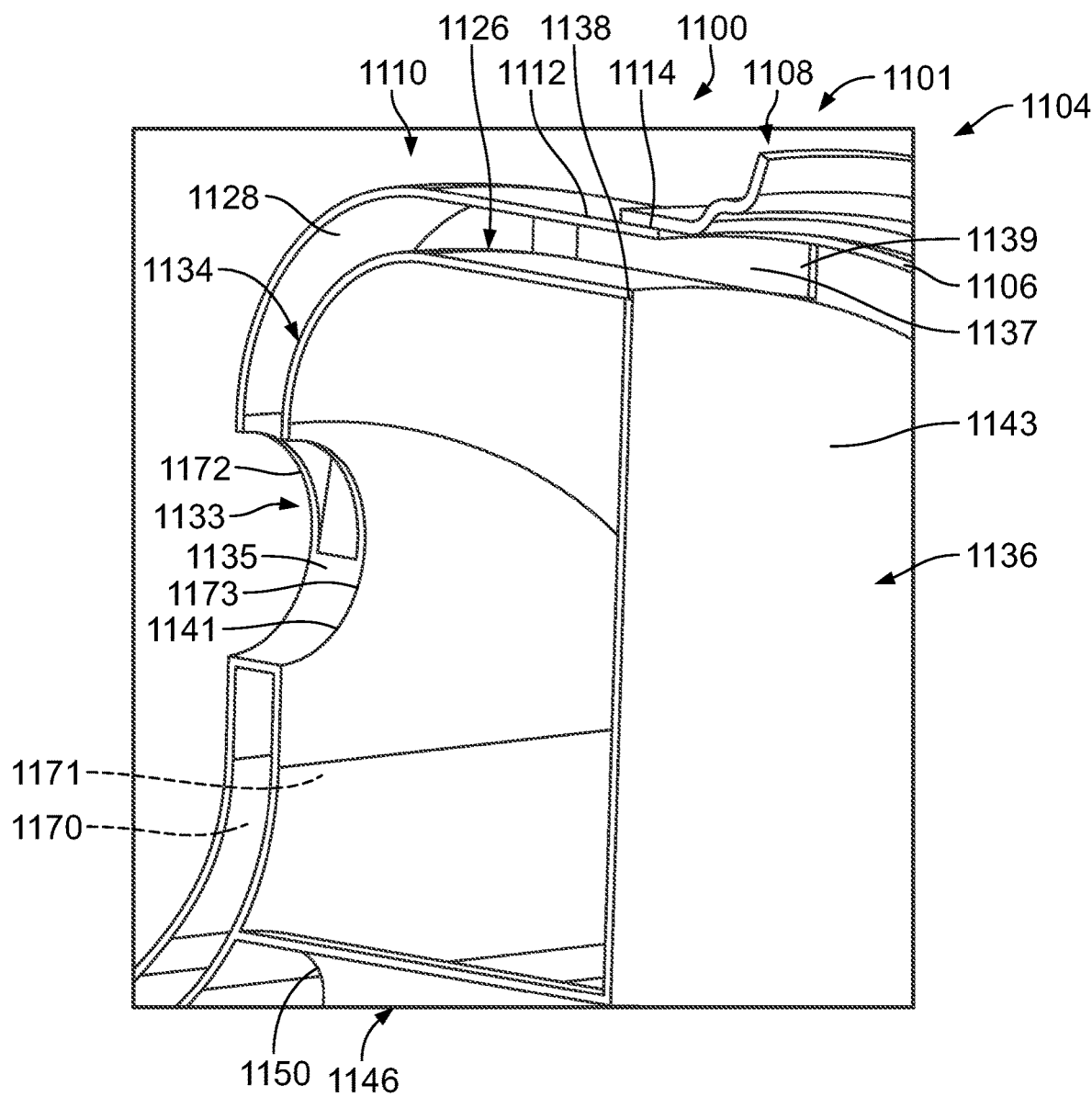
FIG. 19 is a side view of a portion of the reductant delivery system shown in FIG. 14, taken along plane G-G.
Figure 20:
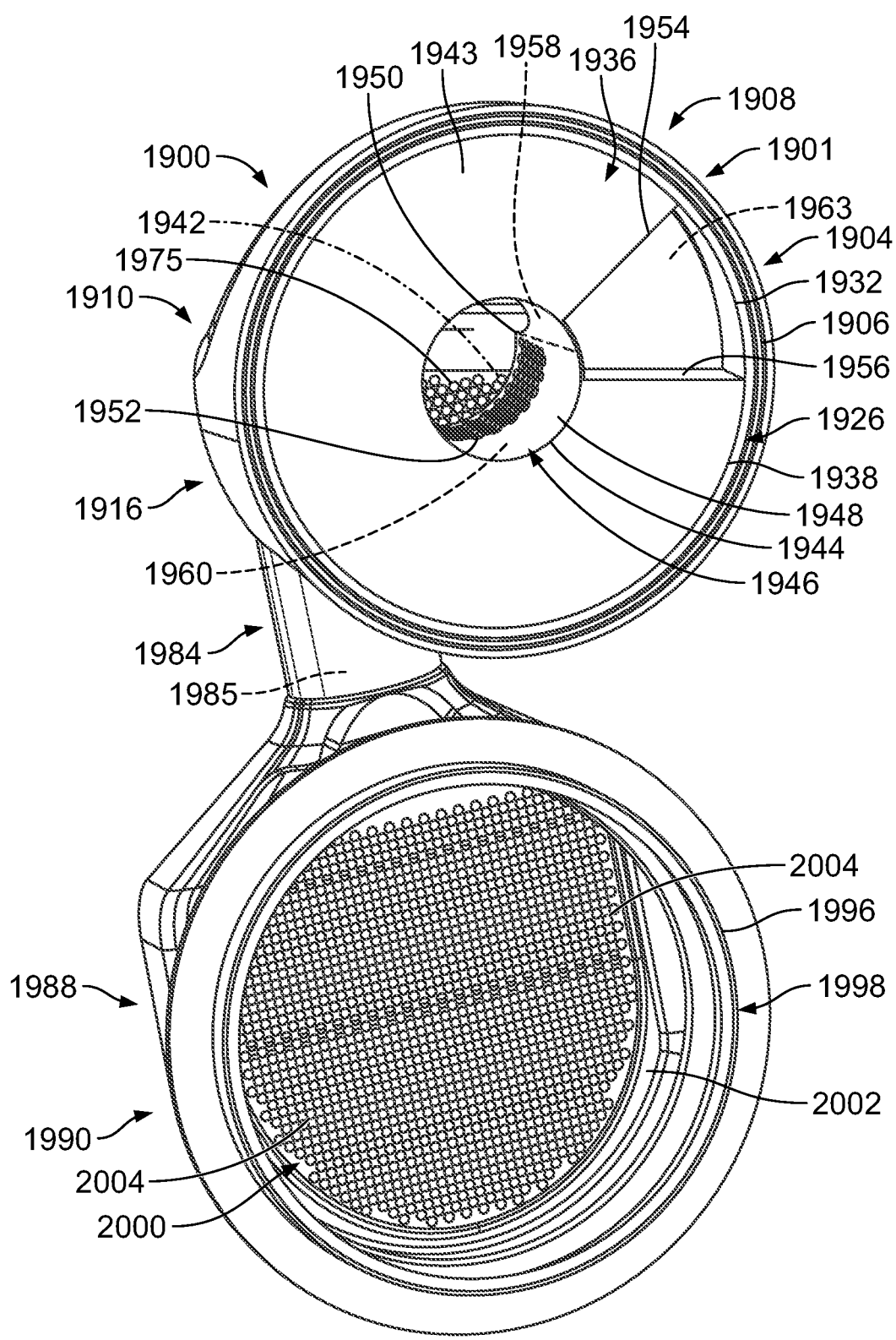
FIG. 20 is a perspective view of an example reductant delivery system for the exhaust gas aftertreatment system shown in FIG. 1.
Figure 21:
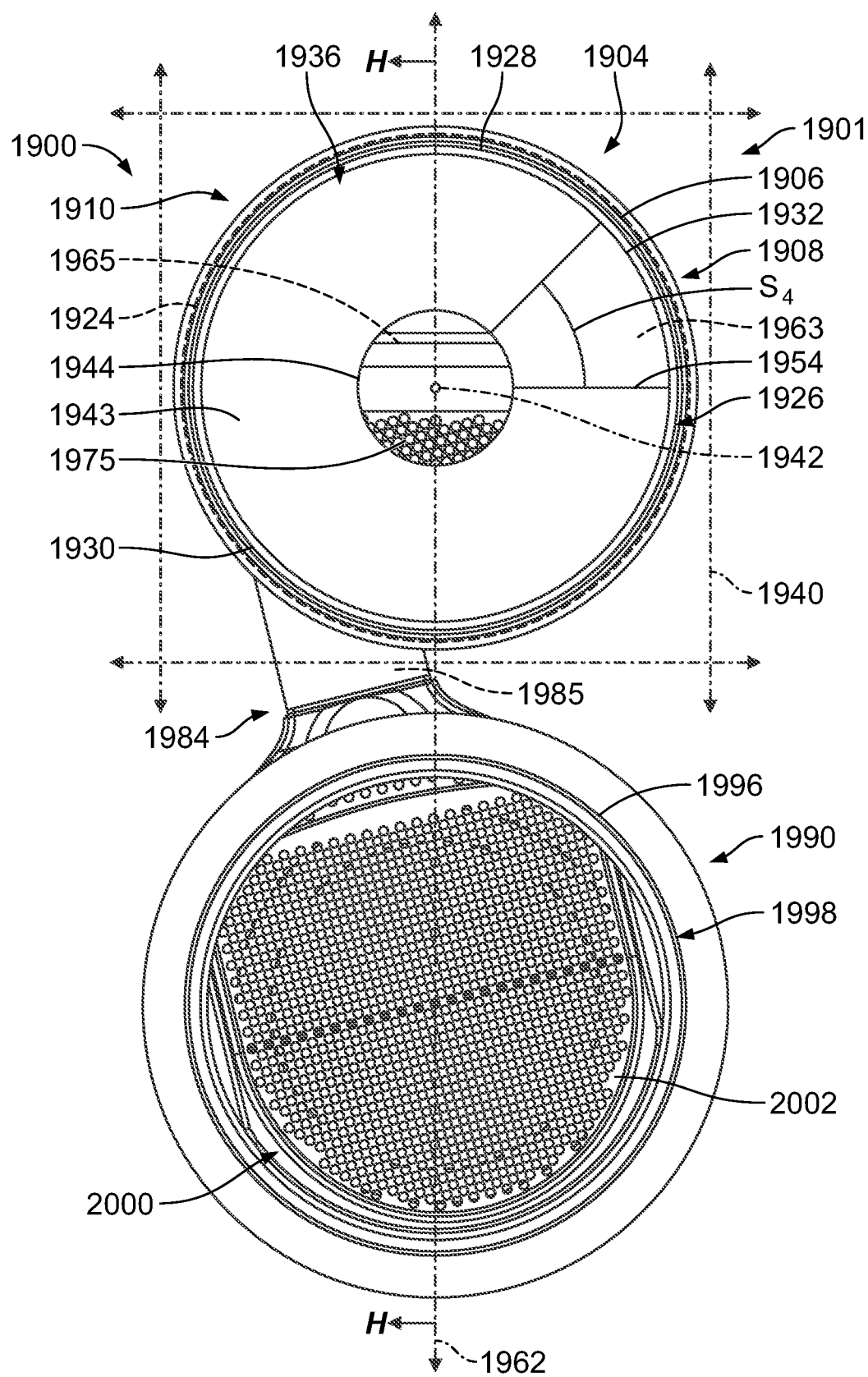
FIG. 21 is a front view of the reductant delivery system shown in FIG. 20.

The inlet body inner shell 1126 also includes an inlet body inner shell dividing surface 1163 (e.g., face, panel, etc.). The inlet body inner shell dividing surface 1163 is contiguous with the inlet body inner shell wall 1132. The inlet body inner shell dividing surface 1163 is disposed along a plane that is approximately parallel to the inlet body inlet plane 1140 and separated from the inlet body inlet plane 1140 a fifth distance $D_5$, an approximation of which is shown in FIG. 13. In various embodiments, the $D_5$ is greater than the $D_4$. In some embodiments, the $D_5$ is approximately equal to 79 mm and the $D_4$ is approximately equal to 29 mm.

The inlet body outer mounting shell 1110 also includes an inlet body outer mounting shell dividing surface 1164 (e.g., face, panel, etc.). The inlet body outer mounting shell dividing surface 1164 is contiguous with the inlet body outer mounting shell inner surface 1128. The inlet body outer mounting shell dividing surface 1164 is disposed along a plane that is approximately parallel to the inlet body inlet plane 1140 and separated from the inlet body inlet plane 1140 a sixth distance $D_6$, an approximation of which is shown in FIG. 13. The $D_6$ is greater than the $D_5$ and the inlet body outer mounting shell dividing surface 1164 is spaced apart (e.g., separated, etc.) from the inlet body inner shell dividing surface 1163. In various embodiments, the $D_6$ is greater than the $D_4$.

The inlet body inner shell 1126 also includes an inlet body inner shell projecting surface 1165 (e.g., face, panel, etc.). The inlet body inner shell projecting surface 1165 is contiguous with the inlet body inner shell wall 1132 and the inlet body inner shell dividing surface 1163.

The inlet body outer mounting shell 1110 also includes an inlet body outer mounting shell projecting surface 1166 (e.g., face, panel, etc.). The inlet body outer mounting shell projecting surface 1166 is contiguous with the inlet body outer mounting shell inner surface 1128 and the inlet body outer mounting shell dividing surface 1164. The inlet body outer mounting shell projecting surface 1166 is spaced apart from the inlet body inner shell projecting surface 1165.

The inlet body outer mounting shell 1110 also includes an inlet body outer mounting shell recess 1168 (e.g., depression, etc.). The inlet body outer mounting shell recess 1168 is opposite the inlet body outer mounting shell dividing surface 1164. The inlet body outer mounting shell recess 1168 includes an inlet body outer mounting shell outer mounting surface 1170 (e.g., face, panel, etc.). The inlet body outer mounting shell outer mounting surface 1170 is opposite the inlet body outer mounting shell dividing surface 1164.

The inlet body inner shell 1126 also includes an inlet body inner shell recess 1167 (e.g., depression, etc.). The inlet body inner shell recess 1167 is opposite the inlet body inner shell dividing surface 1163. The inlet body inner shell recess 1167 includes an inlet body inner shell outer mounting surface 1171 (e.g., face, panel, etc.). The inlet body inner shell outer mounting surface 1171 is opposite the inlet body inner shell dividing surface 1163. The inlet body inner shell outer mounting surface 1171 is spaced apart from the inlet body outer mounting shell outer mounting surface 1170.

The inlet body outer mounting shell 1110 includes an outer injection aperture 1172 (e.g., opening, hole, window, etc.). The outer injection aperture 1172 extends through the inlet body outer mounting shell outer mounting surface 1170 and the inlet body outer mounting shell dividing surface 1164. The outer injection aperture 1172 is configured to receive an injection mount 1174 (e.g., mounting plate, etc.). The injection mount 1174 is configured to be coupled to the dosing module 112 and/or the injector 120 such that the dosing module 112 and/or the injector 120 is positioned to provide reductant into the inlet body outer mounting shell 1110 via the outer injection aperture 1172. The inlet body outer mounting shell outer mounting surface 1170 is generally disposed along a plane and facilitates coupling of the injection mount 1174 at various orientations, thereby accommodating various configurations of the dosing module 112 and/or the injector 120.

The inlet body inner shell 1126 also includes an inner injection aperture 1173. The inner injection aperture 1173 extends through the inlet body inner shell outer mounting surface 1171 and the inlet body inner shell dividing surface 1163. The inner injection aperture 1173 is configured to receive the injection mount 1174 (e.g., mounting plate, etc.). The injection mount 1174 extends between the inlet body outer mounting shell 1110 and the inlet body inner shell 1126. The inlet body inner shell outer mounting surface 1171 is generally disposed along a plane and facilitates coupling of the injection mount 1174 at various orientations, thereby accommodating various configurations of the dosing module 112 and/or the injector 120.

The inlet body inner shell 1126 also includes a plurality of inlet body inner shell apertures 1175 (e.g., perforations, openings, holes, etc.) disposed on the inlet body inner shell endcap surface 1134 around the distributor tube 1146. Each of the inlet body inner shell apertures 1175 is configured to facilitate passage of the exhaust gas from between the inlet body inner shell 1126 and the inlet body outer mounting shell 1110 and/or between the inlet body inner shell 1126 and the inlet body outer transfer shell 1116 into the inlet body inner shell 1126.

The inlet body inner shell apertures 1175 are separated from the separation panel 1156 by a fourth separation angle $\varphi_4$ along a plane parallel to the inlet body inlet plane 1140. In various embodiments, the $\varphi_4$ is greater than 10°. The $\varphi_4$ may be greater than the $\varphi_3$. In some embodiments, the $\varphi_4$ is approximately equal to between 90% of the $\varphi_3$ and 110% of the $\varphi_3$. When measured along the inlet body inlet plane 1140 (e.g., from the inlet body inlet center point 1142, etc.), the inlet body inner shell apertures 1175 are distributed within a third sector angle $S_3$. In various embodiments, the $S_3$ is approximately equal to between 80° and 180°, inclusive (e.g., 79°, 80°, 90°, 100°, 140°, 145°, 150°, 180°, 181°, etc.).

At least some of the inlet body inner shell apertures 1175 are aligned with at least some of the distributor tube apertures 1152. In various embodiments, at least some of the inlet body inner shell apertures 1175 are located closer to the distributor tube second end 1150 than the inlet body inner shell wall 1132. In various embodiments, a diameter of each of the inlet body inner shell apertures 1175 is between ten times less than a diameter of the dividing plate opening 1144 and fifty times less than a diameter of the dividing plate opening 1144, inclusive. In some embodiments, a diameter of each of the inlet body inner shell apertures 1175 is approximately equal to 6.35 mm.

In various embodiments, the inlet body 1104 also includes a shroud assembly 1133 (e.g., cover, etc.). The shroud assembly 1133 is similar to the shroud assembly 290. The shroud assembly 1133 is disposed along the inlet body outer mounting shell dividing surface 1164 and configured to partially shield the reductant provided through the outer injection aperture 1172 from exhaust gas. The shroud assembly 1133 includes a shroud flange 1135 (e.g., band, etc.). The shroud flange 1135 is similar to the shroud flange 292. The shroud flange 1135 is coupled to the inlet body outer mounting shell dividing surface 1164 around the outer injection aperture 1172 and the inlet body inner shell outer mounting surface 1171 around the inner injection aperture 1173. The shroud flange 1135 extends around the inner injection aperture 1173. The shroud assembly 1133 also includes a shroud guide 1137 (e.g., fin, wall, barrier, etc.). The shroud guide 1137 is similar to the shroud guide 295. The shroud guide 1137 may be coupled to the inlet body inner shell 1126 and the shroud flange 1135. A shroud inlet 1139 (e.g., aperture, window, hole, etc.) similar to the shroud inlet 296 may be formed between the shroud flange 1135, the shroud guide 1137, the inlet body inner shell 1126 (e.g., around the inner injection aperture 1173, etc.), and the inlet body outer mounting shell inner surface 1128. The shroud inlet 1139 may receive exhaust gas and provide exhaust gas into the shroud assembly 1133, and therefore around the inner injection aperture 1173. This exhaust gas may assist propulsion of the reductant away from the separation panel 1156 and around the distributor tube 1146. The shroud guide 1137 may direct a portion of the exhaust gas flowing between the inlet body inner shell wall 1132 and the inlet body outer mounting shell inner surface 1128 and/or between the inlet body inner shell wall 1132 and the inlet body outer transfer shell inner surface 1128 into the shroud inlet 1139. The shroud assembly 1133 also includes a shroud outlet 1141. The shroud outlet 1141 is similar to the shroud outlet 297. The shroud outlet 1141 is the inner injection aperture 1173. The exhaust gas may exit the shroud assembly 1133 via the shroud outlet 1141 (e.g., after the reductant has been provided into the exhaust gas, etc.). The shroud assembly 1133 may also include a shroud plate (e.g., cover, etc.) similar to the shroud plate 294. The shroud plate may be coupled to the shroud flange 1135 and the inlet body inner shell 1126 while not being coupled to the inlet body outer mounting shell 1110.

The inlet body outer transfer shell 1116 includes an inlet body outer transfer shell outlet 1176 (e.g., aperture, opening, etc.). The inlet body outer transfer shell outlet 1176 extends through the inlet body outer transfer shell inner surface 1130 and is adjacent the inlet body inner shell wall 1132. In various embodiments, the inlet body outer transfer shell outlet 1176 is elliptical. In other embodiments, the inlet body outer transfer shell outlet 1176 is circular, square, rectangular, or otherwise similarly shaped.

The inlet body inner shell 1126 also includes an inlet body inner shell outlet 1178 (e.g., aperture, opening, etc.). The inlet body inner shell outlet 1178 extends through the inlet body inner shell wall 1132 and is adjacent the inlet body outer transfer shell outlet 1176. In various embodiments, the inlet body inner shell outlet 1178 and the inlet body outer transfer shell outlet 1176 are concentric (e.g., concentric ellipses, concentric circles, etc.). In various embodiments, the inlet body inner shell outlet 1178 is elliptical. In other embodiments, the inlet body inner shell outlet 1178 is circular, square, rectangular, or otherwise similarly shaped.

The reductant delivery system body 1101 also includes an inner transfer tube 1180 (e.g., conduit, pipe, connector, etc.). The inner transfer tube 1180 is coupled to the inlet body outer transfer shell 1116 around the inlet body outer transfer shell outlet 1176. The inner transfer tube 1180 includes an inner transfer tube straight portion 1182 and an inner transfer tube curved portion 1184. The inner transfer tube straight portion 1182 is contiguous with the inner transfer tube curved portion 1184 and separated from the inlet body outer transfer shell 1116 by the inner transfer tube curved portion 1184. The inner transfer tube curved portion 1184 gradually curves from the inner transfer tube straight portion 1182 and towards the inlet body outer transfer shell 1116 so as to facilitate a flush mating of the inner transfer tube curved portion 1184 against the inlet body outer transfer shell 1116 (e.g., due to a rounded shape of the inlet body outer transfer shell 1116, etc.).

The inner transfer tube straight portion 1182 is centered on an inner transfer tube center axis 1186. The inner transfer tube center axis 1186 extends through the inlet body outer transfer shell outlet 1176 and the inlet body inner shell outlet 1178, and intersects the inlet body inner shell 1126. In various embodiments, the inner transfer tube straight portion 1182 has an elliptical cross-section along a plane that is orthogonal to the inlet body inlet plane 1140, intersects the inner transfer tube center axis 1186, and intersects the reductant delivery system body bisecting plane 1162. In other embodiments, the inner transfer tube straight portion 1182 has a circular, square, rectangular, or otherwise similarly shaped cross-section along a plane that is orthogonal to the inlet body inlet plane 1140, intersects the inner transfer tube center axis 1186, and intersects the reductant delivery system body bisecting plane 1162.

The inner transfer tube center axis 1186 is separated from the reductant delivery system body bisecting plane 1162 by a fifth separation angle $\varphi_5$ along a plane parallel to the inlet body inlet plane 1140. In various embodiments, the $\varphi_5$ is less than approximately equal to 50°. In various embodiments, the $\varphi_5$ is approximately equal to 33°.

The inner transfer tube straight portion 1182 is coupled to an outlet body shell 1188 (e.g., body, frame, etc.) of an outlet body 1190 (e.g., shell, frame, assembly, etc.) of the reductant delivery system body 1101. Specifically, the inner transfer tube straight portion 1182 is coupled to the outlet body shell 1188 around an outlet body shell inlet 1192 (e.g., aperture, opening, etc.). In various embodiments, the inlet body 1104 is only coupled to the outlet body 1190 through the inner transfer tube 1180. The outlet body shell inlet 1192 extends through an outlet body shell inner surface 1194 (e.g., face, etc.) of the outlet body shell 1188. In various embodiments, the outlet body shell inlet 1192 is elliptical. In other embodiments, the outlet body shell inlet 1192 is circular, square, rectangular, or otherwise similarly shaped.

The relationship between the outlet body shell inlet 1192, the inlet body outer transfer shell outlet 1176, and the inlet body inner shell outlet 1178 causes the reductant delivery system 1100 to be generally Z-shaped or generally S-shaped. This shape enables the exhaust gas to travel for a longer period of time within the inner transfer tube 1180 for the same distance between the inlet body 1104 and the outlet body 1190 (e.g., between a center point of the inlet body 1104 and a center point of the outlet body 1190, etc.) than if the outlet body shell inlet 1192, the inlet body outer transfer shell outlet 1176, and the inlet body inner shell outlet 1178 were arranged so that the reductant delivery system was generally B-shaped or generally I-shaped.

The outlet body 1190 does not include an inner shell similar to the inlet body inner shell 1126, or a dividing plate similar to the dividing plate 1136. However, the outlet body 1190 includes an outlet body outlet 1196 (e.g., opening, aperture, etc.). The outlet body outlet 1196 is configured to provide exhaust gas to the exhaust gas conduit system 104. In some embodiments, the reductant delivery system 1100 is positioned upstream of the SCR catalyst member 108 such that the SCR catalyst member 108 receives exhaust gas from the outlet body outlet 1196.

The outlet body 1190 also includes an outlet body coupler 1198 (e.g., body, etc.). The outlet body coupler 1198 borders the outlet body outlet 1196. The outlet body coupler 1198 is coupled to the exhaust gas conduit system 104 around the outlet body outlet 1196. In various embodiments, the outlet body coupler 1198 is circular.

The outlet body 1190 also includes a perforated plate 1200 (e.g., wall, flange, etc.). The perforated plate 1200 extends across a diameter of the outlet body shell 1188. The perforated plate 1200 includes a perforated plate coupling surface 1202 (e.g., face, etc.). In various embodiments, the perforated plate coupling surface 1202 is disposed along a circle. In other embodiments, the perforated plate coupling surface 1202 is disposed along an ellipse.

The perforated plate 1200 also includes a plurality of perforated plate perforations 1204 (e.g., apertures, openings, holes, etc.). The perforated plate 1200 is coupled to the outlet body shell 1188 such that exhaust gas flowing from the outlet body outlet 1196 first passes through the perforated plate 1200 via one of the perforated plate perforations 1204 (e.g., such that none of the exhaust gas can bypass the perforated plate 1200, etc.).

The outlet body 1190 also includes a first flow guide 1206 and a second flow guide 1208. The first flow guide 1206 and the second flow guide 1208 extend within the outlet body shell 1188 and towards the inner transfer tube 1180. The first flow guide 1206 and the second flow guide 1208 are each coupled to at least one of the outlet body shell inner surface 1194, the perforated plate 1200, or the inner transfer tube 1180 (e.g., the inner transfer tube straight portion 1182, etc.).

The first flow guide 1206 is disposed along a plane that is approximately parallel to a plane along which an outlet body shell endcap 1207 of the outlet body shell 1188 is disposed. In various embodiments, the plane along which the first flow guide 1206 is disposed is separated from the plane along which the outlet body shell endcap 1207 is disposed by a seventh distance $D_7$. In some embodiments, the $D_7$ is 8.5 mm. In other embodiments, the $D_7$ is approximately equal to between 0 mm and 10 mm, inclusive. When the $D_7$ is greater than 0 mm, some of the exhaust gas flows around the first flow guide 1206 and thereby bypasses the first flow guide 1206. As a result, the backpressure of the reductant delivery system 1100 may be decreased, and the distribution of the reductant in the exhaust gas exiting the reductant delivery system 1100 may be more desirable.

The second flow guide 1208 is disposed along a plane that is approximately parallel to a plane along which the outlet body shell endcap 1207 is disposed. In various embodiments, the plane along which the first flow guide 1206 is disposed is separated from the plane along which the outlet body shell endcap 1207 is disposed by an eighth distance $D_5$. In some embodiments, the $D_5$ is 8.5 mm. In other embodiments, the $D_5$ is approximately equal to between 0 mm and 10 mm, inclusive. In various embodiments, the $D_5$ is approximately equal to the $D_7$. When the $D_5$ is greater than 0 mm, some of the exhaust gas flows around the second flow guide 1208 and thereby bypasses the second flow guide 1208. As a result, the backpressure of the reductant delivery system 1100 may be decreased, and the distribution of the reductant in the exhaust gas exiting the reductant delivery system 1100 may be more desirable.

The first flow guide 1206 includes a first flow guide straight portion 1210 and a first flow guide curved portion 1212. The first flow guide straight portion 1210 is contiguous with the first flow guide curved portion 1212. The first flow guide straight portion 1210 separates the first flow guide curved portion 1212 from the inner transfer tube 1180. In various embodiments, the first flow guide straight portion 1210 extends within the inner transfer tube 1180 and the outlet body shell 1188 and the first flow guide curved portion 1212 extends only within the outlet body shell 1188 (e.g., the first flow guide curved portion 1212 does not extend into the inner transfer tube 1180, etc.).

The first flow guide straight portion 1210 is centered on a first flow guide center axis 1214. The first flow guide center axis 1214 extends through the outlet body shell inlet 1192 and the inner transfer tube 1180. In various embodiments, the first flow guide center axis 1214 additionally extends through the inlet body outer transfer shell outlet 1176 and the inlet body inner shell outlet 1178, and intersects the inlet body inner shell 1126.

The first flow guide center axis 1214 is separated from the reductant delivery system body bisecting plane 1162 by a sixth separation angle $\varphi_6$ along a plane parallel to the inlet body inlet plane 1140. In various embodiments, the $\varphi_6$ is less than approximately equal to 50°. In some embodiments, the $\varphi_6$ is equal to the $\varphi_5$ such that the inner transfer tube center axis 1186 and the first flow guide center axis 1214 are parallel. In various embodiments, the $\varphi_6$ is approximately equal to 33°.

The first flow guide curved portion 1212 gradually curves from the first flow guide straight portion 1210, towards the reductant delivery system body bisecting plane 1162, and may extend through and past the reductant delivery system body bisecting plane 1162. At least a portion of the first flow guide curved portion 1212 is curved about a first flow guide curved portion center axis 1216. The first flow guide curved portion center axis 1216 extends through the inlet body inlet plane 1140. The first flow guide curved portion 1212 is defined by a third arc length $\beta_3$ along a plane that is orthogonal to the first flow guide curved portion center axis 1216 and along which the first flow guide center axis 1214 extends.

The first flow guide 1206 functions to receive the exhaust gas from the inner transfer tube 1180 and gradually cause the exhaust gas to rotate within the outlet body 1190 and upstream of the perforated plate 1200. This rotation enhances mixing of the reductant and the exhaust gas within the outlet body 1190. Additionally, this rotation increases heat transfer to the reductant, thereby increasing decomposition of the reductant and mitigating impingement of reductant on various surfaces of the reductant delivery system 1100. Furthermore, this rotation also decreases a backpressure of the reductant delivery system 1100 because the momentum of the exhaust gas exiting the inner transfer tube 1180 is gradually dissipated during rotation of the exhaust gas within the outlet body 1190 caused by the first flow guide 1206. By selecting the $\varphi_6$ and the $\beta_3$, the rotation provided by the first flow guide 1206 can be tailored for a target application.

The second flow guide 1208 includes a second flow guide straight portion 1220 and a second flow guide curved portion 1222. The second flow guide straight portion 1220 is contiguous with the second flow guide curved portion 1222. The second flow guide straight portion 1220 separates the second flow guide curved portion 1222 from the inner transfer tube 1180. In various embodiments, the second flow guide straight portion 1220 extends within the inner transfer tube 1180 and the outlet body shell 1188 and the second flow guide curved portion 1222 extends only within the outlet body shell 1188 (e.g., the second flow guide curved portion 1222 does not extend into the inner transfer tube 1180, etc.).

The second flow guide straight portion 1220 is centered on a second flow guide center axis 1224. The second flow guide center axis 1224 extends through the outlet body shell inlet 1192 and the inner transfer tube 1180. In various embodiments, the second flow guide center axis 1224 additionally extends through the inlet body outer transfer shell outlet 1176 and the inlet body inner shell outlet 1178, and intersects the inlet body inner shell 1126.

The second flow guide center axis 1224 is separated from the reductant delivery system body bisecting plane 1162 by a seventh separation angle $\varphi_7$ along a plane parallel to the inlet body inlet plane 1140. In various embodiments, the $\varphi_7$ is less than approximately equal to 50°. In some embodiments, the $\varphi_7$ is equal to the $\varphi_5$ such that the inner transfer tube center axis 1186 and the second flow guide center axis 1224 are parallel. In some embodiments, the $\varphi_7$ is equal to the $\varphi_6$ such that the first flow guide center axis 1214 and the second flow guide center axis 1224 are parallel. In various embodiments, the $\varphi_7$ is approximately equal to 33°.

The second flow guide curved portion 1222 gradually curves from the second flow guide straight portion 1220, towards the reductant delivery system body bisecting plane 1162, and may extend through and past the reductant delivery system body bisecting plane 1162. At least a portion of the second flow guide curved portion 1222 is curved about a second flow guide curved portion center axis 1226. The second flow guide curved portion center axis 1226 extends through the inlet body inlet plane 1140. In some embodiments, the second flow guide curved portion center axis 1226 is parallel to the first flow guide curved portion center axis 1216. The second flow guide curved portion 1222 is defined by a fourth arc length $\beta_4$ along a plane that is orthogonal to the second flow guide curved portion center axis 1226 and along which the second flow guide center axis 1224 extends. In some embodiments, the $\beta_4$ is approximately equal to the $\beta_3$.

The second flow guide 1208 functions to receive the exhaust gas from the inner transfer tube 1180 and gradually cause the exhaust gas to rotate within the outlet body 1190 and upstream of the perforated plate 1200. This rotation enhances mixing of the reductant and the exhaust gas within the outlet body 1190. Additionally, this rotation increases heat transfer to the reductant, thereby increasing decomposition of the reductant and mitigating impingement of reductant on various surfaces of the reductant delivery system 1100. Furthermore, this rotation also decreases a backpressure of the reductant delivery system 1100 because the momentum of the exhaust gas exiting the inner transfer tube 1180 is gradually dissipated during rotation of the exhaust gas within the outlet body 1190 caused by the second flow guide 1208. By selecting the $\varphi_7$ and the $\beta_4$, the rotation provided by the second flow guide 1208 can be tailored for a target application.

Reductant may impinge upon the first flow guide 1206 and/or the second flow guide 1208. However, because the first flow guide 1206 and the second flow guide 1208 are immersed in exhaust gas (e.g., exhaust gas flows in front of the first flow guide 1206 and behind the first flow guide 1206, exhaust gas flows in front of the second flow guide 1208 and behind the second flow guide 1208), the first flow guide 1206 and the second flow guide 1208 may be heated to a relatively high temperature by the exhaust gas. This heating facilitates decomposition of reductant impinging upon the first flow guide 1206 and/or the second flow guide 1208.

In operation, the exhaust gas flows into the inlet body inlet 1106 (e.g., from the exhaust gas conduit system 104, etc.). As is described herein, the exhaust gas flowing through the reductant delivery system 1100 is variously directed, diverted, and split so as to facilitate enhanced mixing and decomposition of reductant into the exhaust gas and mitigate impingement of reductant on various surfaces of the reductant delivery system 1100. In these ways, the reductant delivery system 1100 can be more desirable than other systems which do not include similar mechanisms for enhancing mixing and decomposition of reductant into the exhaust gas and mitigating impingement of reductant (e.g., due to additional cleaning of reductant deposits in these systems, etc.).

A first portion of the exhaust gas flows through the dividing plate window 1154 and between the dividing plate panel 1143, the separation panel 1156, the distributor tube panel portion 1158, the inlet body inner shell endcap surface 1134, the inlet body inner shell dividing surface 1163, and the inlet body inner shell projecting surface 1165, and subsequently along the inlet body inner shell dividing surface 1163, the inlet body inner shell projecting surface 1165, and/or the inlet body inner shell endcap surface 1134 and around the transfer tube 1146. As the exhaust gas flows around the transfer tube 1146, the exhaust gas is caused to swirl (e.g., about an axis extending through the inlet body inlet center point 1142 and orthogonal to the inlet body inlet plane 1140, etc.). The first portion of the exhaust gas then flows into the inner transfer tube curved portion 1184 via the inlet body inner shell outlet 1178.

Prior to flowing into the inner transfer tube curved portion 1184, the first portion of the exhaust gas is provided with reductant through the outer injection aperture 1172 and the inner injection aperture 1173. The reductant mixes with the first portion of the exhaust gas and is caused to swirl with the first portion of the exhaust gas around the transfer tube 1146.

An injection assist portion of the first portion of the exhaust gas may flow into a shroud assembly via a shroud inlet (e.g., between a shroud plate, a shroud flange, and an inlet body outer mounting shell projecting surface, etc.). The injection assist portion of the exhaust gas may be provided with reductant via the outer injection aperture 1172 and the inner injection aperture 1173 (e.g., from the injector 120 and/or the dosing module 112). The injection assist portion of the first portion of the exhaust gas may then exit the shroud assembly via the shroud outlet. The injection assist portion of the exhaust gas may aide in propelling the reductant around the transfer tube 1146. Specifically, the shroud assembly may protect the flow of the exhaust gas and reductant away from the inlet body inner shell endcap surface 1134 from the flow of the exhaust gas towards the inlet body inner shell endcap surface 1134, thereby enabling additional reductant to be provided to the inner transfer tube curved portion 1184 (e.g., rather than being propelled against the inlet body inner shell endcap surface 1134, etc.). In various embodiments, the injection assist portion may be approximately equal to 5%, 4%, 3%, 2%, or other similar values of the total exhaust flow into the inlet body inlet 1106.

A second portion of the exhaust gas, different from the exhaust gas that flows through the dividing plate window 1154, flows through the dividing plate opening 1144 and into the transfer tube 1146. The second portion of the exhaust gas flows from the transfer tube first end 1148 towards the transfer tube second end 1150. The second portion of the exhaust gas then exits the transfer tube 1146 via the transfer tube apertures 1152 and joins the first portion of the exhaust gas between the dividing plate panel 1143, the separation panel 1156, the distributor tube panel portion 1158, the inlet body inner shell endcap surface 1134, the inlet body inner shell dividing surface 1163, and the inlet body inner shell projecting surface 1165.

By being separated from the dividing plate window 1154, the second portion of the exhaust gas joins the first portion of the exhaust gas after rotation of the first portion of the exhaust gas has already begun. As a result, rotation of the first portion of the exhaust gas is not substantially reduced by the introduction of the second portion of the exhaust gas into the first portion of the exhaust gas. Furthermore, at least some of the transfer tube apertures 1152 may be aligned with the inlet body inner shell outlet 1178. As a result, the second portion of the exhaust gas exiting these transfer tube apertures 1152 may propel the exhaust gas towards the inlet body inner shell outlet 1178. The locations of the transfer tube apertures 1152 are selected so that the exhaust gas exiting each transfer tube aperture 1152 does not substantially alter the swirl of the exhaust gas about the transfer tube 1146. Additionally, the exhaust gas that flows within the transfer tube 1146 is relatively hot (e.g., compared to exhaust gas that has been mixed with reductant, etc.). As a result, impingement of reductant on the transfer tube 1146 is mitigated.

A third portion of the exhaust gas, different from the exhaust gas that flows through the dividing plate window 1154 or the exhaust gas that flows through the dividing plate opening 1144, flows between the inlet body outer mounting shell inner surface 1128 and the inlet body inner shell wall 1132 (e.g., between the inlet body outer mounting shell 1110 and the inlet body inner shell 1126, etc.) and between the inlet body outer transfer shell inner surface 1130 and the inlet body inner shell wall 1132 (e.g., between the inlet body outer transfer shell 1116 and the inlet body inner shell 1126, etc.). The exhaust gas creates a flow along the inlet body inner shell wall 1132 that mitigates impingement of reductant on the inlet body inner shell wall 1132 (e.g., due to heating of the inlet body inner shell wall 1132 by relatively hot exhaust gas, etc.).

Some of the third portion of the exhaust gas flows through the inlet body inner shell apertures 1175 and into the inlet body inner shell 1126. Additionally, the exhaust gas that flows between the inlet body outer mounting shell inner surface 1128 and the inlet body inner shell wall 1132 is relatively hot (e.g., compared to exhaust gas that has been mixed with reductant, etc.). As a result, impingement of reductant on the inlet body inner shell wall 1132 is mitigated. In various embodiments, at least some of the inlet body inner shell apertures 1175 are aligned with at least some of the transfer tube apertures 1152 (e.g., a center axis of an inlet body inner shell aperture 1175 extends across a transfer tube aperture 1152 when viewed on a plane along which the transfer tube aperture 1152 is disposed, a center axis of a transfer tube aperture 1152 extends across an inlet body inner shell aperture 1175 when viewed on a plane along which the inlet body inner shell aperture 1175 is disposed, etc.). As a result, exhaust gas flowing from the aligned inlet body inner shell aperture 1175 and exhaust gas flowing from the transfer tube aperture 1152 mix and may be cooperatively directed towards the inlet body inner shell outlet 1178. As a result, a backpressure of the reductant delivery system 1100 may be reduced.

Some of the exhaust gas flowing between the inlet body outer mounting shell inner surface 1128 and the inlet body inner shell wall 1132 may be directed into a shroud inlet by a shroud guide.

The exhaust gas flowing within the inner transfer tube curved portion 1184 flows to the inner transfer tube straight portion 1182. The exhaust gas flowing within the inner transfer tube straight portion 1182 flows into the outlet body shell 1188. The exhaust gas flowing within the outlet body shell 1188 may flow along the outlet body shell inner surface 1194 so as to cause the exhaust gas to swirl. This swirl may be enhanced by the $\varphi_5$ which effectively causes the exhaust gas to flow into the outlet body shell 1188 semi-tangentially (e.g., as opposed to axially, as opposed to radially, etc.).

A first portion of the exhaust gas flowing out of the inner transfer tube straight portion 1182 flows between the first flow guide straight portion 1210 and the inner transfer tube straight portion 1182 and/or the outlet body shell inner surface 1194. This portion of the exhaust gas enters the outlet body shell 1188 semi-tangentially due to the $\varphi_6$ and is guided along the first flow guide straight portion 1210 to the first flow guide curved portion 1212. The first flow guide curved portion 1212 causes this portion of the exhaust gas to subsequently swirl within the outlet body shell 1188.

A second portion of the exhaust gas flowing out of the inner transfer tube straight portion 1182 flows between the first flow guide straight portion 1210 and the second flow guide straight portion 1220. This portion of the exhaust gas enters the outlet body shell 1188 semi-tangentially due to the $\varphi_7$ and is guided along the second flow guide straight portion 1220 to the second flow guide curved portion 1222. The second flow guide curved portion 1222 causes this portion of the exhaust gas to subsequently swirl within the outlet body shell 1188.

The exhaust gas flowing within the outlet body shell 1188 then flows through the perforated plate 1200 and exits the outlet body 1190 via the outlet body outlet 1196. By flowing through the perforated plate 1200, the flow of the exhaust gas may be straightened, thereby enhancing the uniformity of the exhaust gas that flows towards components of the exhaust gas aftertreatment system 100 (e.g., the SCR catalyst member 108, etc.) that are downstream of the reductant delivery system 1100.

The inlet body outer mounting shell 1110 may also include an inlet body outer mounting shell first sensor coupling mount (e.g., projection, etc.). The inlet body outer mounting shell first sensor coupling mount may extend (e.g., projects, protrudes, etc.) from an outer surface of the inlet body outer mounting shell 1110. The inlet body outer mounting shell first sensor coupling mount may be located upstream of the outer injection aperture 1172. As a result, a sensor coupled to the inlet body outer mounting shell first sensor coupling mount may be subjected to a relatively high flow rate of the exhaust gas and may be substantially isolated from reductant, thereby enabling accurate measurements to be obtained by the sensor (e.g., because the sensor is not covered in reductant deposits, etc.). In other embodiments, the inlet body outer mounting shell first sensor coupling mount may be located in other locations.

The reductant delivery system 1100 may also include an inlet body outer mounting shell temperature sensor coupling. The inlet body outer mounting shell temperature sensor coupling may be coupled to the inlet body outer mounting shell first sensor coupling mount and configured to be coupled to the upstream temperature sensor 138. The inlet body outer mounting shell first sensor coupling mount may be configured to provide exhaust gas to the upstream temperature sensor 138 and/or to receive the upstream temperature sensor 138 such that the upstream temperature sensor 138 extends into the inlet body outer mounting shell 1110. The upstream temperature sensor 138 may determine a temperature of the exhaust gas prior to the exhaust gas flowing into the inner transfer tube curved portion 1184.

The inlet body outer mounting shell 1110 may also include an inlet body outer mounting shell second sensor coupling mount (e.g., projection, etc.). The inlet body outer mounting shell second sensor coupling mount may extend (e.g., projects, protrudes, etc.) from an outer surface of the inlet body outer mounting shell 1110. The inlet body outer mounting shell second sensor coupling mount may be centered on an axis that extends through the inlet body inlet 1106 (e.g., orthogonally to the inlet body inlet plane 1140, etc.). The reductant delivery system 1100 may also include an inlet body outer mounting shell pressure sensor coupling. The inlet body outer mounting shell pressure sensor coupling may be coupled to the inlet body outer mounting shell second sensor coupling mount and configured to be coupled to the pressure sensor 140. The inlet body outer mounting shell second sensor coupling mount may be configured to provide exhaust gas to the pressure sensor 140 and/or to receive the pressure sensor 140 such that the pressure sensor 140 extends into the inlet body outer mounting shell 1110. The pressure sensor 140 may determine a pressure of the exhaust gas prior to the exhaust gas flowing into the inner transfer tube curved portion 1184.

The outlet body shell 1188 may also include an outlet body shell sensor coupling mount (e.g., projection, etc.). The outlet body shell sensor coupling mount may extend from an outer surface of the outlet body shell 1188. The outlet body shell sensor coupling mount may be centered on an axis that extends across the outlet body shell 1188. The outlet body shell sensor coupling mount may be located such that the outlet body shell sensor coupling mount is opposite a target location on the outlet body shell inner surface 1194 (e.g., depending on an application of the reductant delivery system 1100, depending on space claim requirements for the reductant delivery system 1100, etc.).

The reductant delivery system 1100 may also include an outlet body shell temperature sensor coupling. The outlet body shell temperature sensor coupling may be coupled to the outlet body shell sensor coupling mount and configured to be coupled to the downstream temperature sensor 142. The outlet body shell temperature sensor coupling may be configured to provide exhaust gas to the downstream temperature sensor 142 and/or to receive the downstream temperature sensor 142 such that the downstream temperature sensor 142 extends into the outlet body shell 1188. The downstream temperature sensor 142 may determine a temperature of the exhaust gas after the exhaust gas flows into the outlet body shell (e.g., via the inner transfer tube straight portion 1182, etc.).

Rather than the inlet body outer mounting shell 1110 and the inlet body outer transfer shell 1116 being separate components that are coupled together, it is understood that the inlet body outer mounting shell 1110 and the inlet body outer transfer shell 1116 may also be structurally integrated (e.g., formed from a one-piece construction, etc.), in some embodiments.

V. Third Example Reductant Delivery System

FIGS. 20-28 illustrate a reductant delivery system 1900, according to an example embodiment. The reductant delivery system 1900 is the reductant delivery system 102 in various embodiments. The reductant delivery system 1900 is similar to the reductant delivery system 200. The reductant delivery system 1900 includes a reductant delivery system body 1901 (e.g., shell, frame, assembly, etc.). The reductant delivery system body 1901 includes an inlet body 1904 (e.g., shell, frame, assembly, etc.). The inlet body 1904 includes an inlet body inlet 1906 (e.g., opening, aperture, etc.). The inlet body inlet 1906 is configured to receive exhaust gas from the exhaust gas conduit system 104. In some embodiments, the reductant delivery system 1900 is positioned downstream of the particulate filter 106 such that the inlet body inlet 1906 receives exhaust gas from the particulate filter 106.

The inlet body 1904 includes an inlet body coupler 1908 (e.g., body, etc.). The inlet body coupler 1908 borders the inlet body inlet 1906. The inlet body coupler 1908 is coupled to the exhaust gas conduit system 104 around the inlet body inlet 1906. In various embodiments, the inlet body coupler 1908 is circular.

The inlet body 1904 also includes an inlet body outer mounting shell 1910 (e.g., body, frame, etc.). The inlet body outer mounting shell 1910 includes an inlet body outer mounting shell coupling surface 1912 (e.g., face, etc.). In various embodiments, the inlet body outer mounting shell coupling surface 1912 is disposed along a circular arc. The inlet body outer mounting shell coupling surface 1912 is in contact with an inlet body coupler coupling surface 1914 (e.g., face, etc.) of the inlet body coupler 1908. In various embodiments, the inlet body coupler coupling surface 1914 is disposed along a circular arc. In various embodiments, the inlet body outer mounting shell coupling surface 1912 is coupled to the inlet body coupler coupling surface 1914.

The inlet body 1904 also includes an inlet body outer transfer shell 1916 (e.g., body, frame, etc.). The inlet body outer transfer shell 1916 includes an inlet body outer transfer shell coupling surface 1918 (e.g., face, etc.) that is in contact with the inlet body coupler coupling surface 1914. In various embodiments, the inlet body outer transfer shell coupling surface 1918 is disposed along a circular arc. In some embodiments, the inlet body outer mounting shell coupling surface 1912 is disposed along a circular arc having a first radius and the inlet body outer transfer shell coupling surface 1918 is disposed along a circular arc having the first radius. In some embodiments, the inlet body outer mounting shell coupling surface 1912 and the inlet body outer transfer shell coupling surface 1918 are both disposed along the same circle. In various embodiments, the inlet body outer transfer shell coupling surface 1918 is coupled to the inlet body coupler coupling surface 1914.

The inlet body outer mounting shell 1910 includes an inlet body outer mounting shell mating surface 1920 (e.g., face, etc.). The inlet body outer mounting shell mating surface 1920 is contiguous with the inlet body outer mounting shell coupling surface 1912. Similarly, the inlet body outer transfer shell 1916 includes an inlet body outer transfer shell mating surface 1922 (e.g., face, etc.). The inlet body outer transfer shell mating surface 1922 is contiguous with the inlet body outer transfer shell coupling surface 1918. In various embodiments, the inlet body outer mounting shell mating surface 1920 is coupled to the inlet body outer transfer shell mating surface 1922 such that the inlet body outer mounting shell 1910 is coupled to the inlet body outer transfer shell 1916. Collectively, the inlet body outer mounting shell 1910 and the inlet body outer transfer shell 1916 define an inlet body cavity 1924 (e.g., void, region, space, etc.).

The inlet body 1904 also includes an inlet body inner shell 1926 (e.g., body, frame, etc.). The inlet body inner shell 1926 is contained within the inlet body cavity 1924. The inlet body inner shell 1926 does not include flanges similar to the inlet body inner shell first flange 228 or the inlet body inner shell second flange 232. The inlet body inner shell 1926 is separated from an inlet body outer mounting shell inner surface 1928 (e.g., face, etc.) of the inlet body outer mounting shell 1910 and an inlet body outer transfer shell inner surface 1930 (e.g., face, etc.) of the inlet body outer transfer shell 1916. In some embodiments, the inlet body outer mounting shell inner surface 1928 is opposite the inlet body outer mounting shell coupling surface 1912. In some embodiments, the inlet body outer transfer shell inner surface 1930 is opposite the inlet body outer transfer shell mating surface 1922.

The inlet body inner shell 1926 includes an inlet body inner shell wall 1932. The inlet body inner shell 1926 also includes an inlet body inner shell endcap surface 1934. The inlet body inner shell endcap surface 1934 is contiguous with the inlet body inner shell wall 1932. The inlet body inner shell endcap surface 1934 is separated from the inlet body outer transfer shell mating surface 1922 and the inlet body outer mounting shell inner surface 1928. As is explained in more detail herein, the inlet body inner shell endcap surface 1934 is shaped to match the inlet body outer mounting shell inner surface 1928 and the inlet body outer transfer shell inner surface 1930, such that a gap between the inlet body inner shell endcap surface 1934 and the inlet body outer mounting shell inner surface 1928 is substantially constant along the inlet body outer mounting shell inner surface 1928 and is approximately equal to a gap between the inlet body inner shell endcap surface 1934 and the inlet body outer transfer shell inner surface 1930 that is substantially constant along the inlet body outer transfer shell inner surface 1930. In some embodiments, this gap is approximately equal to 8.5 mm.

The inlet body 1904 also includes a dividing plate 1936 (e.g., flange, wall, etc.). The dividing plate 1936 is at least partially contained within the inlet body inner shell wall 1932. The dividing plate 1936 includes a dividing plate coupling surface 1938 (e.g., face, etc.). The dividing plate coupling surface 1938 is coupled to the inlet body inner shell wall 1932. In various embodiments, the dividing plate coupling surface 1938 is coupled to the inlet body inner shell wall 1932 along the length of the dividing plate coupling surface 1938 (e.g., such that flow of the exhaust gas between the dividing plate coupling surface 1938 and the inlet body inner shell wall 1932 is prohibited, etc.). In other embodiments, the dividing plate coupling surface 1938 is not coupled to the inlet body inner shell wall 1932 along the length of the dividing plate coupling surface 1938, and is instead coupled to the inlet body inner shell wall 1932 at one or more locations along the dividing plate coupling surface 1938 (e.g., such that flow of the exhaust gas between the dividing plate coupling surface 1938 and the inlet body inner shell wall 1932 is facilitated, etc.). In various embodiments, the dividing plate coupling surface 1938 is disposed along a circular arc. In other embodiments, the dividing plate coupling surface 1938 is disposed along an elliptical arc.

The inlet body inlet 1906 is disposed along an inlet body inlet plane 1940. The dividing plate coupling surface 1938 is separated from the inlet body inlet plane 1940 by a ninth distance $D_9$. In various embodiments, the $D_9$ is constant along the dividing plate coupling surface 1938 (e.g., the dividing plate coupling surface 1938 is parallel to the inlet body inlet plane 1940, etc.). In some embodiments, the $D_9$ is approximately equal to 30.6 mm.

The inlet body inlet 1906 is defined by an inlet body inlet center point 1942 (e.g., centroid, etc.). The dividing plate 1936 includes a dividing plate panel 1943 (e.g., face, surface, portion, etc.). The dividing plate panel 1943 is contiguous with the dividing plate coupling surface 1938. In various embodiments, the dividing plate panel 1943 is parallel to the inlet body inlet plane 1940. In other embodiments, the dividing plate panel 1943 is angled (e.g., tilted, inclined, etc.) relative to the inlet body inlet plane 1940.

The dividing plate panel 1943 includes a dividing plate opening 1944 (e.g., aperture, etc.). The dividing plate opening 1944 is configured to receive the exhaust gas from the inlet body inlet 1906. The dividing plate opening 1944 facilitates flow of the exhaust gas through the dividing plate panel 1943 as opposed to around the dividing plate panel 1943. In various embodiments, the dividing plate opening 1944 is centered on the inlet body inlet center point 1942. The dividing plate opening 1944 may be circular, square, triangular, or otherwise similarly shaped.

The inlet body 1904 also includes a distributor tube 1946. The distributor tube 1946 may be cylindrical, a triangular prism, a square prism, a rectangular prism, or otherwise similarly shaped. The distributor tube 1946 includes a distributor tube first end 1948 that is coupled to the dividing plate panel 1943 around the dividing plate opening 1944. The distributor tube first end 1948 is configured to receive the exhaust gas from the dividing plate opening 1944. The distributor tube 1946 also includes a distributor tube second end 1950 that is coupled to the inlet body inner shell endcap surface 1934. The exhaust gas received by the distributor tube first end 1948 is passed within the distributor tube 1946 towards the distributor tube second end 1950.

The distributor tube 1946 also includes a plurality of distributor tube apertures 1952 (e.g., perforations, openings, holes, etc.). Each of the distributor tube apertures 1952 is configured to facilitate passage of the exhaust gas from the distributor tube 1946 out of the distributor tube 1946. After exiting the distributor tube 1946, the exhaust gas flows between the dividing plate 1936, the distributor tube 1946, the inlet body inner shell wall 1932, and the inlet body inner shell endcap surface 1934. In various embodiments, at least some of the distributor tube apertures 1952 are located closer to the distributor tube second end 1950 than to the distributor tube first end 1948. In some embodiments, at least a majority of the distributor tube apertures 1952 are located closer to the distributor tube second end 1950 than to the distributor tube first end 1948. In various embodiments, a diameter of each of the distributor tube apertures 1952 is between ten times less than a diameter of the dividing plate opening 1944 and fifty times less than a diameter of the dividing plate opening 1944, inclusive. In some embodiments, a diameter of each of the distributor tube apertures 1952 is approximately equal to 6.35 mm and a diameter of the dividing plate opening 1944 is approximately equal to 100 mm.

The dividing plate panel 1943 also includes a dividing plate window 1954 (e.g., opening, aperture, window, etc.). The dividing plate window 1954 is configured to receive the exhaust gas from the inlet body inlet 1906 separate from the dividing plate opening 1944. The dividing plate window 1954 facilitates flow of the exhaust gas through the dividing plate panel 1943 as opposed to around the dividing plate panel 1943. After exiting the dividing plate window 1954, the exhaust gas flows between the dividing plate 1936, the distributor tube 1946, the inlet body inner shell wall 1932, and the inlet body inner shell endcap surface 1934.

In an example embodiment, the dividing plate window 1954 is shaped like a truncated sector of a circle that is centered on the inlet body inlet center point 1942. When measured along the inlet body inlet plane 1940 (e.g., from the inlet body inlet center point 1942, etc.), the dividing plate window 1954 in such an embodiment has a fourth sector angle $S_4$. In various embodiments, the $S_4$ is approximately equal to between 20° and 90°, inclusive (e.g., 19°, 20°, 25°, 37°, 40°, 45°, 50°, 90°, 91°, etc.). The dividing plate window 1954 may be contiguous with the dividing plate opening 1944 and/or the dividing plate coupling surface 1938. Rather than being shaped like a truncated sector of a circle that is centered on the inlet body inlet center point 1942, the dividing plate window 1954 may also be shaped like a truncated sector of a circle that is not centered on the inlet body inlet center point 1942. Additionally, the dividing plate window 1954 may not be shaped like a truncated sector of a circle, and instead may be circular, square, triangular, or otherwise similarly shaped.

The inlet body 1904 also includes a separation panel 1956. The separation panel 1956 is coupled to the dividing plate panel 1943, the distributor tube 1946, the inlet body inner shell wall 1932, and the inlet body inner shell endcap surface 1934. In various embodiments, the separation panel 1956 is coupled to the dividing plate panel 1943 along the dividing plate window 1954. The separation panel 1956 functions to ensure that exhaust gas flowing between the dividing plate panel 1943, the distributor tube 1946, the inlet body inner shell wall 1932, and the inlet body inner shell endcap surface 1934 either must flow through the distributor tube 1946 via the distributor tube apertures 1952 or around the distributor tube 1946 via the dividing plate window 1954.

The distributor tube 1946 includes a distributor tube panel portion 1958 and a distributor tube transfer portion 1960, each extending between the distributor tube first end 1948 and the distributor tube second end 1950. None of the distributor tube apertures 1952 are located on the distributor tube panel portion 1958 (e.g., the distributor tube apertures 1952 are not located on the distributor tube panel portion 1958). Instead, all of the distributor tube apertures 1952 are located on the distributor tube transfer portion 1960. As a result, the exhaust gas cannot pass through the distributor tube panel portion 1958. When measured along the inlet body inlet plane 1940 (e.g., from the inlet body inlet center point 1942, etc.), the distributor tube panel portion 1958 is disposed along an arc having a second central angle $\tau_2$. As a result, the distributor tube transfer portion 1960 is disposed along an arc having a central angle equal to $360°-\tau_2$. In various embodiments, the $\tau_2$ is approximately equal to between 20° and 180°, inclusive (e.g., 19°, 20°, 25°, 37°, 40°, 45°, 50°, 90°, 180°, 181°, etc.).

The distributor tube apertures 1952 are separated from the separation panel 1956 by an eighth separation angle $\varphi_8$ along a plane parallel to the inlet body inlet plane 1940. In various embodiments, the $\varphi_8$ is greater than 50°. When measured along the inlet body inlet plane 1940 (e.g., from the inlet body inlet center point 1942, etc.), the distributor tube apertures 1952 are distributed within a fifth sector angle $S_5$. In various embodiments, the $S_5$ is approximately equal to between 80° and 220°, inclusive (e.g., 79°, 80°, 90°, 100°, 140°, 145°, 150°, 220°, 221°, etc.).

In some embodiments, the $\tau_2$ is equal to or greater than the $S_5$, and the distributor tube panel portion 1958 and/or the dividing plate window 1954 are positioned such that, when viewed along the inlet body inlet plane 1940, only the distributor tube panel portion 1958 is contained within a sector of a circle that is centered on the inlet body inlet center point 1942 having a diameter equal to the diameter of the distributor tube 1946, where the sector has a sector angle equal to the $S_5$ (e.g., the distributor tube transfer portion 1960 is not contained within the sector).

The inlet body inlet 1906 is bisected by a reductant delivery system body bisecting plane 1962. The reductant delivery system body bisecting plane 1962 bisects the reductant delivery system body 1901 and intersects the inlet body inlet center point 1942.

Figure 22:
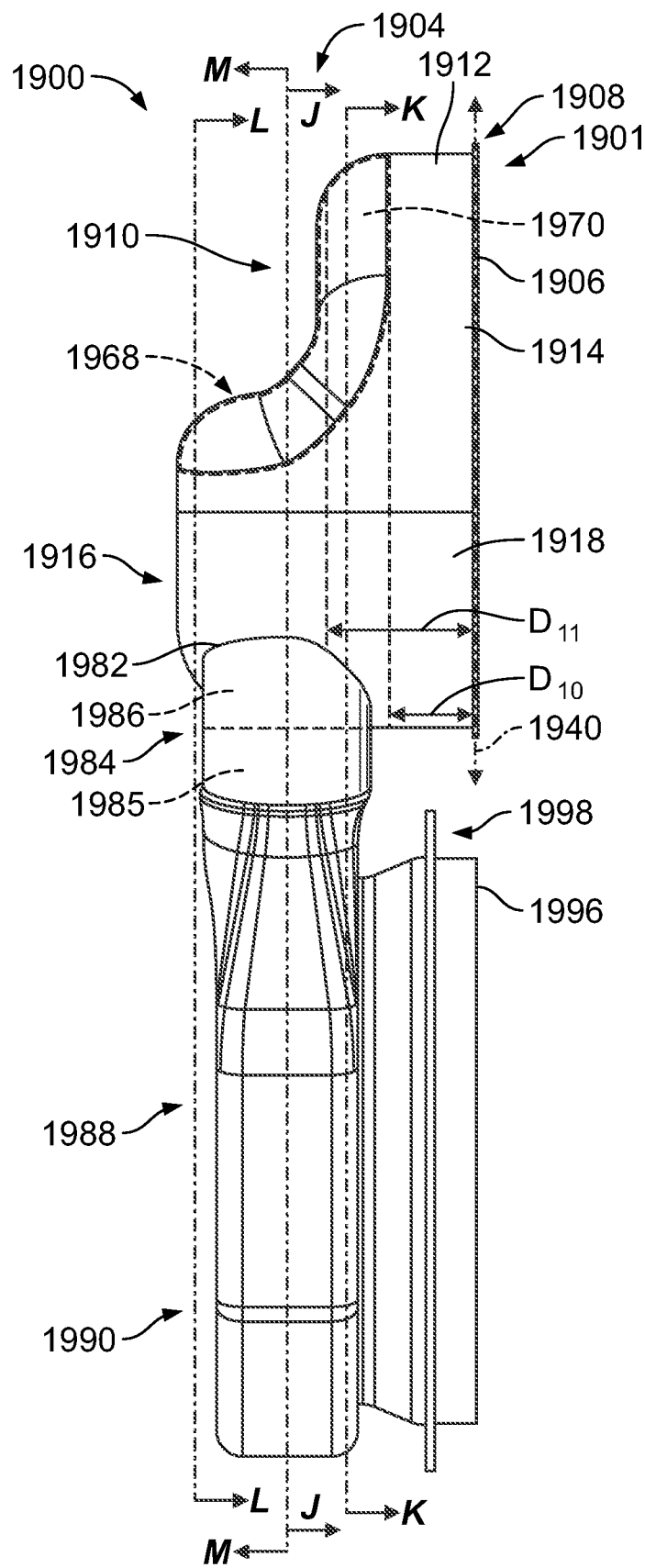
FIG. 22 is a side view of the reductant delivery system shown in FIG. 20.
Figure 23:
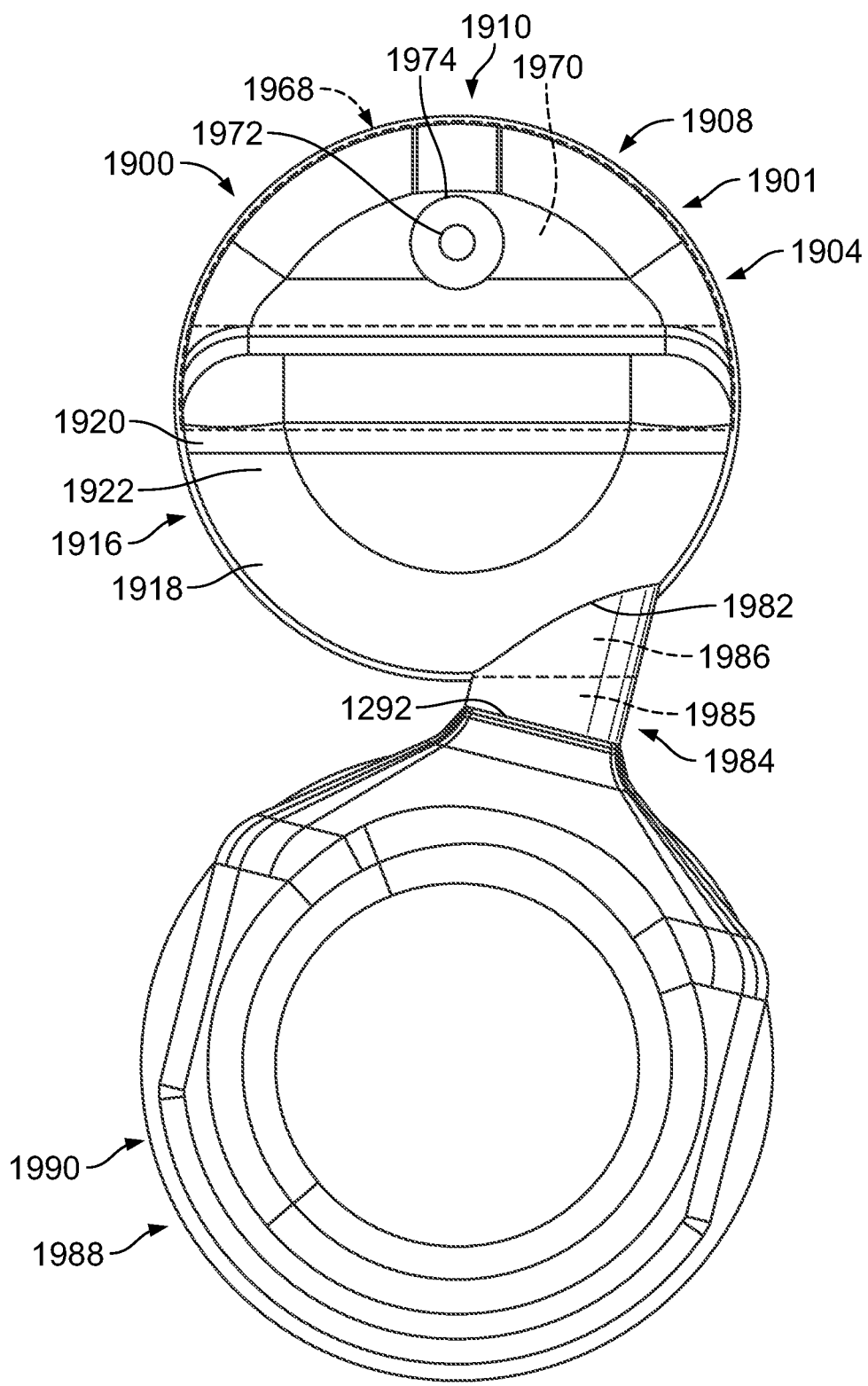
FIG. 23 is a rear view of the reductant delivery system shown in FIG. 20.
Figure 24:
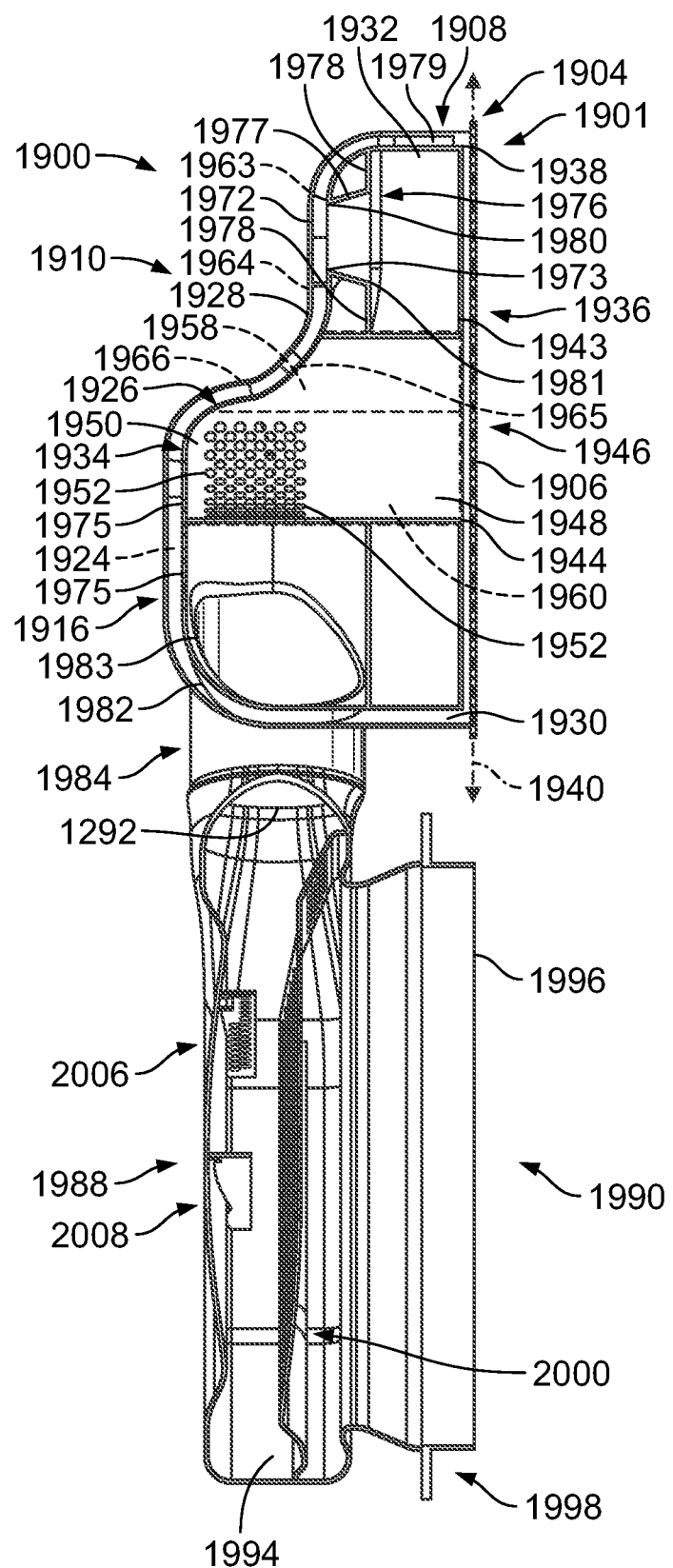
FIG. 24 is a side view of the reductant delivery system shown in FIG. 21, taken along plane H-H.
Figure 25:
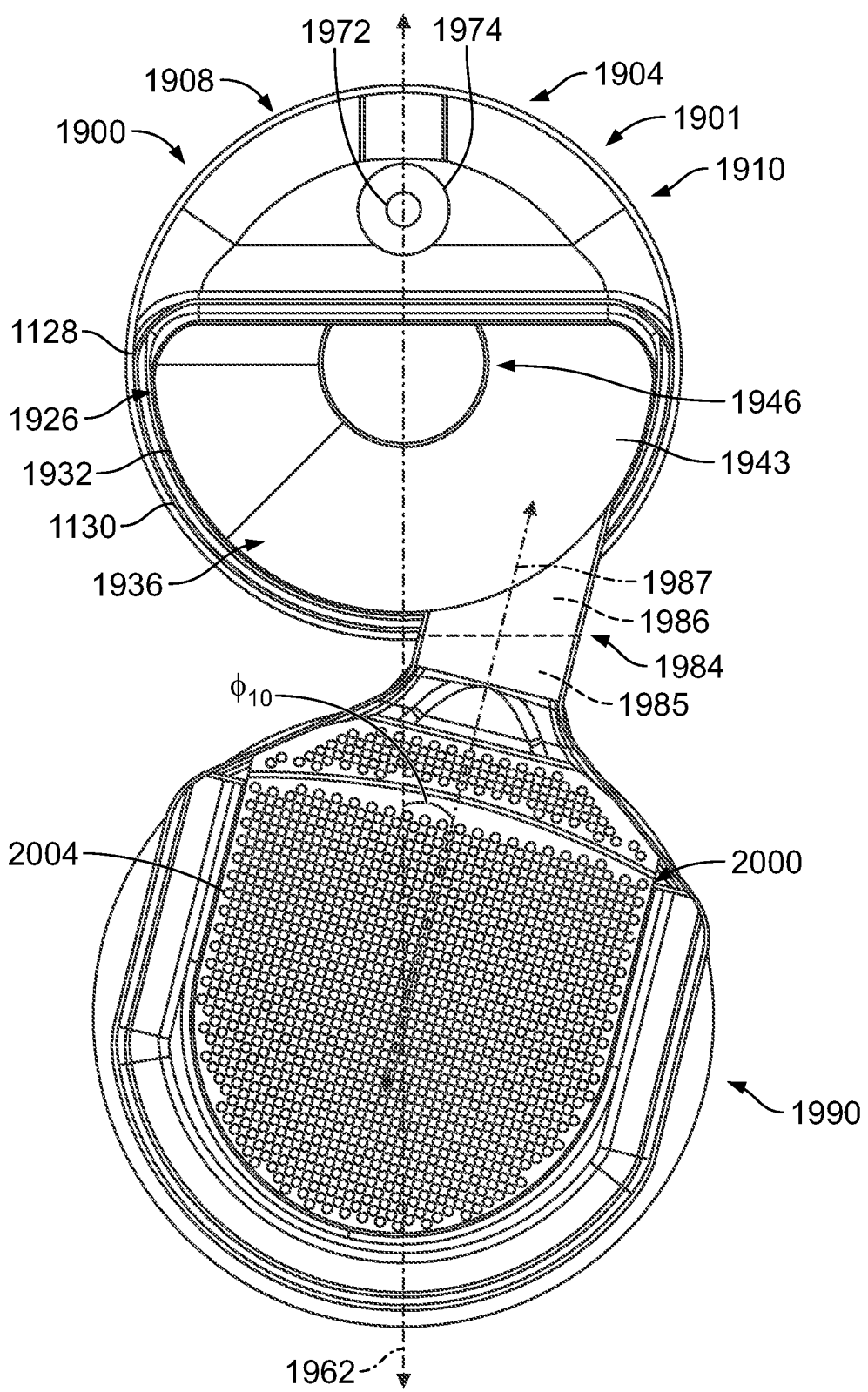
FIG. 25 is a rear view of the reductant delivery system shown in FIG. 22, taken along plane J-J.
Figure 26:
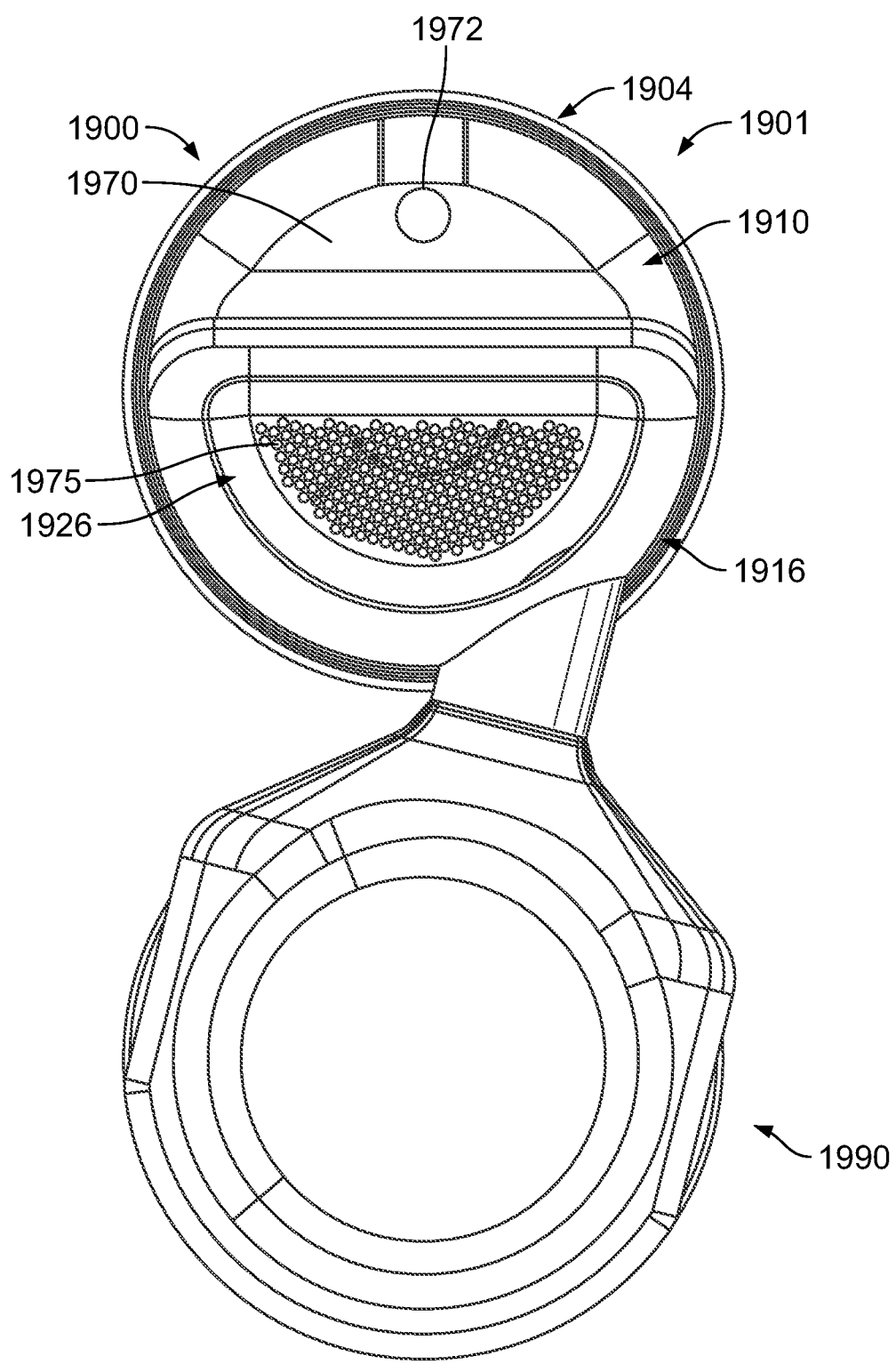
FIG. 26 is a side view of the reductant delivery system shown in FIG. 22, taken along plane L-L.
Figure 27:
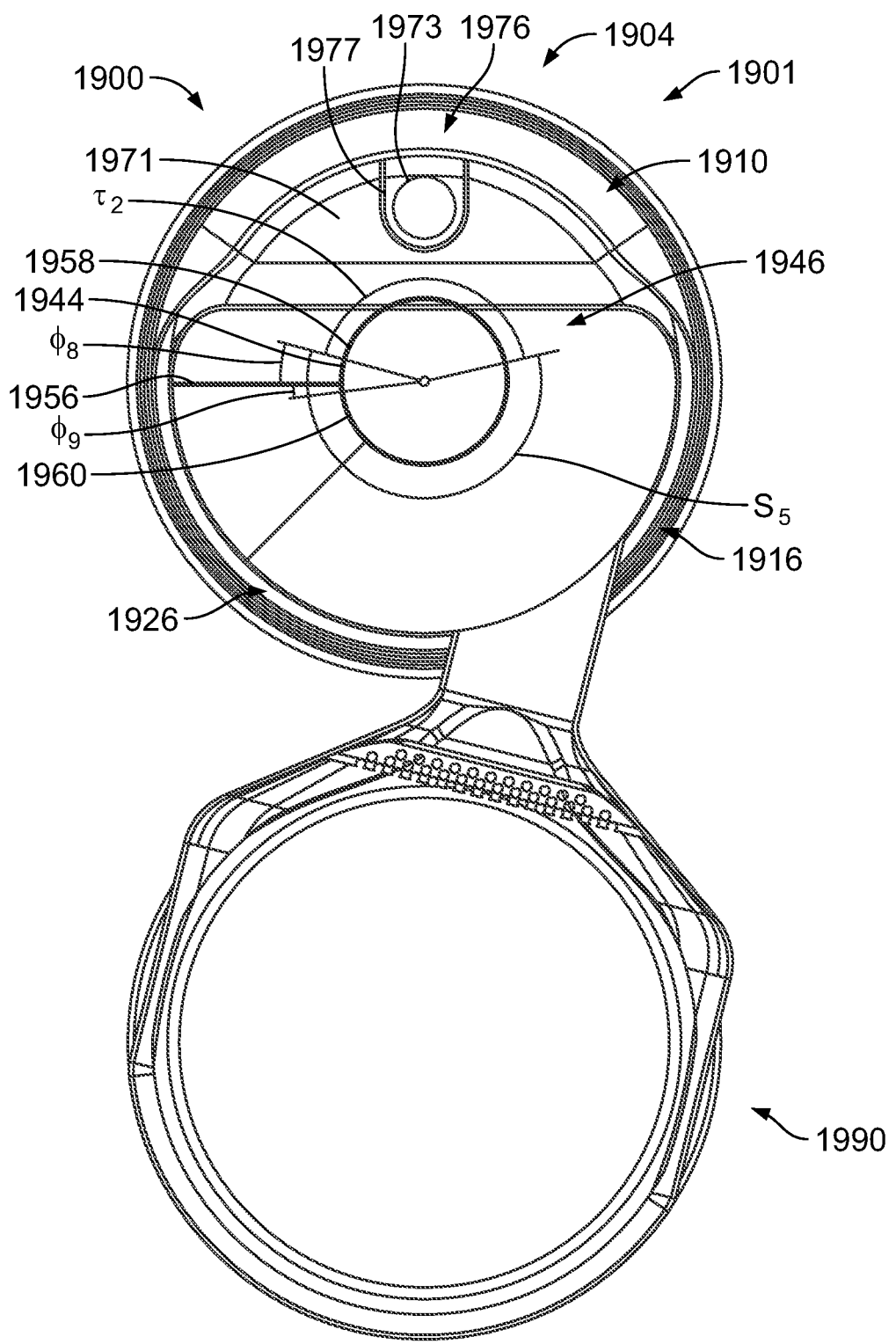
FIG. 27 is a side view of the reductant delivery system shown in FIG. 22, taken along plane K-K.
Figure 28:
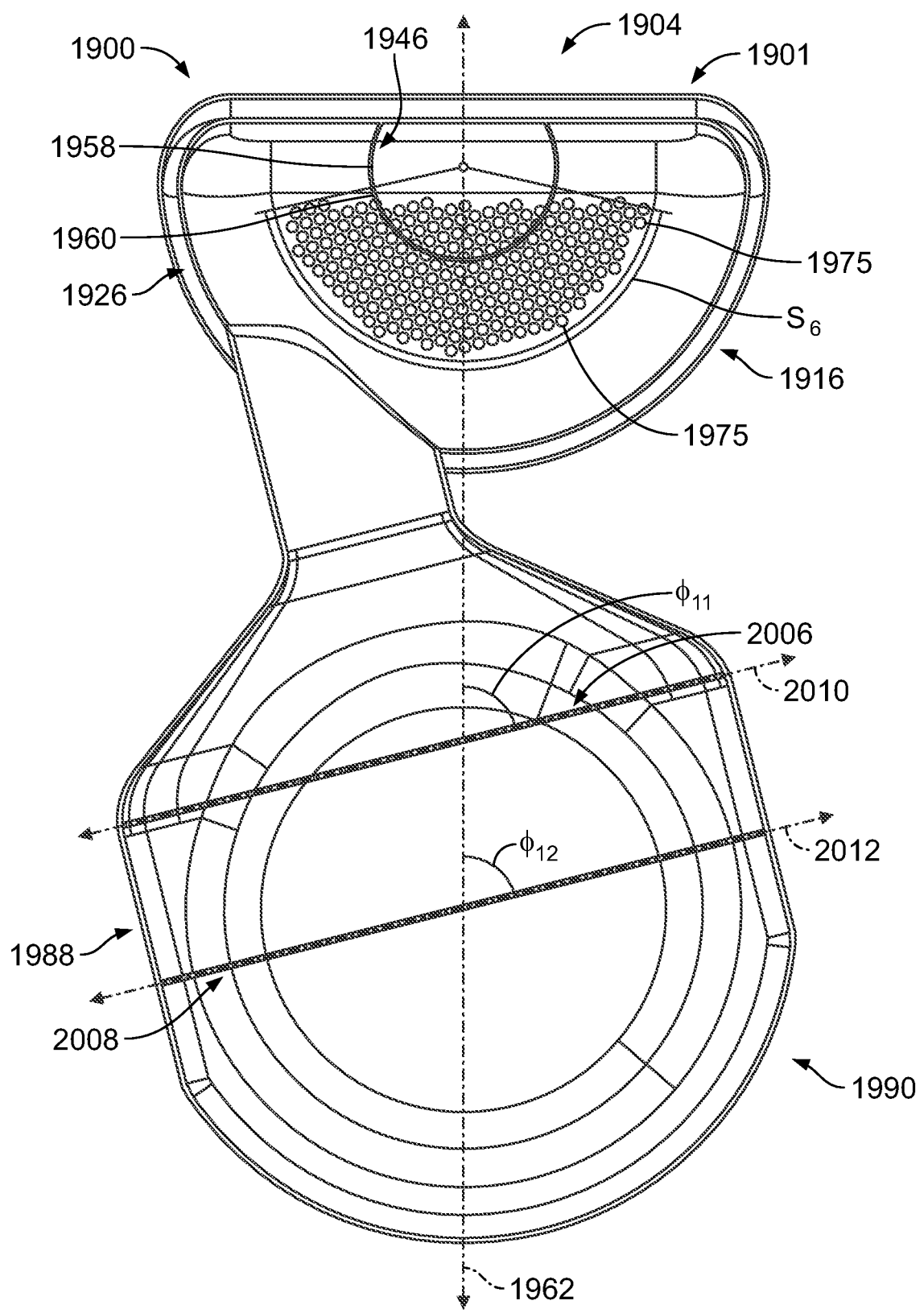
FIG. 28 is a rear view of the reductant delivery system shown in FIG. 22, taken along plane M-M.
Figure 29:
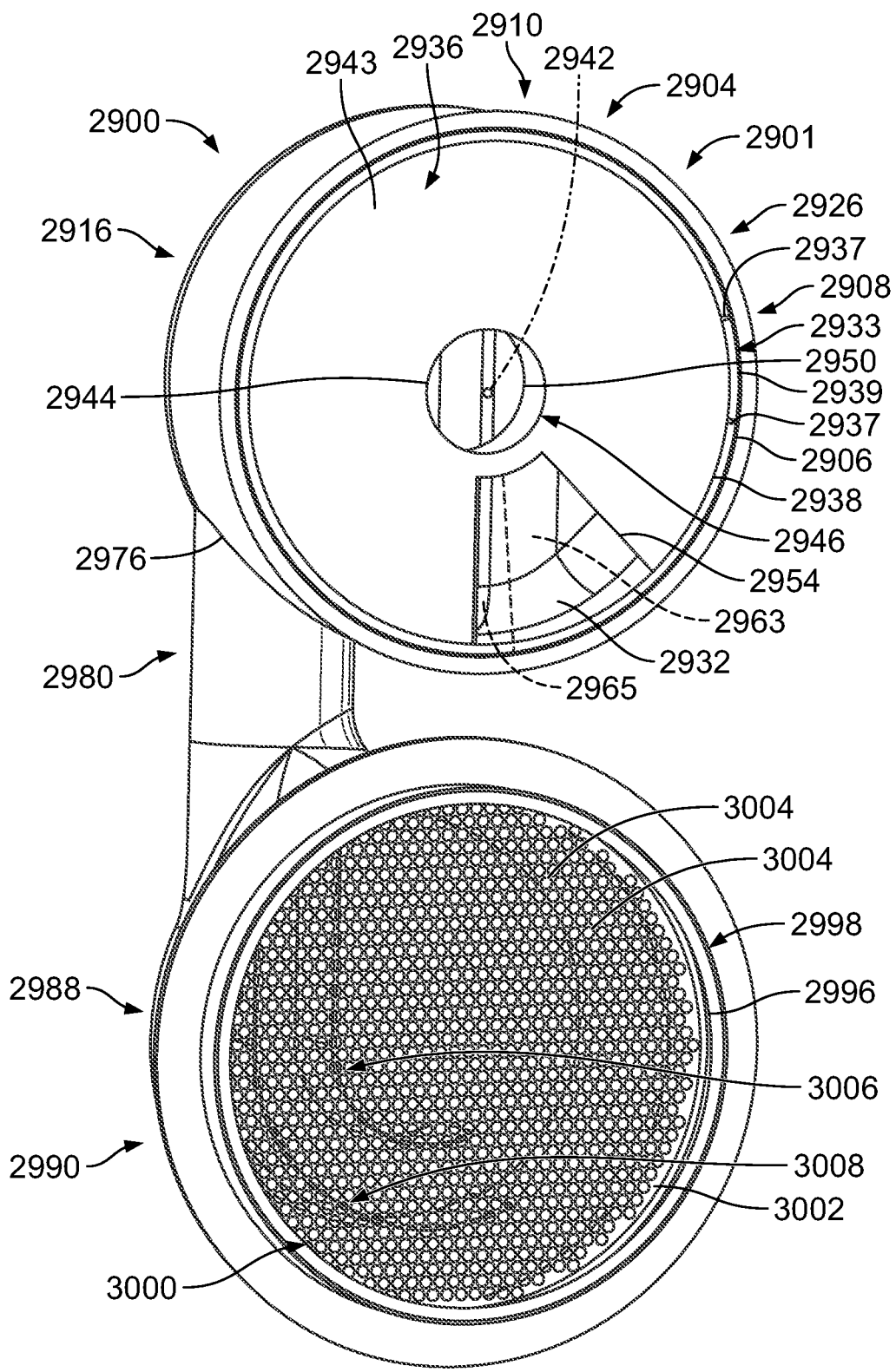
FIG. 29 is a perspective view of an example reductant delivery system for the exhaust gas aftertreatment system shown in FIG. 1.
Figure 30:
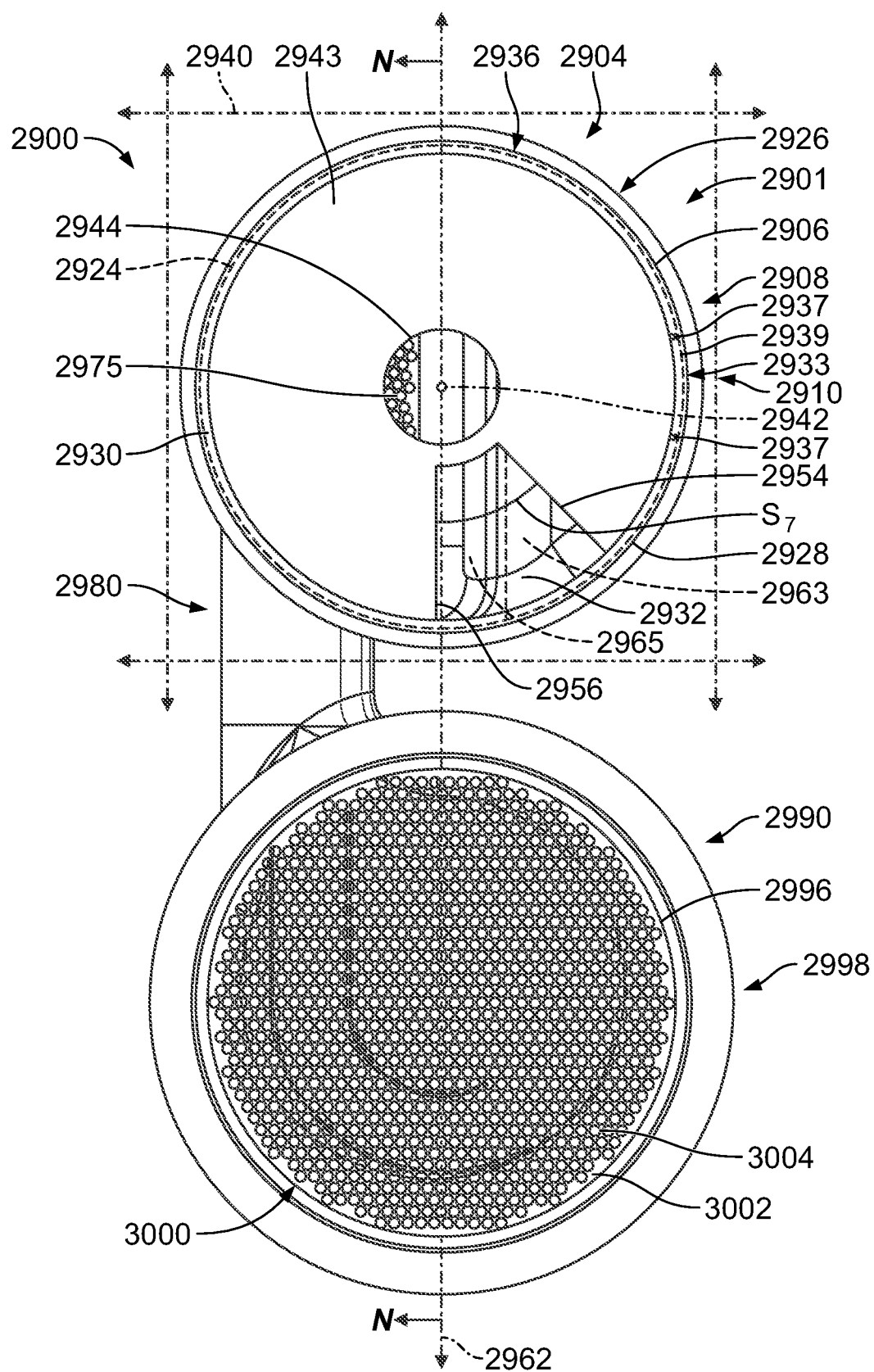
FIG. 30 is a front view of the reductant delivery system shown in FIG. 29.
Figure 31:
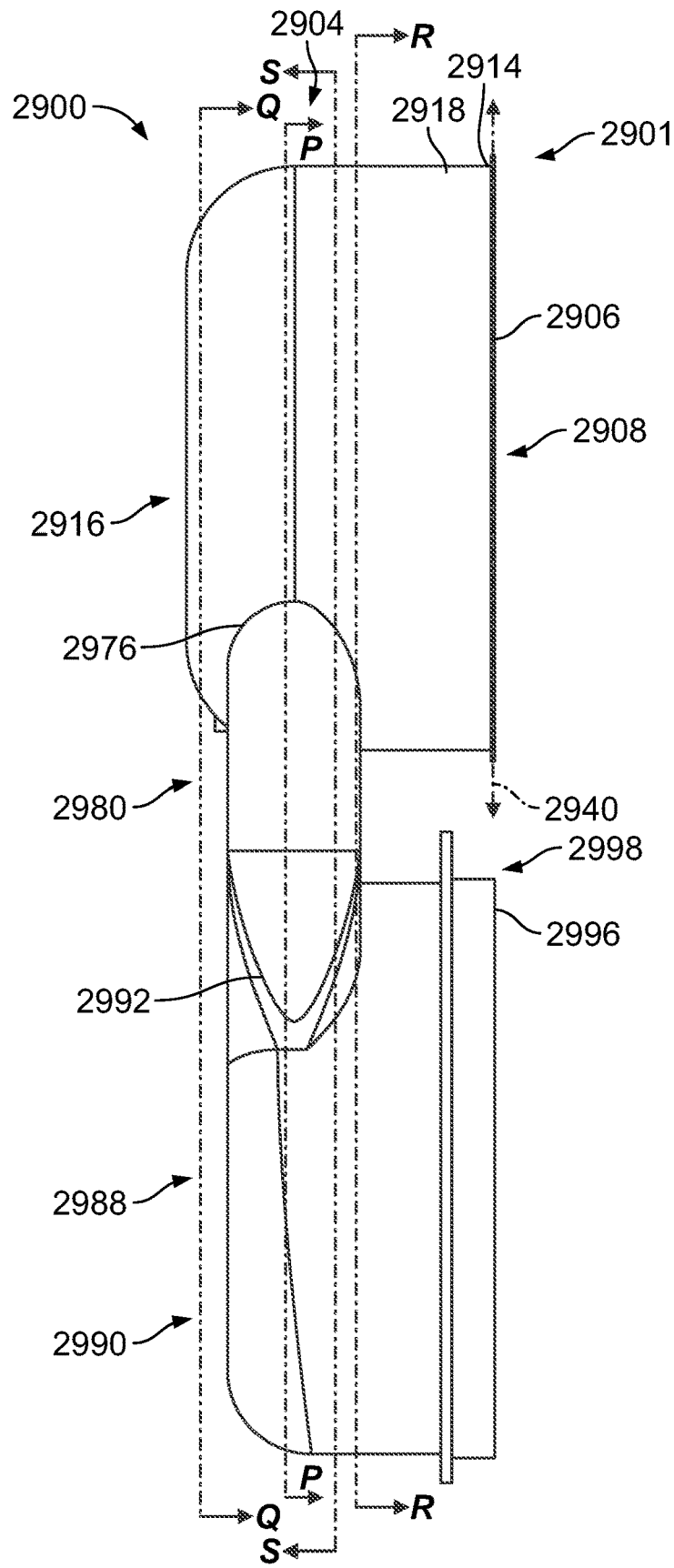
FIG. 31 is a side view of the reductant delivery system shown in FIG. 29.
Figure 32:
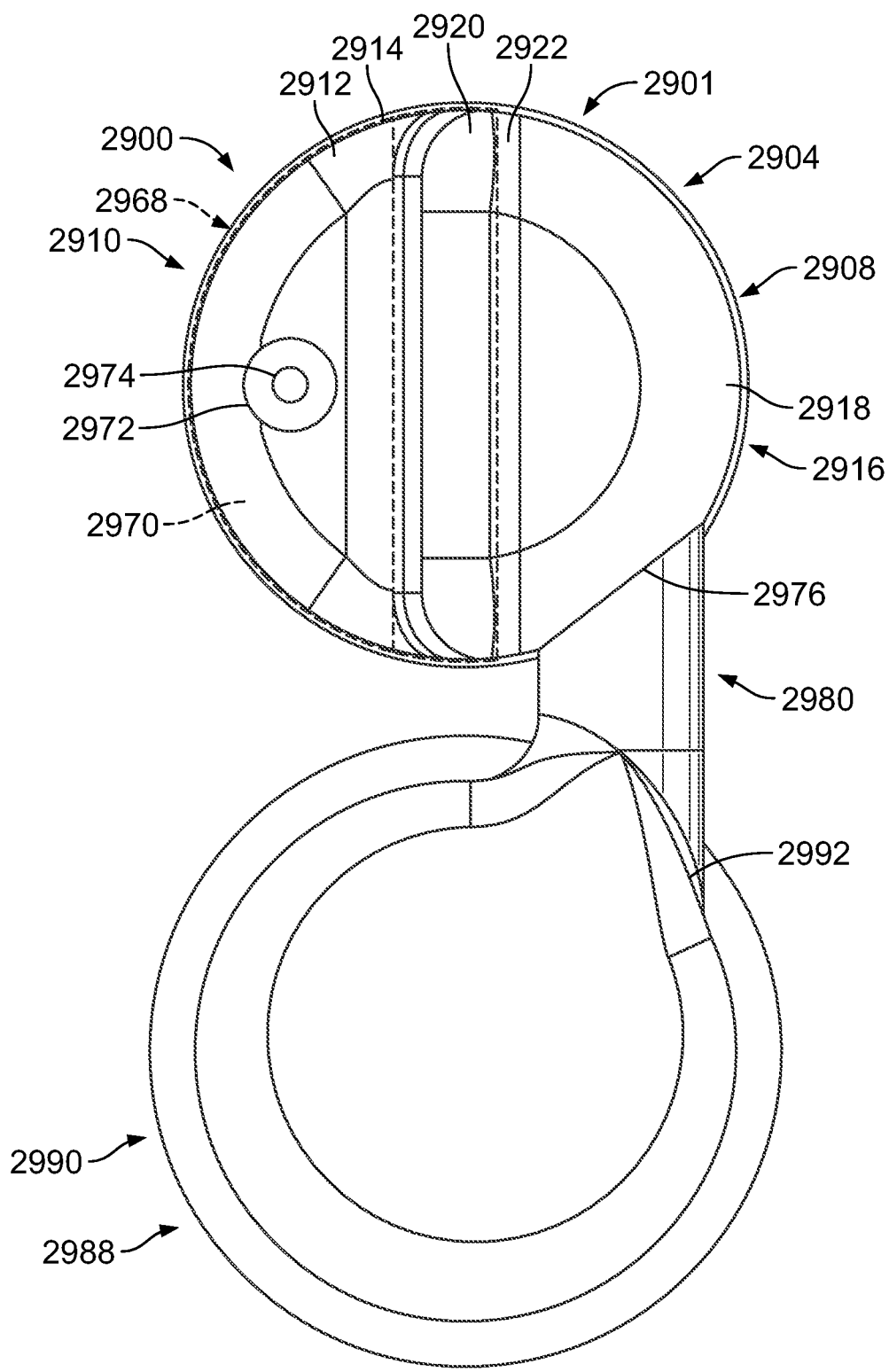
FIG. 32 is a rear view of the reductant delivery system shown in FIG. 29.
Figure 33:
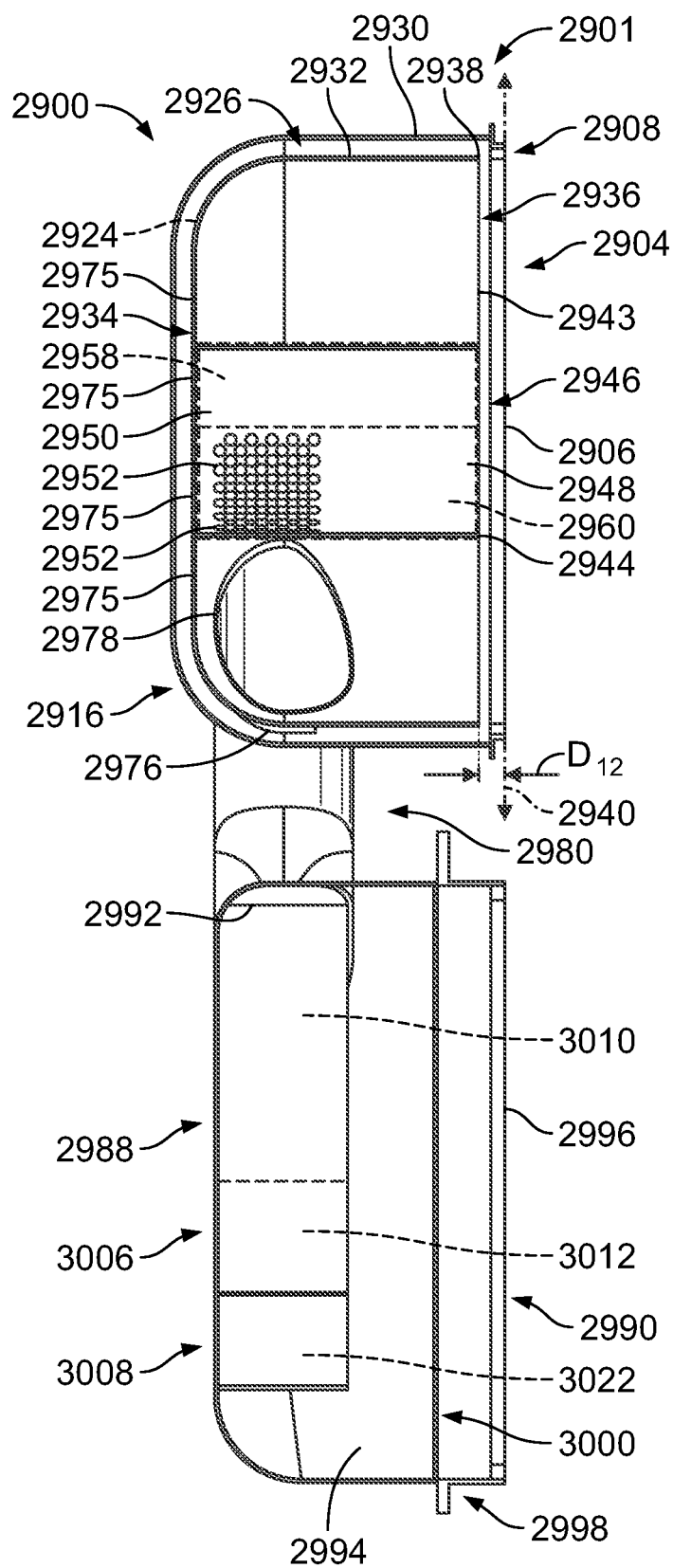
FIG. 33 is a side view of the reductant delivery system shown in FIG. 30, taken along plane N-N.

The inlet body inner shell 1926 also includes an inlet body inner shell dividing surface 1963 (e.g., face, panel, etc.). The inlet body inner shell dividing surface 1963 is contiguous with the inlet body inner shell wall 1932. The inlet body inner shell dividing surface 1963 is disposed along a plane that is approximately parallel to the inlet body inlet plane 1940 and separated from the inlet body inlet plane 1940 a tenth distance $D_{10}$, an approximation of which is shown in FIG. 22.

The inlet body outer mounting shell 1910 also includes an inlet body outer mounting shell dividing surface 1964 (e.g., face, panel, etc.). The inlet body outer mounting shell dividing surface 1964 is contiguous with the inlet body outer mounting shell inner surface 1928. The inlet body outer mounting shell dividing surface 1964 is disposed along a plane that is approximately parallel to the inlet body inlet plane 1940 and separated from the inlet body inlet plane 1940 an eleventh distance $D_{11}$, an approximation of which is shown in FIG. 22. The $D_{11}$ is greater than the $D_{10}$ and the inlet body outer mounting shell dividing surface 1964 is spaced apart (e.g., separated, etc.) from the inlet body inner shell dividing surface 1963.

The inlet body inner shell 1926 also includes an inlet body inner shell projecting surface 1965 (e.g., face, panel, etc.). The inlet body inner shell projecting surface 1965 is contiguous with the inlet body inner shell wall 1932 and the inlet body inner shell dividing surface 1963.

The inlet body outer mounting shell 1910 also includes an inlet body outer mounting shell projecting surface 1966 (e.g., face, panel, etc.). The inlet body outer mounting shell projecting surface 1966 is contiguous with the inlet body outer mounting shell inner surface 1928 and the inlet body outer mounting shell dividing surface 1964. The inlet body outer mounting shell projecting surface 1966 is spaced apart from the inlet body inner shell projecting surface 1965.

The inlet body outer mounting shell 1910 also includes an inlet body outer mounting shell recess 1968 (e.g., depression, etc.). The inlet body outer mounting shell recess 1968 is opposite the inlet body outer mounting shell dividing surface 1964. The inlet body outer mounting shell recess 1968 includes an inlet body outer mounting shell outer mounting surface 1970 (e.g., face, panel, etc.). The inlet body outer mounting shell outer mounting surface 1970 is opposite the inlet body outer mounting shell dividing surface 1964.

The inlet body inner shell 1926 also includes an inlet body inner shell recess 1967 (e.g., depression, etc.). The inlet body inner shell recess 1967 is opposite the inlet body inner shell dividing surface 1963. The inlet body inner shell recess 1967 includes an inlet body inner shell outer mounting surface 1971 (e.g., face, panel, etc.). The inlet body inner shell outer mounting surface 1971 is opposite the inlet body inner shell dividing surface 1963. The inlet body inner shell outer mounting surface 1971 is spaced apart from the inlet body outer mounting shell outer mounting surface 1970.

The inlet body outer mounting shell 1910 includes an outer injection aperture 1972 (e.g., opening, hole, window, etc.). The outer injection aperture 1972 extends through the inlet body outer mounting shell outer mounting surface 1970 and the inlet body outer mounting shell dividing surface 1964. The outer injection aperture 1972 is configured to receive an injection mount 1974 (e.g., mounting plate, etc.). The injection mount 1974 is configured to be coupled to the dosing module 192 and/or the injector 120 such that the dosing module 192 and/or the injector 120 is positioned to provide reductant into the inlet body outer mounting shell 1910 via the outer injection aperture 1972. The inlet body outer mounting shell outer mounting surface 1970 is generally disposed along a plane and facilitates coupling of the injection mount 1974 at various orientations, thereby accommodating various configurations of the dosing module 192 and/or the injector 120.

The inlet body inner shell 1926 also includes an inner injection aperture 1973. The inner injection aperture 1973 extends through the inlet body inner shell outer mounting surface 1971 and the inlet body inner shell dividing surface 1963. The inner injection aperture 1973 is configured to receive the injection mount 1974 (e.g., mounting plate, etc.). The injection mount 1974 extends between the inlet body outer mounting shell 1910 and the inlet body inner shell 1926. The inlet body inner shell outer mounting surface 1971 is generally disposed along a plane and facilitates coupling of the injection mount 1974 at various orientations, thereby accommodating various configurations of the dosing module 192 and/or the injector 120.

The inlet body inner shell 1926 also includes a plurality of inlet body inner shell apertures 1975 (e.g., perforations, openings, holes, etc.) disposed on the inlet body inner shell endcap surface 1934. Each of the inlet body inner shell apertures 1975 is disposed on the inlet body inner shell endcap surface 1934 within the distributor tube 1946 or around the distributor tube 1946. In various embodiments, at least one of the inlet body inner shell apertures 1975 is disposed on the inlet body inner shell endcap surface 1934 within the distributor tube 1946 and at least one of the inlet body inner shell apertures 1975 is disposed on the inlet body inner shell endcap surface 1934 around the distributor tube 1946. Each of the inlet body inner shell apertures 1975 is configured to facilitate passage of the exhaust gas from between the inlet body inner shell 1926 and the inlet body outer mounting shell 1910 and/or between the inlet body inner shell 1926 and the inlet body outer transfer shell 1916 into the inlet body inner shell 1926.

The inlet body inner shell apertures 1975 are separated from the separation panel 1956 by a ninth separation angle $\varphi_9$ along a plane parallel to the inlet body inlet plane 1940. In various embodiments, the $\varphi_9$ is greater than 5°. When measured along the inlet body inlet plane 1940 (e.g., from the inlet body inlet center point 1942, etc.), the inlet body inner shell apertures 1975 are distributed within a sixth sector angle $S_6$. In various embodiments, the $S_6$ is approximately equal to between 80° and 180°, inclusive (e.g., 79°, 80°, 90°, 100°, 140°, 145°, 150°, 180°, 181°, etc.).

At least some of the inlet body inner shell apertures 1975 are aligned with at least some of the distributor tube apertures 1952. In various embodiments, at least some of the inlet body inner shell apertures 1975 are located closer to the distributor tube second end 1950 than the inlet body inner shell wall 1932. In various embodiments, a diameter of each of the inlet body inner shell apertures 1975 is between ten times less than a diameter of the dividing plate opening 1944 and fifty times less than a diameter of the dividing plate opening 1944. In some embodiments, a diameter of each of the inlet body inner shell apertures 1975 is approximately equal to 6.35 mm.

In various embodiments, the inlet body 1904 also includes a shroud assembly 1976 (e.g., cover, etc.). The shroud assembly 1976 is similar to the shroud assembly 290. The shroud assembly 1976 is disposed along the inlet body outer mounting shell dividing surface 1964 and configured to partially shield the reductant provided through the outer injection aperture 1972 from exhaust gas.

The shroud assembly 1976 includes a shroud flange 1977 (e.g., band, etc.). The shroud flange 1977 is similar to the shroud flange 292. The shroud flange 1977 is coupled to the inlet body outer mounting shell dividing surface 1964 around the outer injection aperture 1972. The shroud flange 1977 extends around the inner injection aperture 1973 and may be coupled to the inlet body inner shell endcap surface 1934.

The shroud assembly also includes a shroud plate 1978 (e.g., cover, etc.). The shroud plate 1978 may be similar to the shroud plate 294. The shroud plate 1978 may be coupled to the shroud flange 1977 and the inlet body inner shell 1926 while not being coupled to the inlet body outer mounting shell 1910.

The shroud assembly 1976 also includes a shroud guide 1979 (e.g., fin, wall, barrier, etc.). The shroud guide 1979 is similar to the shroud guide 295. The shroud guide 1979 is coupled to the inlet body inner shell 1926. The shroud guide 1979 is also coupled to the shroud flange 1977 and/or the shroud plate 1978.

A shroud inlet 1980 (e.g., aperture, window, hole, etc.) is formed between the shroud plate 1978, the shroud flange 1977, the shroud guide 1979, the inlet body inner shell 1926 (e.g., around the inner injection aperture 1973, etc.), and the inlet body outer mounting shell inner surface 1928. The shroud inlet 1980 may be similar to the shroud inlet 296. The shroud inlet 1980 receives exhaust gas and provides the exhaust gas into the shroud assembly 1976, and therefore around the outer injection aperture 1972. This exhaust gas may assist propulsion of the reductant around the distributor tube 1946. The shroud guide 1979 directs a portion of the exhaust gas flowing between the inlet body inner shell wall 1932 and the inlet body outer mounting shell inner surface 1928 and/or between the inlet body inner shell wall 1932 and the inlet body outer transfer shell inner surface 1928 into the shroud inlet 1980.

A shroud outlet 1981 (e.g., aperture, window, hole, etc.) is formed between the shroud flange 1977 and the shroud plate 1978. The shroud outlet 1981 may be similar to the shroud outlet 297. The exhaust gas exits the shroud assembly 1976 via the shroud outlet 1981 (e.g., after the reductant has been provided into the exhaust gas, etc.).

The inlet body outer transfer shell 1916 includes an inlet body outer transfer shell outlet 1982 (e.g., aperture, opening, etc.). The inlet body outer transfer shell outlet 1982 extends through the inlet body outer transfer shell inner surface 1930 and is adjacent the inlet body inner shell wall 1932. In various embodiments, the inlet body outer transfer shell outlet 1982 is elliptical. In other embodiments, the inlet body outer transfer shell outlet 1982 is circular, square, rectangular, or otherwise similarly shaped.

The inlet body inner shell 1926 also includes an inlet body inner shell outlet 1983 (e.g., aperture, opening, etc.). The inlet body inner shell outlet 1983 extends through the inlet body inner shell wall 1932 and is adjacent the inlet body outer transfer shell outlet 1982. In various embodiments, the inlet body inner shell outlet 1983 and the inlet body outer transfer shell outlet 1982 are concentric (e.g., concentric ellipses, concentric circles, etc.). In various embodiments, the inlet body inner shell outlet 1983 is elliptical. In other embodiments, the inlet body inner shell outlet 1983 is circular, square, rectangular, or otherwise similarly shaped.

The reductant delivery system body 1901 also includes an inner transfer tube 1984 (e.g., conduit, pipe, connector, etc.). The inner transfer tube 1984 is coupled to the inlet body outer transfer shell 1916 around the inlet body outer transfer shell outlet 1982. The inner transfer tube 1984 includes an inner transfer tube straight portion 1985 and an inner transfer tube curved portion 1986. The inner transfer tube straight portion 1985 is contiguous with the inner transfer tube curved portion 1986 and separated from the inlet body outer transfer shell 1916 by the inner transfer tube curved portion 1986. The inner transfer tube curved portion 1986 gradually curves from the inner transfer tube straight portion 1985 and towards the inlet body outer transfer shell 1916 so as to facilitate a flush mating of the inner transfer tube curved portion 1986 against the inlet body outer transfer shell 1916 (e.g., due to a rounded shape of the inlet body outer transfer shell 1916, etc.).

The inner transfer tube straight portion 1985 is centered on an inner transfer tube center axis 1987. The inner transfer tube center axis 1987 extends through the inlet body outer transfer shell outlet 1982 and the inlet body inner shell outlet 1983, and intersects the inlet body inner shell 1926. In various embodiments, the inner transfer tube straight portion 1985 has an elliptical cross-section along a plane that is orthogonal to the inlet body inlet plane 1940, intersects the inner transfer tube center axis 1987, and intersects the reductant delivery system body bisecting plane 1962. In other embodiments, the inner transfer tube straight portion 1985 has a circular, square, rectangular, or otherwise similarly shaped cross-section along a plane that is orthogonal to the inlet body inlet plane 1940, intersects the inner transfer tube center axis 1987, and intersects the reductant delivery system body bisecting plane 1962.

The inner transfer tube center axis 1987 is separated from the reductant delivery system body bisecting plane 1962 by a tenth separation angle $\varphi_{10}$ along a plane parallel to the inlet body inlet plane 1940. In various embodiments, the $\varphi_{10}$ is less than approximately equal to 50°. In some embodiments, the $\varphi_{10}$ is approximately equal to 14°.

The inner transfer tube straight portion 1985 is coupled to an outlet body shell 1988 (e.g., body, frame, etc.) of an outlet body 1990 (e.g., shell, frame, assembly, etc.) of the reductant delivery system body 1901. Specifically, the inner transfer tube straight portion 1985 is coupled to the outlet body shell 1988 around an outlet body shell inlet 1992 (e.g., aperture, opening, etc.). In various embodiments, the inlet body 1904 is only coupled to the outlet body 1990 through the inner transfer tube 1984. The outlet body shell inlet 1992 extends through an outlet body shell inner surface 1994 (e.g., face, etc.) of the outlet body shell 1988. In various embodiments, the outlet body shell inlet 1992 is elliptical. In other embodiments, the outlet body shell inlet 1992 is circular, square, rectangular, or otherwise similarly shaped.

The relationship between the outlet body shell inlet 1992, the inlet body outer transfer shell outlet 1982, and the inlet body inner shell outlet 1983 causes the reductant delivery system 1900 to be generally Z-shaped or generally S-shaped. This shape enables the exhaust gas to travel for a longer period of time within the inner transfer tube 1984 for the same distance between the inlet body 1904 and the outlet body 1990 (e.g., between a center point of the inlet body 1904 and a center point of the outlet body 1990, etc.) than if the outlet body shell inlet 1992, the inlet body outer transfer shell outlet 1982, and the inlet body inner shell outlet 1983 were arranged so that the reductant delivery system was generally B-shaped or generally I-shaped.

The outlet body 1990 does not include an inner shell similar to the inlet body inner shell 1926, or a dividing plate similar to the dividing plate 1936. However, the outlet body 1990 includes an outlet body outlet 1996 (e.g., opening, aperture, etc.). The outlet body outlet 1996 is configured to provide exhaust gas to the exhaust gas conduit system 104. In some embodiments, the reductant delivery system 1900 is positioned upstream of the SCR catalyst member 108 such that the SCR catalyst member 108 receives exhaust gas from the outlet body outlet 1996.

The outlet body 1990 also includes an outlet body coupler 1998 (e.g., body, etc.). The outlet body coupler 1998 borders the outlet body outlet 1996. The outlet body coupler 1998 is coupled to the exhaust gas conduit system 104 around the outlet body outlet 1996. In various embodiments, the outlet body coupler 1998 is circular.

The outlet body 1990 also includes a perforated plate 2000 (e.g., wall, flange, etc.). The perforated plate 2000 extends across a diameter of the outlet body shell 1988. The perforated plate 2000 includes a perforated plate coupling surface 2002 (e.g., face, etc.). In various embodiments, the perforated plate coupling surface 2002 is disposed along a circle. In other embodiments, the perforated plate coupling surface 2002 is disposed along an ellipse.

The perforated plate 2000 also includes a plurality of perforated plate perforations 2004 (e.g., apertures, openings, holes, etc.). The perforated plate 2000 is coupled to the outlet body shell 1988 such that exhaust gas flowing from the outlet body outlet 1996 first passes through the perforated plate 2000 via one of the perforated plate perforations 2004 (e.g., such that none of the exhaust gas can bypass the perforated plate 2000, etc.).

The outlet body 1990 also includes a first flow guide 2006 and a second flow guide 2008. The first flow guide 2006 and the second flow guide 2008 extend within the outlet body shell 1988. The first flow guide 2006 and the second flow guide 2008 are each coupled to the outlet body shell inner surface 1994 and/or the perforated plate 2000. The first flow guide 2006 diverts a portion of the exhaust gas to a first portion of the outlet body outlet 1996, which may correspond with a top section of a substrate positioned downstream of the outlet body 1900. However, as explained herein, the first flow guide 2006 enables a portion of the exhaust gas to flow through the first flow guide 2006 to the second flow guide 2008. The second flow guide 2008 diverts a portion of the exhaust gas to a second portion of the outlet body outlet 1996, which may correspond with a middle section of a substrate positioned downstream of the outlet body 1900. Furthermore, a portion of the exhaust gas flows through the second flow guide 2008 and is diverted to a third portion of the outlet body outlet 1996, which may correspond with a lower section of a substrate position downstream of the outlet body 1900. As a result, the first flow guide 2006 and the second flow guide 2008 may uniformly distribute the exhaust gas across an entire surface of a substrate positioned downstream of the outlet body 1900.

The first flow guide 2006 is centered on a first flow guide center axis 2010. The first flow guide center axis 2010 extends across the outlet body shell inlet 1992 when the first flow guide 2006 is viewed through the inner transfer tube

1984. The first flow guide center axis 2010 is separated from the reductant delivery system body bisecting plane 1962 by an eleventh separation angle $\varphi_{11}$ along a plane parallel to the inlet body inlet plane 1940. In various embodiments, the $\varphi_{11}$ is greater than approximately equal to 50°. In some embodiments, the $\varphi_{11}$ is equal to the sum of the $\varphi_{10}$ and 90° such that the inner transfer tube center axis 1987 and the first flow guide center axis 2010 are perpendicular. In some embodiments, the $\varphi_{11}$ is approximately equal to 76°.

The first flow guide 2006 functions to receive the exhaust gas from the inner transfer tube 1984 and cause the exhaust gas to be redirected within the outlet body 1990 so as to aid in rotation of the exhaust gas within the outlet body 1990. This rotation enhances mixing of the reductant and the exhaust gas within the outlet body 1990. Additionally, this rotation increases heat transfer to the reductant, thereby increasing decomposition of the reductant and mitigating impingement of reductant on various surfaces of the reductant delivery system 1900. Furthermore, this rotation also decreases a backpressure of the reductant delivery system 1900 because the momentum of the exhaust gas exiting the inner transfer tube 1984 is gradually dissipated during rotation of the exhaust gas within the outlet body 1990 caused by the first flow guide 2006. By selecting the $\varphi_{11}$, the rotation provided by the first flow guide 2006 can be tailored for a target application.

The second flow guide 2008 is centered on a second flow guide center axis 2012. The second flow guide center axis 2012 extends across the outlet body shell inlet 1992 when the second flow guide 2008 is viewed through the inner transfer tube 1984. In various embodiments, the second flow guide center axis 2012 intersects the first flow guide center axis 2010. The second flow guide center axis 2012 is separated from the reductant delivery system body bisecting plane 1962 by a twelfth separation angle $\varphi_{12}$ along a plane parallel to the inlet body inlet plane 1940. In various embodiments, the $\varphi_{12}$ is greater than approximately equal to 50°. In some embodiments, the $\varphi_{12}$ is equal to the sum of the $\varphi_{10}$ and 90° such that the inner transfer tube center axis 1987 and the first flow guide center axis 2010 are perpendicular. In some embodiments, the $\varphi_{12}$ is equal to the $\varphi_{11}$ such that the first flow guide center axis 2010 and the second flow guide center axis 2012 are parallel. In some embodiments, the (pie is approximately equal to 76°.

The second flow guide 2008 functions to receive the exhaust gas from the inner transfer tube 1984 and cause the exhaust gas to be redirected within the outlet body 1990 so as to aid in rotation of the exhaust gas within the outlet body 1990. This rotation enhances mixing of the reductant and the exhaust gas within the outlet body 1990. Additionally, this rotation increases heat transfer to the reductant, thereby increasing decomposition of the reductant and mitigating impingement of reductant on various surfaces of the reductant delivery system 1900. Furthermore, this rotation also decreases a backpressure of the reductant delivery system 1900 because the momentum of the exhaust gas exiting the inner transfer tube 1984 is gradually dissipated during rotation of the exhaust gas within the outlet body 1990 caused by the first flow guide 2006. By selecting the $\varphi_{12}$, the rotation provided by the first flow guide 2006 can be tailored for a target application.

Reductant may impinge upon the first flow guide 2006 and/or the second flow guide 2008. However, because the first flow guide 2006 and the second flow guide 2008 are immersed in exhaust gas (e.g., exhaust gas flows in front of the first flow guide 2006 and behind the first flow guide 2006, exhaust gas flows in front of the second flow guide 2008 and behind the second flow guide 2008), the first flow guide 2006 and the second flow guide 2008 may be heated to a relatively high temperature by the exhaust gas. This heating facilitates decomposition of reductant impinging upon the first flow guide 2006 and/or the second flow guide 2008.

In operation, the exhaust gas flows into the inlet body inlet 1906 (e.g., from the exhaust gas conduit system 104, etc.). As is described herein, the exhaust gas flowing through the reductant delivery system 1900 is variously directed, diverted, and split so as to facilitate enhanced mixing and decomposition of reductant into the exhaust gas and mitigate impingement of reductant on various surfaces of the reductant delivery system 1900. In these ways, the reductant delivery system 1900 can be more desirable than other systems which do not include similar mechanisms for enhancing mixing and decomposition of reductant into the exhaust gas and mitigating impingement of reductant (e.g., due to additional cleaning of reductant deposits in these systems, etc.).

A first portion of the exhaust gas flows through the dividing plate window 1954 and between the dividing plate panel 1943, the separation panel 1956, the distributor tube panel portion 1958, the inlet body inner shell endcap surface 1934, the inlet body inner shell dividing surface 1963, and the inlet body inner shell projecting surface 1965, and subsequently along the inlet body inner shell dividing surface 1963, the inlet body inner shell projecting surface 1965, and/or the inlet body inner shell endcap surface 1934 and around the transfer tube 1946. As the exhaust gas flows around the transfer tube 1946, the exhaust gas is caused to swirl (e.g., about an axis extending through the inlet body inlet center point 1942 and orthogonal to the inlet body inlet plane 1940, etc.). The first portion of the exhaust gas then flows into the inner transfer tube curved portion 1986 via the inlet body inner shell outlet 1983.

Prior to flowing into the inner transfer tube curved portion 1986, the first portion of the exhaust gas is provided with reductant through the outer injection aperture 1972 and the inner injection aperture 1973. The reductant mixes with the first portion of the exhaust gas and is caused to swirl with the first portion of the exhaust gas around the transfer tube 1946.

An injection assist portion of the first portion of the exhaust gas flows into the shroud assembly 1976 via the shroud inlet 1980 (e.g., between the shroud plate 1978, the shroud flange 1977, and the inlet body outer mounting shell dividing surface 1964, etc.). The injection assist portion of the exhaust gas is provided with reductant via the outer injection aperture 1972 and the inner injection aperture 1973 (e.g., from the injector 120 and/or the dosing module 192). The injection assist portion of the first portion of the exhaust gas then exits the shroud assembly 1976 via the shroud outlet 1981. The injection assist portion of the exhaust gas may aide in propelling the reductant around the transfer tube 1946. Specifically, the shroud assembly 1976 may protect the flow of the exhaust gas and reductant away from the inlet body inner shell endcap surface 1934 from the flow of the exhaust gas towards the inlet body inner shell endcap surface 1934, thereby enabling additional reductant to be provided to the inner transfer tube curved portion 1986 (e.g., rather than being propelled against the inlet body inner shell endcap surface 1934, etc.). In various embodiments, the injection assist portion may be approximately equal to 5%, 4%, 3%, 2%, or other similar values of the total exhaust flow into the inlet body inlet 1906.

A second portion of the exhaust gas, different from the exhaust gas that flows through the dividing plate window 1954, flows through the dividing plate opening 1944 and into the transfer tube 1946. The second portion of the exhaust gas flows from the transfer tube first end 1948 towards the transfer tube second end 1950. The second portion of the exhaust gas then exits the transfer tube 1946 via the transfer tube apertures 1952 and joins the first portion of the exhaust gas between the dividing plate panel 1943, the separation panel 1956, the distributor tube panel portion 1958, the inlet body inner shell endcap surface 1934, the inlet body inner shell dividing surface 1963, and the inlet body inner shell projecting surface 1965.

By being separated from the dividing plate window 1954, the second portion of the exhaust gas joins the first portion of the exhaust gas after rotation of the first portion of the exhaust gas has already begun. As a result, rotation of the first portion of the exhaust gas is not substantially reduced by the introduction of the second portion of the exhaust gas into the first portion of the exhaust gas. Furthermore, at least some of the transfer tube apertures 1952 may be aligned with the inlet body inner shell outlet 1983. As a result, the second portion of the exhaust gas exiting these transfer tube apertures 1952 may propel the exhaust gas towards the inlet body inner shell outlet 1983. The locations of the transfer tube apertures 1952 are selected so that the exhaust gas exiting each transfer tube aperture 1952 does not substantially alter the swirl of the exhaust gas about the transfer tube 1946. Additionally, the exhaust gas that flows within the transfer tube 1946 is relatively hot (e.g., compared to exhaust gas that has been mixed with reductant, etc.). As a result, impingement of reductant on the transfer tube 1946 is mitigated.

A third portion of the exhaust gas, different from the exhaust gas that flows through the dividing plate window 1954 or the exhaust gas that flows through the dividing plate opening 1944, flows between the inlet body outer mounting shell inner surface 1928 and the inlet body inner shell wall 1932 (e.g., between the inlet body outer mounting shell 1910 and the inlet body inner shell 1926, etc.) and between the inlet body outer transfer shell inner surface 1930 and the inlet body inner shell wall 1932 (e.g., between the inlet body outer transfer shell 1916 and the inlet body inner shell 1926, etc.). The exhaust gas creates a flow along the inlet body inner shell wall 1932 that mitigates impingement of reductant on the inlet body inner shell wall 1932 (e.g., due to heating of the inlet body inner shell wall 1932 by relatively hot exhaust gas, etc.).

Some of the third portion of the exhaust gas flows through the inlet body inner shell apertures 1975 and into the inlet body inner shell 1926 or through the inlet body inner shell apertures 1975 and into the transfer tube 1946. Specifically, some of the inlet body inner shell apertures 1975 are bordered (e.g., circumscribed, enclosed, etc.) by the transfer tube 1946 and others of the inlet body inner shell apertures 1975 partially border (e.g., circumscribe, border, etc.) the transfer tube 1946. In various embodiments, at least some of the inlet body inner shell apertures 1975 are aligned with at least some of the transfer tube apertures 1952 (e.g., a center axis of an inlet body inner shell aperture 1975 extends across a transfer tube aperture 1952 when viewed on a plane along which the transfer tube aperture 1952 is disposed, a center axis of a transfer tube aperture 1952 extends across an inlet body inner shell aperture 1975 when viewed on a plane along which the inlet body inner shell aperture 1975 is disposed, etc.). As a result, exhaust gas flowing from the aligned inlet body inner shell aperture 1975 and exhaust gas flowing from the transfer tube aperture 1952 mix and may be cooperatively directed towards the inlet body inner shell outlet 1983. As a result, a backpressure of the reductant delivery system 1900 may be reduced. The exhaust gas that flows through the inlet body inner shell apertures 1975 and into the transfer tube 1946 aids the transfer tube 1946 in directing exhaust gas into the transfer tube apertures 1952. As a result, a backpressure of the reductant delivery system 1900 may be reduced. Additionally, the exhaust gas flowing through all of the inlet body inner shell apertures 1975 is relatively hot (e.g., compared to exhaust gas that has been mixed with reductant, etc.). As a result, impingement of reductant on the inlet body inner shell wall 1932 and/or the inlet body inner shell endcap surface 1934 is mitigated.

Some of the exhaust gas flowing between the inlet body outer mounting shell inner surface 1928 and the inlet body inner shell wall 1932 is directed into the shroud inlet 1980 by the shroud guide 1979.

The exhaust gas flowing within the inner transfer tube curved portion 1986 flows to the inner transfer tube straight portion 1985. The exhaust gas flowing within the inner transfer tube straight portion 1985 flows into the outlet body shell 1988. The exhaust gas flowing within the outlet body shell 1988 may flow along the outlet body shell inner surface 1994 so as to cause the exhaust gas to swirl. This swirl may be enhanced by the $\varphi_{10}$ which effectively causes the exhaust gas to flow into the outlet body shell 1988 semi-tangentially (e.g., as opposed to axially, as opposed to radially, etc.). Additionally, this swirl may be enhanced by the first flow guide 2006 and/or the second flow guide 2008.

The exhaust gas flowing within the outlet body shell 1988 then flows through the perforated plate 2000 and exits the outlet body 1990 via the outlet body outlet 1996. By flowing through the perforated plate 2000, the flow of the exhaust gas may be straightened, thereby enhancing the uniformity of the exhaust gas that flows towards components of the exhaust gas aftertreatment system 100 (e.g., the SCR catalyst member 108, etc.) that are downstream of the reductant delivery system 1900.

The inlet body outer mounting shell 1910 may also include an inlet body outer mounting shell first sensor coupling mount (e.g., projection, etc.). The inlet body outer mounting shell first sensor coupling mount may extend (e.g., projects, protrudes, etc.) from an outer surface of the inlet body outer mounting shell 1910. The inlet body outer mounting shell first sensor coupling mount may be located upstream of the outer injection aperture 1972. As a result, a sensor coupled to the inlet body outer mounting shell first sensor coupling mount may be subjected to a relatively high flow rate of the exhaust gas and may be substantially isolated from reductant, thereby enabling accurate measurements to be obtained by the sensor (e.g., because the sensor is not covered in reductant deposits, etc.). In other embodiments, the inlet body outer mounting shell first sensor coupling mount may be located in other locations.

The reductant delivery system 1900 may also include an inlet body outer mounting shell temperature sensor coupling. The inlet body outer mounting shell temperature sensor coupling may be coupled to the inlet body outer mounting shell first sensor coupling mount and configured to be coupled to the upstream temperature sensor 138. The inlet body outer mounting shell first sensor coupling mount may be configured to provide exhaust gas to the upstream temperature sensor 138 and/or to receive the upstream temperature sensor 138 such that the upstream temperature sensor 138 extends into the inlet body outer mounting shell 1910. The upstream temperature sensor 138 may determine a temperature of the exhaust gas prior to the exhaust gas flowing into the inner transfer tube curved portion 1986.

The inlet body outer mounting shell 1910 may also include an inlet body outer mounting shell second sensor coupling mount (e.g., projection, etc.). The inlet body outer mounting shell second sensor coupling mount may extend (e.g., projects, protrudes, etc.) from an outer surface of the inlet body outer mounting shell 1910. The inlet body outer mounting shell second sensor coupling mount may be centered on an axis that extends through the inlet body inlet 1906 (e.g., orthogonally to the inlet body inlet plane 1940, etc.). The reductant delivery system 1900 may also include an inlet body outer mounting shell pressure sensor coupling. The inlet body outer mounting shell pressure sensor coupling may be coupled to the inlet body outer mounting shell second sensor coupling mount and configured to be coupled to the pressure sensor 140. The inlet body outer mounting shell second sensor coupling mount may be configured to provide exhaust gas to the pressure sensor 140 and/or to receive the pressure sensor 140 such that the pressure sensor 140 extends into the inlet body outer mounting shell 1910. The pressure sensor 140 may determine a pressure of the exhaust gas prior to the exhaust gas flowing into the inner transfer tube curved portion 1986.

The outlet body shell 1988 may also include an outlet body shell sensor coupling mount (e.g., projection, etc.). The outlet body shell sensor coupling mount may extend from an outer surface of the outlet body shell 1988. The outlet body shell sensor coupling mount may be centered on an axis that extends across the outlet body shell 1988. The outlet body shell sensor coupling mount may be located such that the outlet body shell sensor coupling mount is opposite a target location on the outlet body shell inner surface 1994 (e.g., depending on an application of the reductant delivery system 1900, depending on space claim requirements for the reductant delivery system 1900, etc.).

The reductant delivery system 1900 may also include an outlet body shell temperature sensor coupling. The outlet body shell temperature sensor coupling may be coupled to the outlet body shell sensor coupling mount and configured to be coupled to the downstream temperature sensor 142. The outlet body shell temperature sensor coupling may be configured to provide exhaust gas to the downstream temperature sensor 142 and/or to receive the downstream temperature sensor 142 such that the downstream temperature sensor 142 extends into the outlet body shell 1988. The downstream temperature sensor 142 may determine a temperature of the exhaust gas after the exhaust gas flows into the outlet body shell (e.g., via the inner transfer tube straight portion 1985, etc.).

Rather than the inlet body outer mounting shell 1910 and the inlet body outer transfer shell 1916 being separate components that are coupled together, it is understood that the inlet body outer mounting shell 1910 and the inlet body outer transfer shell 1916 may also be structurally integrated (e.g., formed from a one-piece construction, etc.), in some embodiments.

VI. Fourth Example Reductant Delivery System

FIGS. 29-37 illustrate a reductant delivery system 2900, according to an example embodiment. The reductant delivery system 2900 is the reductant delivery system 102 in various embodiments. The reductant delivery system 2900 is similar to the reductant delivery system 200. The reductant delivery system 2900 includes a reductant delivery system body 2901 (e.g., shell, frame, assembly, etc.). The reductant delivery system body 2901 includes an inlet body 2904 (e.g., shell, frame, assembly, etc.). The inlet body 2904 includes an inlet body inlet 2906 (e.g., opening, aperture, etc.). The inlet body inlet 2906 is configured to receive exhaust gas from the exhaust gas conduit system 104. In some embodiments, the reductant delivery system 2900 is positioned downstream of the particulate filter 106 such that the inlet body inlet 2906 receives exhaust gas from the particulate filter 106.

The inlet body 2904 includes an inlet body coupler 2908 (e.g., body, etc.). The inlet body coupler 2908 borders the inlet body inlet 2906. The inlet body coupler 2908 is coupled to the exhaust gas conduit system 104 around the inlet body inlet 2906. In various embodiments, the inlet body coupler 2908 is circular.

The inlet body 2904 also includes an inlet body outer mounting shell 2910 (e.g., body, frame, etc.). The inlet body outer mounting shell 2910 includes an inlet body outer mounting shell coupling surface 2912 (e.g., face, etc.). In various embodiments, the inlet body outer mounting shell coupling surface 2912 is disposed along a circular arc. The inlet body outer mounting shell coupling surface 2912 is in contact with an inlet body coupler coupling surface 2914 (e.g., face, etc.) of the inlet body coupler 2908. In various embodiments, the inlet body coupler coupling surface 2914 is disposed along a circular arc. In various embodiments, the inlet body outer mounting shell coupling surface 2912 is coupled to the inlet body coupler coupling surface 2914.

The inlet body 2904 also includes an inlet body outer transfer shell 2916 (e.g., body, frame, etc.). The inlet body outer transfer shell 2916 includes an inlet body outer transfer shell coupling surface 2918 (e.g., face, etc.) that is in contact with the inlet body coupler coupling surface 2914. In various embodiments, the inlet body outer transfer shell coupling surface 2918 is disposed along a circular arc. In some embodiments, the inlet body outer mounting shell coupling surface 2912 is disposed along a circular arc having a first radius and the inlet body outer transfer shell coupling surface 2918 is disposed along a circular arc having the first radius. In some embodiments, the inlet body outer mounting shell coupling surface 2912 and the inlet body outer transfer shell coupling surface 2918 are both disposed along the same circle. In various embodiments, the inlet body outer transfer shell coupling surface 2918 is coupled to the inlet body coupler coupling surface 2914.

The inlet body outer mounting shell 2910 includes an inlet body outer mounting shell mating surface 2920 (e.g., face, etc.). The inlet body outer mounting shell mating surface 2920 is contiguous with the inlet body outer mounting shell coupling surface 2912. Similarly, the inlet body outer transfer shell 2916 includes an inlet body outer transfer shell mating surface 2922 (e.g., face, etc.). The inlet body outer transfer shell mating surface 2922 is contiguous with the inlet body outer transfer shell coupling surface 2918. In various embodiments, the inlet body outer mounting shell mating surface 2920 is coupled to the inlet body outer transfer shell mating surface 2922 such that the inlet body outer mounting shell 2910 is coupled to the inlet body outer transfer shell 2916. Collectively, the inlet body outer mounting shell 2910 and the inlet body outer transfer shell 2916 define an inlet body cavity 2924 (e.g., void, region, space, etc.).

The inlet body 2904 also includes an inlet body inner shell 2926 (e.g., body, frame, etc.). The inlet body inner shell 2926 is contained within the inlet body cavity 2924. The inlet body inner shell 2926 does not include flanges similar to the inlet body inner shell first flange 228 or the inlet body inner shell second flange 232. The inlet body inner shell 2926 is separated from an inlet body outer mounting shell inner surface 2928 (e.g., face, etc.) of the inlet body outer mounting shell 2910 and an inlet body outer transfer shell inner surface 2930 (e.g., face, etc.) of the inlet body outer transfer shell 2916. In some embodiments, the inlet body outer mounting shell inner surface 2928 is opposite the inlet body outer mounting shell coupling surface 2912. In some embodiments, the inlet body outer transfer shell inner surface 2930 is opposite the inlet body outer transfer shell mating surface 2922.

The inlet body inner shell 2926 includes an inlet body inner shell wall 2932. The inlet body inner shell 2926 also includes an inlet body inner shell endcap surface 2934. The inlet body inner shell endcap surface 2934 is contiguous with the inlet body inner shell wall 2932. The inlet body inner shell endcap surface 2934 is separated from the inlet body outer transfer shell mating surface 2922 and the inlet body outer mounting shell inner surface 2928. As is explained in more detail herein, the inlet body inner shell endcap surface 2934 is shaped to match the inlet body outer mounting shell inner surface 2928 and the inlet body outer transfer shell inner surface 2930, such that a gap between the inlet body inner shell endcap surface 2934 and the inlet body outer mounting shell inner surface 2928 is substantially constant along the inlet body outer mounting shell inner surface 2928 and is approximately equal to a gap between the inlet body inner shell endcap surface 2934 and the inlet body outer transfer shell inner surface 2930 that is substantially constant along the inlet body outer transfer shell inner surface 2930. In some embodiments, this gap is approximately equal to 8.5 mm.

The inlet body 2904 also includes a dividing plate 2936 (e.g., flange, wall, etc.). The dividing plate 2936 is at least partially contained within the inlet body inner shell wall 2932. The dividing plate 2936 includes a dividing plate coupling surface 2938 (e.g., face, etc.). The dividing plate coupling surface 2938 is coupled to the inlet body inner shell wall 2932. In various embodiments, the dividing plate coupling surface 2938 is coupled to the inlet body inner shell wall 2932 along the length of the dividing plate coupling surface 2938 (e.g., such that flow of the exhaust gas between the dividing plate coupling surface 2938 and the inlet body inner shell wall 2932 is prohibited, etc.). In other embodiments, the dividing plate coupling surface 2938 is not coupled to the inlet body inner shell wall 2932 along the length of the dividing plate coupling surface 2938, and is instead coupled to the inlet body inner shell wall 2932 at one or more locations along the dividing plate coupling surface 2938 (e.g., such that flow of the exhaust gas between the dividing plate coupling surface 2938 and the inlet body inner shell wall 2932 is facilitated, etc.). In various embodiments, the dividing plate coupling surface 2938 is disposed along a circular arc. In other embodiments, the dividing plate coupling surface 2938 is disposed along an elliptical arc.

The inlet body inlet 2906 is disposed along an inlet body inlet plane 2940. The dividing plate coupling surface 2938 is separated from the inlet body inlet plane 2940 by a twelfth distance $D_{12}$. In various embodiments, the $D_{12}$ is constant along the dividing plate coupling surface 2938 (e.g., the dividing plate coupling surface 2938 is parallel to the inlet body inlet plane 2940, etc.). In some embodiments, the $D_{12}$ is approximately equal to 28.6 mm.

The inlet body inlet 2906 is defined by an inlet body inlet center point 2942 (e.g., centroid, etc.). The dividing plate 2936 includes a dividing plate panel 2943 (e.g., face, surface, portion, etc.). The dividing plate panel 2943 is contiguous with the dividing plate coupling surface 2938. In various embodiments, the dividing plate panel 2943 is parallel to the inlet body inlet plane 2940. In other embodiments, the dividing plate panel 2943 is angled (e.g., tilted, inclined, etc.) relative to the inlet body inlet plane 2940.

The dividing plate panel 2943 includes a dividing plate opening 2944 (e.g., aperture, etc.). The dividing plate opening 2944 is configured to receive the exhaust gas from the inlet body inlet 2906. The dividing plate opening 2944 facilitates flow of the exhaust gas through the dividing plate panel 2943 as opposed to around the dividing plate panel 2943. In various embodiments, the dividing plate opening 2944 is centered on the inlet body inlet center point 2942. The dividing plate opening 2944 may be circular, square, triangular, or otherwise similarly shaped.

Figure 34:
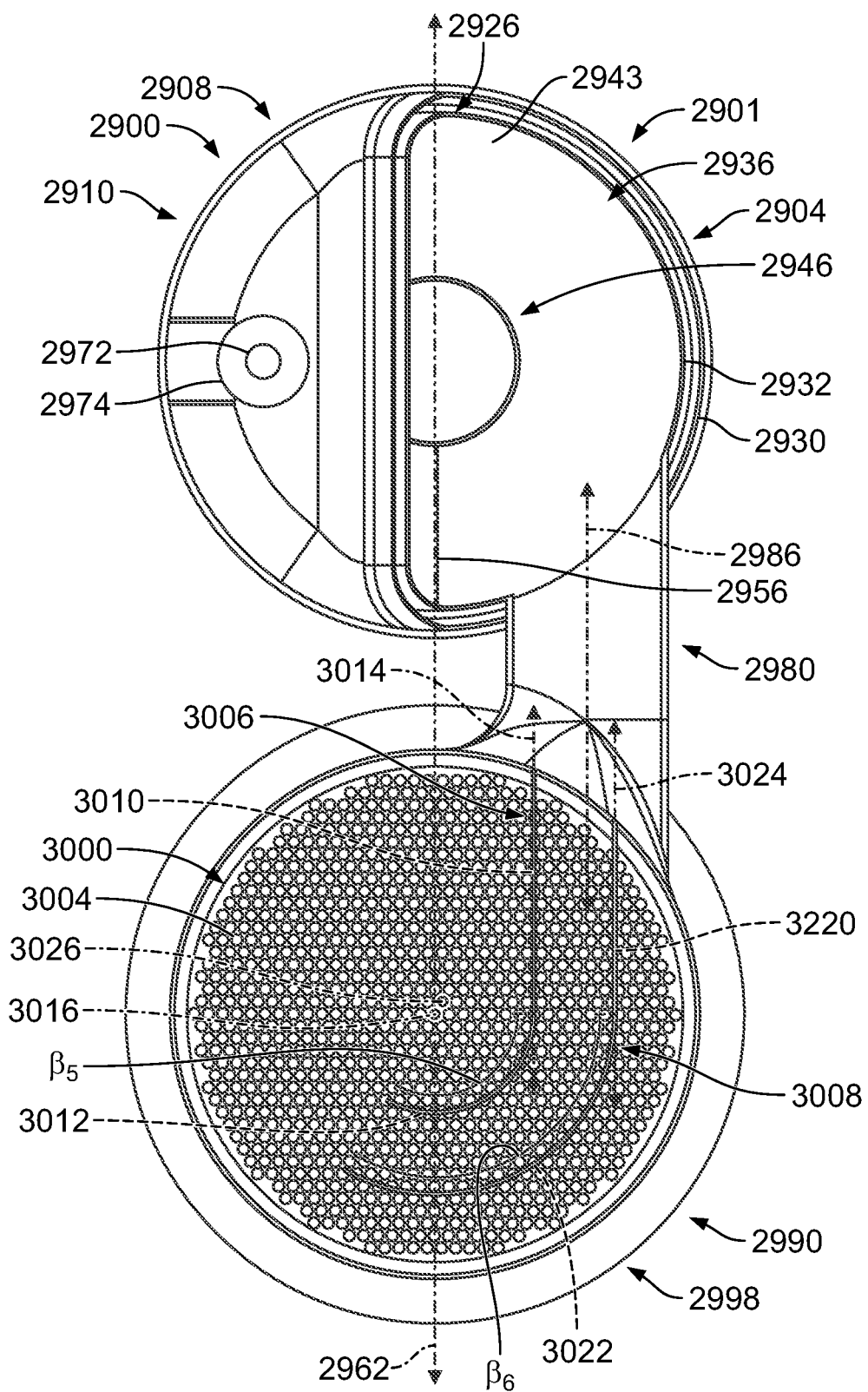
FIG. 34 is a rear view of the reductant delivery system shown in FIG. 31, taken along plane P-P.
Figure 35:
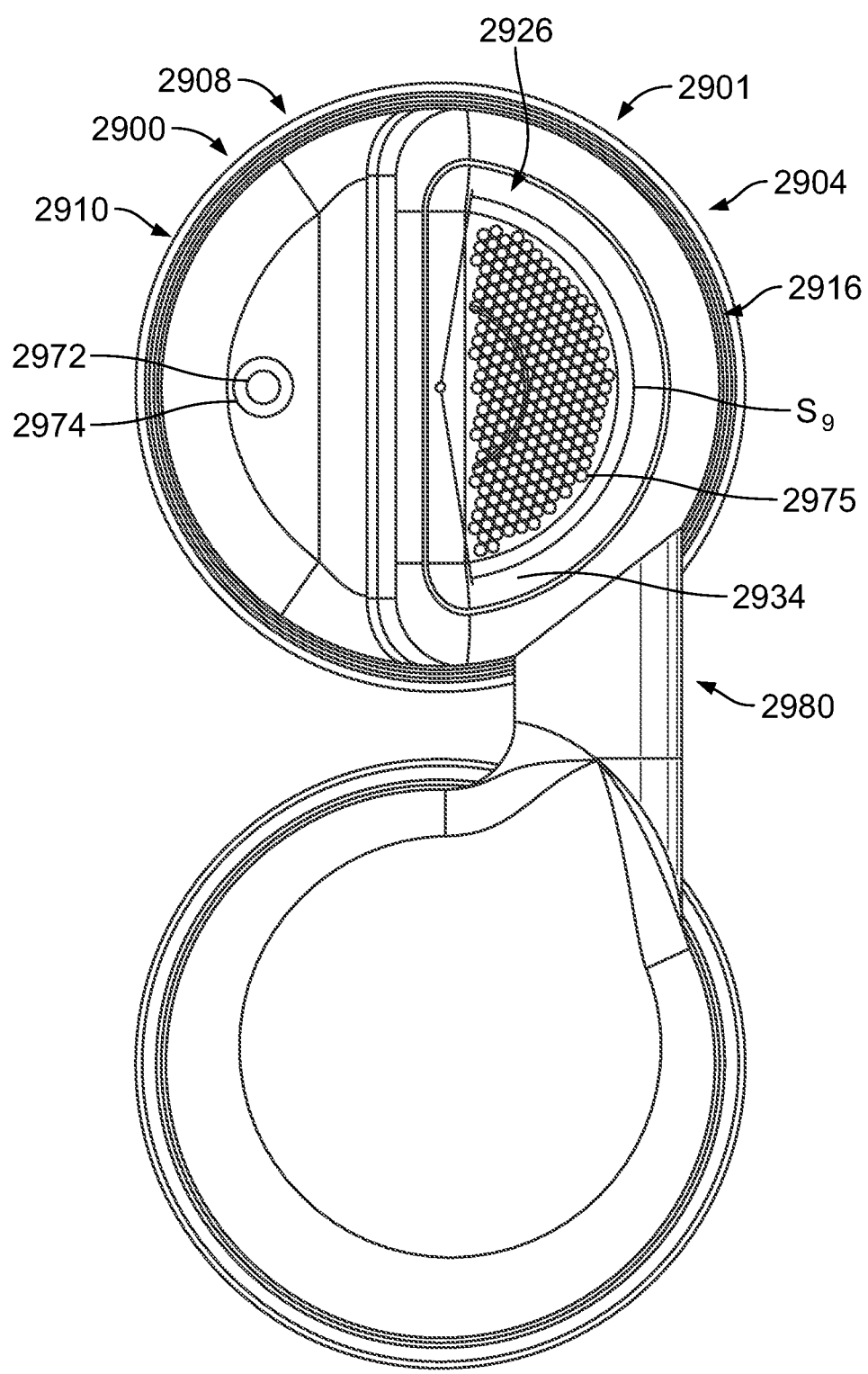
FIG. 35 is a rear view of the reductant delivery system shown in FIG. 31, taken along plane Q-Q.
Figure 36:
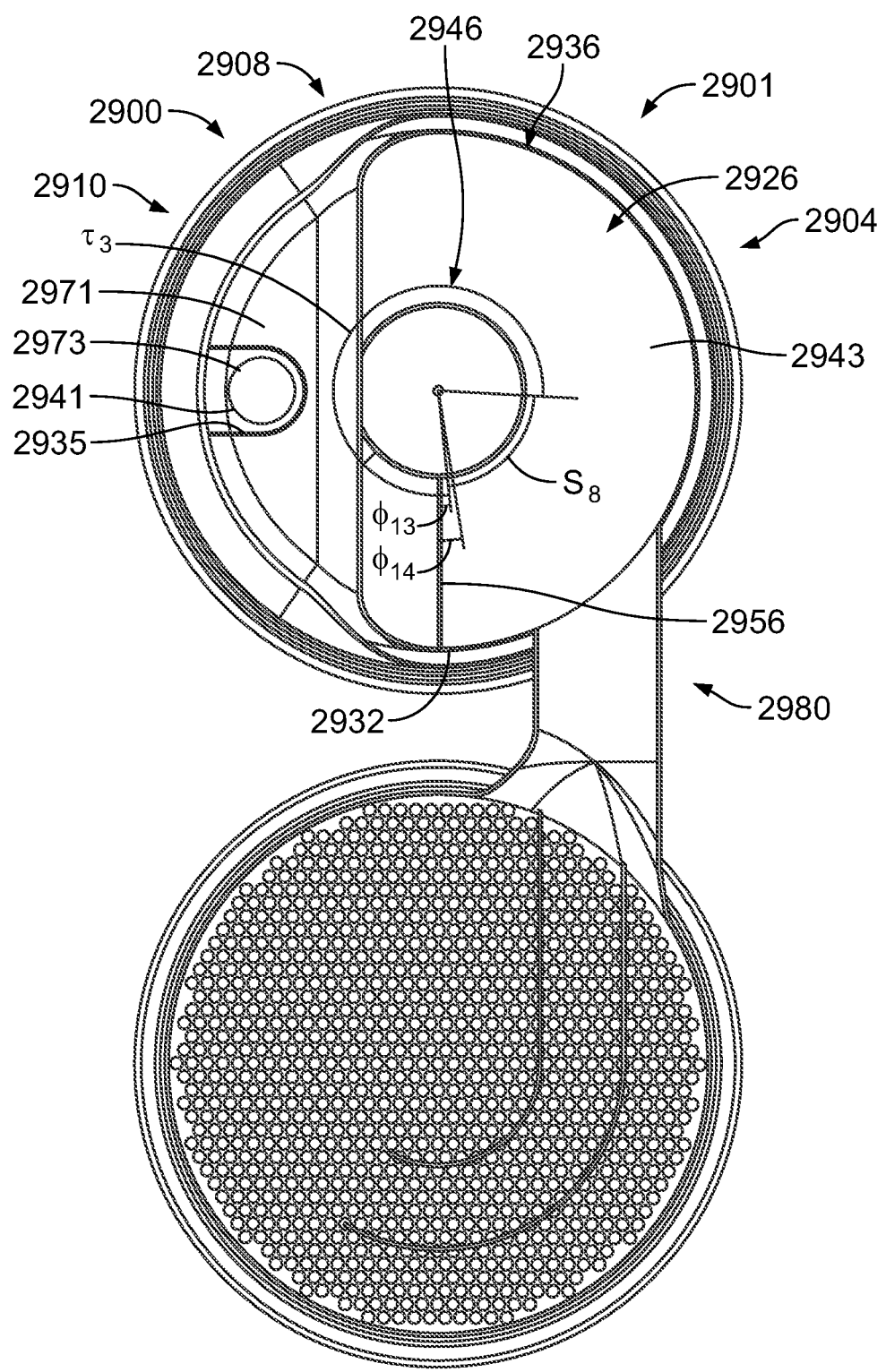
FIG. 36 is a rear view of the reductant delivery system shown in FIG. 31, taken along plane R-R.
Figure 37:
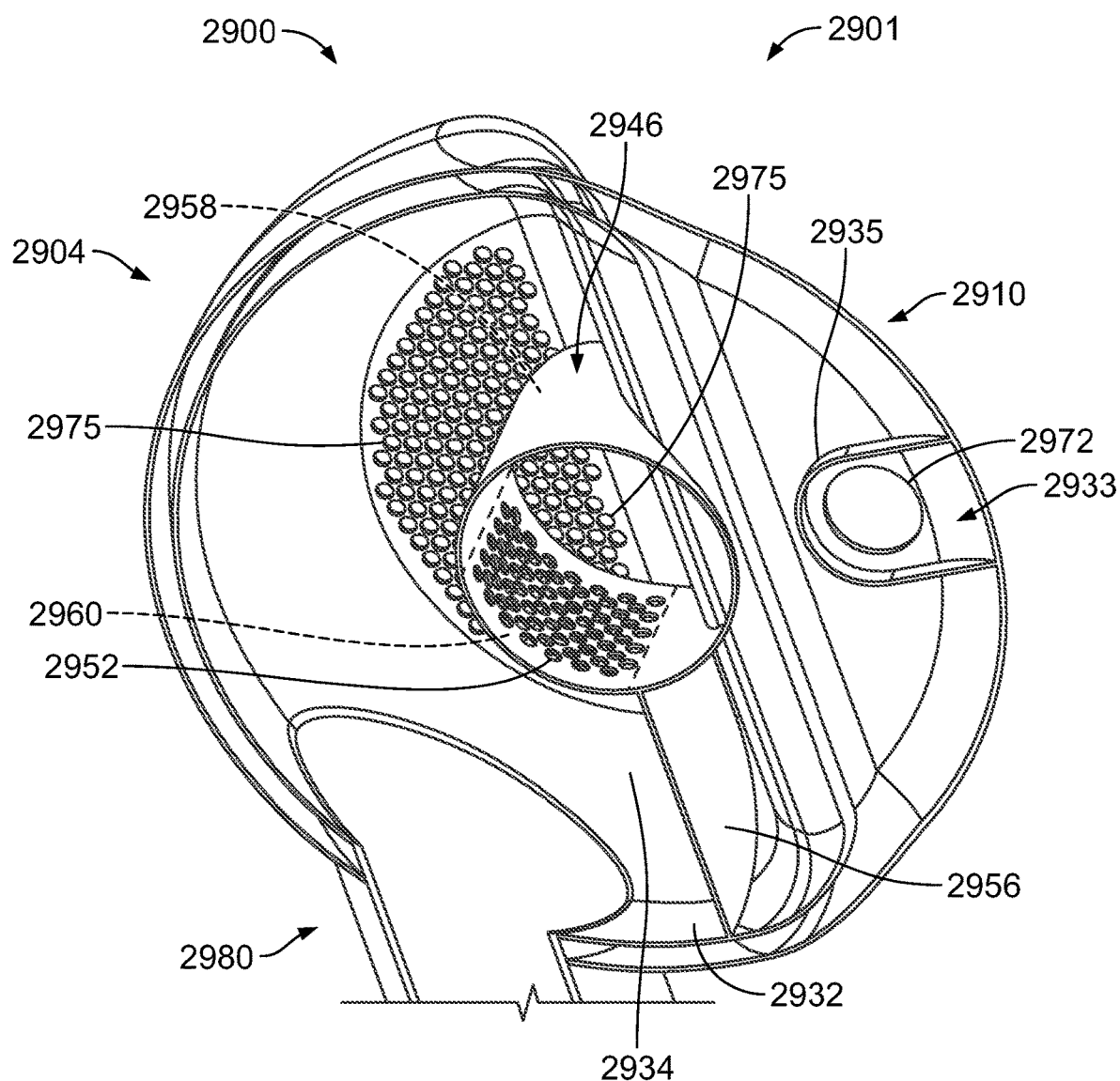
FIG. 37 is a portion of a rear view of the reductant delivery system shown in FIG. 31, taken along plane S-S.

The inlet body 2904 also includes a distributor tube 2946. The distributor tube 2946 may be cylindrical, a triangular prism, a square prism, a rectangular prism, or otherwise similarly shaped. The distributor tube 2946 includes a distributor tube first end 2948 that is coupled to the dividing plate panel 2943 around the dividing plate opening 2944. As shown in FIG. 34, a diameter of the distributor tube first end 2948 may be larger than a diameter of the dividing plate opening 2944. The distributor tube first end 2948 is configured to receive the exhaust gas from the dividing plate opening 2944. The distributor tube 2946 also includes a distributor tube second end 2950 that is coupled to the inlet body inner shell endcap surface 2934. The exhaust gas received by the distributor tube first end 2948 is passed within the distributor tube 2946 towards the distributor tube second end 2950.

The distributor tube 2946 also includes a plurality of distributor tube apertures 2952 (e.g., perforations, openings, holes, etc.). Each of the distributor tube apertures 2952 is configured to facilitate passage of the exhaust gas from the distributor tube 2946 out of the distributor tube 2946. After exiting the distributor tube 2946, the exhaust gas flows between the dividing plate 2936, the distributor tube 2946, the inlet body inner shell wall 2932, and the inlet body inner shell endcap surface 2934. In various embodiments, at least some of the distributor tube apertures 2952 are located closer to the distributor tube second end 2950 than to the distributor tube first end 2948. In some embodiments, at least a majority (e.g., more than half, all, etc.) of the distributor tube apertures 2952 are located closer to the distributor tube second end 2950 than to the distributor tube first end 2948. In various embodiments, a diameter of each of the distributor tube apertures 2952 is between ten times less than a diameter of the dividing plate opening 2944 and fifty times less than a diameter of the dividing plate opening 2944, inclusive. In some embodiments, a diameter of each of the distributor tube apertures 2952 is approximately equal to 6.35 mm and a diameter of the dividing plate opening 2944 is approximately equal to 100 mm.

The dividing plate panel 2943 also includes a dividing plate window 2954 (e.g., opening, aperture, window, etc.). The dividing plate window 2954 is configured to receive the exhaust gas from the inlet body inlet 2906 separate from the dividing plate opening 2944. The dividing plate window 2954 facilitates flow of the exhaust gas through the dividing plate panel 2943 as opposed to around the dividing plate panel 2943. After exiting the dividing plate window 2954, the exhaust gas flows between the dividing plate 2936, the distributor tube 2946, the inlet body inner shell wall 2932, and the inlet body inner shell endcap surface 2934.

In an example embodiment, the dividing plate window 2954 is shaped like a truncated sector of a circle that is centered on the inlet body inlet center point 2942. When measured along the inlet body inlet plane 2940 (e.g., from the inlet body inlet center point 2942, etc.), the dividing plate window 2954 in such an embodiment has a seventh sector angle $S_7$. In various embodiments, the $S_7$ is approximately equal to between 20° and 90°, inclusive (e.g., 19°, 20°, 25°, 37°, 40°, 45°, 50°, 90°, 91°, etc.). The dividing plate window 2954 may be contiguous with the dividing plate opening 2944 and/or the dividing plate coupling surface 2938. Rather than being shaped like a truncated sector of a circle that is centered on the inlet body inlet center point 2942, the dividing plate window 2954 may also be shaped like a truncated sector of a circle that is not centered on the inlet body inlet center point 2942. Additionally, the dividing plate window 2954 may not be shaped like a truncated sector of a circle, and instead may be circular, square, triangular, or otherwise similarly shaped.

The inlet body 2904 also includes a separation panel 2956. The separation panel 2956 is coupled to the dividing plate panel 2943, the distributor tube 2946, the inlet body inner shell wall 2932, and the inlet body inner shell endcap surface 2934. In various embodiments, the separation panel 2956 is coupled to the dividing plate panel 2943 along the dividing plate window 2954. The separation panel 2956 functions to ensure that exhaust gas flowing between the dividing plate panel 2943, the distributor tube 2946, the inlet body inner shell wall 2932, and the inlet body inner shell endcap surface 2934 either must flow through the distributor tube 2946 via the distributor tube apertures 2952 or around the distributor tube 2946 via the dividing plate window 2954.

The distributor tube 2946 includes a distributor tube panel portion 2958 and a distributor tube transfer portion 2960, each extending between the distributor tube first end 2948 and the distributor tube second end 2950. None of the distributor tube apertures 2952 are located on the distributor tube panel portion 2958 (e.g., the distributor tube apertures 2952 are not located on the distributor tube panel portion 2958). Instead, all of the distributor tube apertures 2952 are located on the distributor tube transfer portion 2960. As a result, the exhaust gas cannot pass through the distributor tube panel portion 2958. When measured along the inlet body inlet plane 2940 (e.g., from the inlet body inlet center point 2942, etc.), the distributor tube panel portion 2958 is disposed along an arc having a third central angle $\Sigma_3$. As a result, the distributor tube transfer portion 2960 is disposed along an arc having a central angle equal to 360°−$\tau_3$. In various embodiments, the $\tau_3$ is approximately equal to between 180° and 300°, inclusive (e.g., 180°, 190°, 200°, 210°, 250°, 270°, 280°, 290°, 300°, 301°, etc.). In some embodiments, the $\tau_3$ is equal to or greater than the $S_7$, and the distributor tube panel portion 2958 and/or the dividing plate window 2954 are positioned such that, when viewed along the inlet body inlet plane 2940, only the distributor tube panel portion 2958 is contained within a sector of a circle that is centered on the inlet body inlet center point 2942 having a diameter equal to the diameter of the distributor tube 2946, where the sector has a sector angle equal to the $S_7$ (e.g., the distributor tube transfer portion 2960 is not contained within the sector).

The distributor tube apertures 2952 are separated from the separation panel 2956 by a thirteenth separation angle $\varphi_{13}$ along a plane parallel to the inlet body inlet plane 2940. In various embodiments, the $\varphi_{13}$ is greater than 5°. When measured along the inlet body inlet plane 2940 (e.g., from the inlet body inlet center point 2942, etc.), the distributor tube apertures 2952 are distributed within an eighth sector angle $S_8$. In various embodiments, the $S_8$ is approximately equal to between 40° and 100°, inclusive (e.g., 39°, 40°, 45°, 50°, 90°, 95°, 100°, 101°, etc.).

The inlet body inlet 2906 is bisected by a reductant delivery system body bisecting plane 2962. The reductant delivery system body bisecting plane 2962 bisects the reductant delivery system body 2901 and intersects the inlet body inlet center point 2942.

The inlet body inner shell 2926 also includes an inlet body inner shell dividing surface 2963 (e.g., face, panel, etc.). The inlet body inner shell dividing surface 2963 is contiguous with the inlet body inner shell wall 2932. The inlet body inner shell dividing surface 2963 is disposed along a plane that is approximately parallel to the inlet body inlet plane 2940 and separated from the inlet body inlet plane 2940 a thirteenth distance $D_{13}$. In various embodiments, the $D_{13}$ is greater than the $D_{12}$.

The inlet body outer mounting shell 2910 also includes an inlet body outer mounting shell dividing surface 2964 (e.g., face, panel, etc.). The inlet body outer mounting shell dividing surface 2964 is contiguous with the inlet body outer mounting shell inner surface 2928. The inlet body outer mounting shell dividing surface 2964 is disposed along a plane that is approximately parallel to the inlet body inlet plane 2940 and separated from the inlet body inlet plane 2940 a fourteenth distance $D_{14}$. The $D_{14}$ is greater than the $D_{13}$ and the inlet body outer mounting shell dividing surface 2964 is spaced apart (e.g., separated, etc.) from the inlet body inner shell dividing surface 2963. In various embodiments, the $D_{14}$ is greater than the $D_{12}$.

The inlet body inner shell 2926 also includes an inlet body inner shell projecting surface 2965 (e.g., face, panel, etc.). The inlet body inner shell projecting surface 2965 is contiguous with the inlet body inner shell wall 2932 and the inlet body inner shell dividing surface 2963.

The inlet body outer mounting shell 2910 also includes an inlet body outer mounting shell projecting surface 2966 (e.g., face, panel, etc.). The inlet body outer mounting shell projecting surface 2966 is contiguous with the inlet body outer mounting shell inner surface 2928 and the inlet body outer mounting shell dividing surface 2964. The inlet body outer mounting shell projecting surface 2966 is spaced apart from the inlet body inner shell projecting surface 2965.

The inlet body outer mounting shell 2910 also includes an inlet body outer mounting shell recess 2968 (e.g., depression, etc.). The inlet body outer mounting shell recess 2968 is opposite the inlet body outer mounting shell dividing surface 2964. The inlet body outer mounting shell recess 2968 includes an inlet body outer mounting shell outer mounting surface 2970 (e.g., face, panel, etc.). The inlet body outer mounting shell outer mounting surface 2970 is opposite the inlet body outer mounting shell dividing surface 2964.

The inlet body inner shell 2926 also includes an inlet body inner shell recess 2967 (e.g., depression, etc.). The inlet body inner shell recess 2967 is opposite the inlet body inner shell dividing surface 2963. The inlet body inner shell recess 2967 includes an inlet body inner shell outer mounting surface 2971 (e.g., face, panel, etc.). The inlet body inner shell outer mounting surface 2971 is opposite the inlet body inner shell dividing surface 2963. The inlet body inner shell outer mounting surface 2971 is spaced apart from the inlet body outer mounting shell outer mounting surface 2970.

The inlet body outer mounting shell 2910 includes an outer injection aperture 2972 (e.g., opening, hole, window, etc.). The outer injection aperture 2972 extends through the inlet body outer mounting shell outer mounting surface 2970 and the inlet body outer mounting shell dividing surface

2964. The outer injection aperture 2972 is configured to receive an injection mount 2974 (e.g., mounting plate, etc.). The injection mount 2974 is configured to be coupled to the dosing module 112 and/or the injector 120 such that the dosing module 112 and/or the injector 120 is positioned to provide reductant into the inlet body outer mounting shell 2910 via the outer injection aperture 2972. The inlet body outer mounting shell outer mounting surface 2970 is generally disposed along a plane and facilitates coupling of the injection mount 2974 at various orientations, thereby accommodating various configurations of the dosing module 112 and/or the injector 120.

The inlet body inner shell 2926 also includes an inner injection aperture 2973. The inner injection aperture 2973 extends through the inlet body inner shell outer mounting surface 2971 and the inlet body inner shell dividing surface 2963. The inner injection aperture 2973 is configured to receive the injection mount 2974 (e.g., mounting plate, etc.). The injection mount 2974 extends between the inlet body outer mounting shell 2910 and the inlet body inner shell 2926. The inlet body inner shell outer mounting surface 2971 is generally disposed along a plane and facilitates coupling of the injection mount 2974 at various orientations, thereby accommodating various configurations of the dosing module 112 and/or the injector 120.

The inlet body inner shell 2926 also includes a plurality of inlet body inner shell apertures 2975 (e.g., perforations, openings, holes, etc.) disposed on the inlet body inner shell endcap surface 2934 around the distributor tube 2946. Each of the inlet body inner shell apertures 2975 is configured to facilitate passage of the exhaust gas from between the inlet body inner shell 2926 and the inlet body outer mounting shell 2910 and/or between the inlet body inner shell 2926 and the inlet body outer transfer shell 2916 into the inlet body inner shell 2926.

The inlet body inner shell apertures 2975 are separated from the separation panel 2956 by a fourteenth separation angle $\varphi_{14}$ along a plane parallel to the inlet body inlet plane 2940. In various embodiments, the $\varphi_{14}$ is greater than 160°. When measured along the inlet body inlet plane 2940 (e.g., from the inlet body inlet center point 2942, etc.), the inlet body inner shell apertures 2975 are distributed within a ninth sector angle $S_9$. In various embodiments, the $S_9$ is approximately equal to between 80° and 180°, inclusive (e.g., 79°, 80°, 90°, 100°, 140°, 145°, 150°, 180°, 181°, etc.).

At least some of the inlet body inner shell apertures 2975 are aligned with at least some of the distributor tube apertures 2952. In various embodiments, at least some of the inlet body inner shell apertures 2975 are located closer to the distributor tube second end 2950 than the inlet body inner shell wall 2932. In various embodiments, a diameter of each of the inlet body inner shell apertures 2975 is between ten times less than a diameter of the dividing plate opening 2944 and fifty times less than a diameter of the dividing plate opening 2944, inclusive. In some embodiments, a diameter of each of the inlet body inner shell apertures 2975 is approximately equal to 6.35 mm.

In various embodiments, the inlet body 2904 also includes a shroud assembly 2933 (e.g., cover, etc.). The shroud assembly 2933 is similar to the shroud assembly 290. The shroud assembly 2933 is disposed along the inlet body outer mounting shell dividing surface 2964 and configured to partially shield the reductant provided through the outer injection aperture 2972 from exhaust gas. The shroud assembly 2933 includes a shroud flange 2935 (e.g., band, etc.). The shroud flange 2935 is similar to the shroud flange 292. The shroud flange 2935 is coupled to the inlet body outer mounting shell dividing surface 2964 around the outer injection aperture 2972. The shroud flange 2935 extends around the inner injection aperture 2973. The shroud assembly 2933 also includes a shroud guide 2937 (e.g., fin, wall, barrier, etc.). The shroud guide 2937 is similar to the shroud guide 295. The shroud guide 2937 may be coupled to the inlet body inner shell 2926 and the shroud flange 2935. A shroud inlet 2939 (e.g., aperture, window, hole, etc.) similar to the shroud inlet 296 may be formed between the shroud flange 2935, the shroud guide 2937, the inlet body inner shell 2926 (e.g., around the inner injection aperture 2973, etc.), and the inlet body outer mounting shell inner surface 2928. The shroud inlet 2939 may receive exhaust gas and provide exhaust gas into the shroud assembly 2933, and therefore around the outer injection aperture 2972. This exhaust gas may assist propulsion of the reductant away from the separation panel 2956 and around the distributor tube 2946. The shroud guide may direct a portion of the exhaust gas flowing between the inlet body inner shell wall 2932 and the inlet body outer mounting shell inner surface 2928 and/or between the inlet body inner shell wall 2932 and the inlet body outer transfer shell inner surface 2928 into the shroud inlet 2939. The shroud assembly may also include a shroud outlet 2941. The shroud outlet 2941 is similar to the shroud outlet 297. The exhaust gas may exit the shroud assembly 2933 via the shroud outlet 2941 (e.g., after the reductant has been provided into the exhaust gas, etc.). The shroud assembly 2933 may also include a shroud plate (e.g., cover, etc.) similar to the shroud plate 294. The shroud plate may be coupled to the shroud flange 2935 and the inlet body inner shell 2926 while not being coupled to the inlet body outer mounting shell 2910.

The inlet body outer transfer shell 2916 includes an inlet body outer transfer shell outlet 2976 (e.g., aperture, opening, etc.). The inlet body outer transfer shell outlet 2976 extends through the inlet body outer transfer shell inner surface 2930 and is adjacent the inlet body inner shell wall 2932. In various embodiments, the inlet body outer transfer shell outlet 2976 is elliptical. In other embodiments, the inlet body outer transfer shell outlet 2976 is circular, square, rectangular, or otherwise similarly shaped.

The inlet body inner shell 2926 also includes an inlet body inner shell outlet 2978 (e.g., aperture, opening, etc.). The inlet body inner shell outlet 2978 extends through the inlet body inner shell wall 2932 and is adjacent the inlet body outer transfer shell outlet 2976. In various embodiments, the inlet body inner shell outlet 2978 and the inlet body outer transfer shell outlet 2976 are concentric (e.g., concentric ellipses, concentric circles, etc.). In various embodiments, the inlet body inner shell outlet 2978 is elliptical. In other embodiments, the inlet body inner shell outlet 2978 is circular, square, rectangular, or otherwise similarly shaped.

The reductant delivery system body 2901 also includes an inner transfer tube 2980 (e.g., conduit, pipe, connector, etc.). The inner transfer tube 2980 is coupled to the inlet body outer transfer shell 2916 around the inlet body outer transfer shell outlet 2976. The inner transfer tube 2980 is centered on an inner transfer tube center axis 2986. The inner transfer tube center axis 2986 extends through the inlet body outer transfer shell outlet 2976 and the inlet body inner shell outlet 2978, and intersects the inlet body inner shell 2926.

The inner transfer tube center axis 2986 is separated from the reductant delivery system body bisecting plane 2962 by a fifteenth separation angle $\varphi_{15}$ along a plane parallel to the inlet body inlet plane 2940. In various embodiments, the $\varphi_{15}$ is 0° such that the inner transfer tube center axis 2986 is parallel to the reductant delivery system body bisecting plane 2962.

The inner transfer tube 2980 is coupled to an outlet body shell 2988 (e.g., body, frame, etc.) of an outlet body 2990 (e.g., shell, frame, assembly, etc.) of the reductant delivery system body 2901. Specifically, the inner transfer tube 2980 is coupled to the outlet body shell 2988 around an outlet body shell inlet 2992 (e.g., aperture, opening, etc.). In various embodiments, the inlet body 2904 is only coupled to the outlet body 2990 through the inner transfer tube 2980. The outlet body shell inlet 2992 extends through an outlet body shell inner surface 2994 (e.g., face, etc.) of the outlet body shell 2988. In various embodiments, the outlet body shell inlet 2992 is elliptical. In other embodiments, the outlet body shell inlet 2992 is circular, square, rectangular, or otherwise similarly shaped.

The relationship between the outlet body shell inlet 2992, the inlet body outer transfer shell outlet 2976, and the inlet body inner shell outlet 2978 causes the reductant delivery system 2900 to be generally B-shaped.

The outlet body 2990 does not include an inner shell similar to the inlet body inner shell 2926, or a dividing plate similar to the dividing plate 2936. However, the outlet body 2990 includes an outlet body outlet 2996 (e.g., opening, aperture, etc.). The outlet body outlet 2996 is configured to provide exhaust gas to the exhaust gas conduit system 104. In some embodiments, the reductant delivery system 2900 is positioned upstream of the SCR catalyst member 108 such that the SCR catalyst member 108 receives exhaust gas from the outlet body outlet 2996.

The outlet body 2990 also includes an outlet body coupler 2998 (e.g., body, etc.). The outlet body coupler 2998 borders the outlet body outlet 2996. The outlet body coupler 2998 is coupled to the exhaust gas conduit system 104 around the outlet body outlet 2996. In various embodiments, the outlet body coupler 2998 is circular.

The outlet body 2990 also includes a perforated plate 3000 (e.g., wall, flange, etc.). The perforated plate 3000 extends across a diameter of the outlet body shell 2988. The perforated plate 3000 includes a perforated plate coupling surface 3002 (e.g., face, etc.). In various embodiments, the perforated plate coupling surface 3002 is disposed along a circle. In other embodiments, the perforated plate coupling surface 3002 is disposed along an ellipse.

The perforated plate 3000 also includes a plurality of perforated plate perforations 3004 (e.g., apertures, openings, holes, etc.). The perforated plate 3000 is coupled to the outlet body shell 2988 such that exhaust gas flowing from the outlet body outlet 2996 first passes through the perforated plate 3000 via one of the perforated plate perforations 3004 (e.g., such that none of the exhaust gas can bypass the perforated plate 3000, etc.).

The outlet body 2990 also includes a first flow guide 3006 and a second flow guide 3008. The first flow guide 3006 and the second flow guide 3008 extend within the outlet body shell 2988 and towards the inner transfer tube 2980. The first flow guide 3006 and the second flow guide 3008 are each coupled to at least one of the outlet body shell inner surface 2994, the perforated plate 3000, or the inner transfer tube 2980.

The first flow guide 3006 includes a first flow guide straight portion 3010 and a first flow guide curved portion 3012. The first flow guide straight portion 3010 is contiguous with the first flow guide curved portion 3012. The first flow guide straight portion 3010 separates the first flow guide curved portion 3012 from the inner transfer tube 2980.

In various embodiments, the first flow guide straight portion 3010 extends within the inner transfer tube 2980 and the outlet body shell 2988 and the first flow guide curved portion 3012 extends only within the outlet body shell 2988 (e.g., the first flow guide curved portion 3012 does not extend into the inner transfer tube 2980, etc.).

The first flow guide straight portion 3010 is centered on a first flow guide center axis 3014. The first flow guide center axis 3014 extends through the outlet body shell inlet 2992 and the inner transfer tube 2980. In various embodiments, the first flow guide center axis 3014 additionally extends through the inlet body outer transfer shell outlet 2976 and the inlet body inner shell outlet 2978, and intersects the inlet body inner shell 2926.

The first flow guide center axis 3014 is separated from the reductant delivery system body bisecting plane 2962 by a sixteenth separation angle $\varphi_{16}$ along a plane parallel to the inlet body inlet plane 2940. In various embodiments, the $\varphi_{16}$ is 0° such that the first flow guide center axis 3014 is parallel to the reductant delivery system body bisecting plane 2962. In some embodiments, the $\varphi_{16}$ is equal to the $\varphi_{15}$ such that the inner transfer tube center axis 2986 and the first flow guide center axis 3014 are parallel.

The first flow guide curved portion 3012 gradually curves from the first flow guide straight portion 3010, towards the reductant delivery system body bisecting plane 2962, and may extend through and past the reductant delivery system body bisecting plane 2962. At least a portion of the first flow guide curved portion 3012 is curved about a first flow guide curved portion center axis 3016. The first flow guide curved portion center axis 3016 extends through the inlet body inlet plane 2940. The first flow guide curved portion 3012 is defined by a fifth arc length $\beta_5$ along a plane that is orthogonal to the first flow guide curved portion center axis 3016 and along which the first flow guide center axis 3014 extends.

The first flow guide 3006 functions to receive the exhaust gas from the inner transfer tube 2980 and gradually cause the exhaust gas to rotate within the outlet body 2990 and upstream of the perforated plate 3000. This rotation enhances mixing of the reductant and the exhaust gas within the outlet body 2990. Additionally, this rotation increases heat transfer to the reductant, thereby increasing decomposition of the reductant and mitigating impingement of reductant on various surfaces of the reductant delivery system 2900. Furthermore, this rotation also decreases a backpressure of the reductant delivery system 2900 because the momentum of the exhaust gas exiting the inner transfer tube 2980 is gradually dissipated during rotation of the exhaust gas within the outlet body 2990 caused by the first flow guide 3006. By selecting the $\varphi_{16}$ and the $\beta_5$, the rotation provided by the first flow guide 3006 can be tailored for a target application.

The second flow guide 3008 includes a second flow guide straight portion 3020 and a second flow guide curved portion 3022. The second flow guide straight portion 3020 is contiguous with the second flow guide curved portion 3022. The second flow guide straight portion 3020 separates the second flow guide curved portion 3022 from the inner transfer tube 2980. In various embodiments, the second flow guide straight portion 3020 extends within the inner transfer tube 2980 and the outlet body shell 2988 and the second flow guide curved portion 3022 extends only within the outlet body shell 2988 (e.g., the second flow guide curved portion 3022 does not extend into the inner transfer tube 2980, etc.).

The second flow guide straight portion 3020 is centered on a second flow guide center axis 3024. The second flow guide center axis 3024 extends through the outlet body shell inlet 2992 and the inner transfer tube 2980. In various embodiments, the second flow guide center axis 3024 additionally extends through the inlet body outer transfer shell outlet 2976 and the inlet body inner shell outlet 2978, and intersects the inlet body inner shell 2926.

The second flow guide center axis 3024 is separated from the reductant delivery system body bisecting plane 2962 by a seventeenth separation angle $\varphi_{17}$ along a plane parallel to the inlet body inlet plane 2940. In various embodiments, the $\varphi_{17}$ is 0° such that the second flow guide center axis 3024 is parallel to the reductant delivery system body bisecting plane 2962. In some embodiments, the $\varphi_{17}$ is equal to the (pis such that the inner transfer tube center axis 2986 and the second flow guide center axis 3024 are parallel. In some embodiments, the $\varphi_{17}$ is equal to the $\varphi_{16}$ such that the first flow guide center axis 3014 and the second flow guide center axis 3024 are parallel.

The second flow guide curved portion 3022 gradually curves from the second flow guide straight portion 3020, towards the reductant delivery system body bisecting plane 2962, and may extend through and past the reductant delivery system body bisecting plane 2962. At least a portion of the second flow guide curved portion 3022 is curved about a second flow guide curved portion center axis 3026. The second flow guide curved portion center axis 3026 extends through the inlet body inlet plane 2940. In some embodiments, the second flow guide curved portion center axis 3026 is parallel to the first flow guide curved portion center axis 3016. The second flow guide curved portion 3022 is defined by a sixth arc length $\beta_6$ along a plane that is orthogonal to the second flow guide curved portion center axis 3026 and along which the second flow guide center axis 3024 extends. In some embodiments, the $\beta_6$ is approximately equal to the $\beta_5$.

The second flow guide 3008 functions to receive the exhaust gas from the inner transfer tube 2980 and gradually cause the exhaust gas to rotate within the outlet body 2990 and upstream of the perforated plate 3000. This rotation enhances mixing of the reductant and the exhaust gas within the outlet body 2990. Additionally, this rotation increases heat transfer to the reductant, thereby increasing decomposition of the reductant and mitigating impingement of reductant on various surfaces of the reductant delivery system 2900. Furthermore, this rotation also decreases a backpressure of the reductant delivery system 2900 because the momentum of the exhaust gas exiting the inner transfer tube 2980 is gradually dissipated during rotation of the exhaust gas within the outlet body 2990 caused by the second flow guide 3008. By selecting the $\varphi_{17}$ and the $\beta_6$, the rotation provided by the second flow guide 3008 can be tailored for a target application.

Reductant may impinge upon the first flow guide 3006 and/or the second flow guide 3008. However, because the first flow guide 3006 and the second flow guide 3008 are immersed in exhaust gas (e.g., exhaust gas flows in front of the first flow guide 3006 and behind the first flow guide 3006, exhaust gas flows in front of the second flow guide 3008 and behind the second flow guide 3008), the first flow guide 3006 and the second flow guide 3008 may be heated to a relatively high temperature by the exhaust gas. This heating facilitates decomposition of reductant impinging upon the first flow guide 3006 and/or the second flow guide 3008.

In operation, the exhaust gas flows into the inlet body inlet 2906 (e.g., from the exhaust gas conduit system 104, etc.). As is described herein, the exhaust gas flowing through the reductant delivery system 2900 is variously directed, diverted, and split so as to facilitate enhanced mixing and decomposition of reductant into the exhaust gas and mitigate impingement of reductant on various surfaces of the reductant delivery system 2900. In these ways, the reductant delivery system 2900 can be more desirable than other systems which do not include similar mechanisms for enhancing mixing and decomposition of reductant into the exhaust gas and mitigating impingement of reductant (e.g., due to additional cleaning of reductant deposits in these systems, etc.).

A first portion of the exhaust gas flows through the dividing plate window 2954 and between the dividing plate panel 2943, the separation panel 2956, the distributor tube panel portion 2958, the inlet body inner shell endcap surface 2934, the inlet body inner shell dividing surface 2963, and the inlet body inner shell projecting surface 2965, and subsequently along the inlet body inner shell dividing surface 2963, the inlet body inner shell projecting surface 2965, and/or the inlet body inner shell endcap surface 2934 and around the transfer tube 2946. As the exhaust gas flows around the transfer tube 2946, the exhaust gas is caused to swirl (e.g., about an axis extending through the inlet body inlet center point 2942 and orthogonal to the inlet body inlet plane 2940, etc.). The first portion of the exhaust gas then flows into the inner transfer tube 2980 via the inlet body inner shell outlet 2978.

Prior to flowing into the inner transfer tube 2980, the first portion of the exhaust gas is provided with reductant through the outer injection aperture 2972 and the inner injection aperture 2973. The reductant mixes with the first portion of the exhaust gas and is caused to swirl with the first portion of the exhaust gas around the transfer tube 2946.

An injection assist portion of the first portion of the exhaust gas may flow into a shroud assembly via a shroud inlet (e.g., between a shroud plate, a shroud flange, and an inlet body outer mounting shell projecting surface, etc.). The injection assist portion of the exhaust gas may be provided with reductant via the outer injection aperture 2972 and the inner injection aperture 2973 (e.g., from the injector 120 and/or the dosing module 112). The injection assist portion of the first portion of the exhaust gas may then exit the shroud assembly via the shroud outlet. The injection assist portion of the exhaust gas may aide in propelling the reductant around the transfer tube 2946. Specifically, the shroud assembly may protect the flow of the exhaust gas and reductant away from the inlet body inner shell endcap surface 2934 from the flow of the exhaust gas towards the inlet body inner shell endcap surface 2934, thereby enabling additional reductant to be provided to the inner transfer tube 2980 (e.g., rather than being propelled against the inlet body inner shell endcap surface 2934, etc.). In various embodiments, the injection assist portion may be approximately equal to 5%, 4%, 3%, 2%, or other similar values of the total exhaust flow into the inlet body inlet 2906.

A second portion of the exhaust gas, different from the exhaust gas that flows through the dividing plate window 2954, flows through the dividing plate opening 2944 and into the transfer tube 2946. The second portion of the exhaust gas flows from the transfer tube first end 2948 towards the transfer tube second end 2950. The second portion of the exhaust gas then exits the transfer tube 2946 via the transfer tube apertures 2952 and joins the first portion of the exhaust gas between the dividing plate panel 2943, the separation panel 2956, the distributor tube panel portion 2958, the inlet body inner shell endcap surface 2934, the inlet body inner shell dividing surface 2963, and the inlet body inner shell projecting surface 2965.

By being separated from the dividing plate window 2954, the second portion of the exhaust gas joins the first portion of the exhaust gas after rotation of the first portion of the exhaust gas has already begun. As a result, rotation of the first portion of the exhaust gas is not substantially reduced by the introduction of the second portion of the exhaust gas into the first portion of the exhaust gas. Furthermore, at least some of the transfer tube apertures 2952 may be aligned with the inlet body inner shell outlet 2978. As a result, the second portion of the exhaust gas exiting these transfer tube apertures 2952 may propel the exhaust gas towards the inlet body inner shell outlet 2978. The locations of the transfer tube apertures 2952 are selected so that the exhaust gas exiting each transfer tube aperture 2952 does not substantially alter the swirl of the exhaust gas about the transfer tube 2946. Additionally, the exhaust gas that flows within the transfer tube 2946 is relatively hot (e.g., compared to exhaust gas that has been mixed with reductant, etc.). As a result, impingement of reductant on the transfer tube 2946 is mitigated.

A third portion of the exhaust gas, different from the exhaust gas that flows through the dividing plate window 2954 or the exhaust gas that flows through the dividing plate opening 2944, flows between the inlet body outer mounting shell inner surface 2928 and the inlet body inner shell wall 2932 (e.g., between the inlet body outer mounting shell 2910 and the inlet body inner shell 2926, etc.) and between the inlet body outer transfer shell inner surface 2930 and the inlet body inner shell wall 2932 (e.g., between the inlet body outer transfer shell 2916 and the inlet body inner shell 2926, etc.). The exhaust gas creates a flow along the inlet body inner shell wall 2932 that mitigates impingement of reductant on the inlet body inner shell wall 2932 (e.g., due to heating of the inlet body inner shell wall 2932 by relatively hot exhaust gas, etc.).

Some of the third portion of the exhaust gas flows through the inlet body inner shell apertures 2975 and into the inlet body inner shell 2926 or through the inlet body inner shell apertures 2975 and into the transfer tube 2946. Specifically, some of the inlet body inner shell apertures 2975 are bordered (e.g., circumscribed, enclosed, etc.) by the transfer tube 2946 and others of the inlet body inner shell apertures 2975 partially border (e.g., circumscribe, border, etc.) the transfer tube 2946. In various embodiments, at least some of the inlet body inner shell apertures 2975 are aligned with at least some of the transfer tube apertures 2952 (e.g., a center axis of an inlet body inner shell aperture 2975 extends across a transfer tube aperture 2952 when viewed on a plane along which the transfer tube aperture 2952 is disposed, a center axis of a transfer tube aperture 2952 extends across an inlet body inner shell aperture 2975 when viewed on a plane along which the inlet body inner shell aperture 2975 is disposed, etc.). As a result, exhaust gas flowing from the aligned inlet body inner shell aperture 2975 and exhaust gas flowing from the transfer tube aperture 2952 mix and may be cooperatively directed towards the inlet body inner shell outlet 2983. As a result, a backpressure of the reductant delivery system 2900 may be reduced. The exhaust gas that flows through the inlet body inner shell apertures 2975 and into the transfer tube 2946 aids the transfer tube 2946 in directing exhaust gas into the transfer tube apertures 2952. As a result, a backpressure of the reductant delivery system 2900 may be reduced. Additionally, the exhaust gas flowing through all of the inlet body inner shell apertures 2975 is relatively hot (e.g., compared to exhaust gas that has been mixed with reductant, etc.). As a result, impingement of reductant on the inlet body inner shell wall 2932 and/or the inlet body inner shell endcap surface 2934 is mitigated.

Some of the exhaust gas flowing between the inlet body outer mounting shell inner surface 2928 and the inlet body inner shell wall 2932 may be directed into a shroud inlet by a shroud guide.

The exhaust gas flowing within the inner transfer tube 2980 flows into the outlet body shell 2988. The exhaust gas flowing within the outlet body shell 2988 may flow along the outlet body shell inner surface 2994 so as to cause the exhaust gas to swirl. This swirl may be enhanced by the $\varphi_{15}$ which effectively causes the exhaust gas to flow into the outlet body shell 2988 semi-tangentially (e.g., as opposed to axially, as opposed to radially, etc.).

A first portion of the exhaust gas flowing out of the inner transfer tube 2980 flows between the first flow guide straight portion 3010 and the inner transfer tube 2980 and/or the outlet body shell inner surface 2994. This portion of the exhaust gas enters the outlet body shell 2988 semi-tangentially due to the $\varphi_{16}$ and is guided along the first flow guide straight portion 3010 to the first flow guide curved portion 3012. The first flow guide curved portion 3012 causes this portion of the exhaust gas to subsequently swirl within the outlet body shell 2988.

A second portion of the exhaust gas flowing out of the inner transfer tube 2980 flows between the first flow guide straight portion 3010 and the second flow guide straight portion 3020. This portion of the exhaust gas enters the outlet body shell 2988 semi-tangentially due to the $\varphi_{17}$ and is guided along the second flow guide straight portion 3020 to the second flow guide curved portion 3022. The second flow guide curved portion 3022 causes this portion of the exhaust gas to subsequently swirl within the outlet body shell 2988.

The exhaust gas flowing within the outlet body shell 2988 then flows through the perforated plate 3000 and exits the outlet body 2990 via the outlet body outlet 2996. By flowing through the perforated plate 3000, the flow of the exhaust gas may be straightened, thereby enhancing the uniformity of the exhaust gas that flows towards components of the exhaust gas aftertreatment system 100 (e.g., the SCR catalyst member 108, etc.) that are downstream of the reductant delivery system 2900.

The inlet body outer mounting shell 2910 may also include an inlet body outer mounting shell first sensor coupling mount (e.g., projection, etc.). The inlet body outer mounting shell first sensor coupling mount may extend (e.g., projects, protrudes, etc.) from an outer surface of the inlet body outer mounting shell 2910. The inlet body outer mounting shell first sensor coupling mount may be located upstream of the outer injection aperture 2972. As a result, a sensor coupled to the inlet body outer mounting shell first sensor coupling mount may be subjected to a relatively high flow rate of the exhaust gas and may be substantially isolated from reductant, thereby enabling accurate measurements to be obtained by the sensor (e.g., because the sensor is not covered in reductant deposits, etc.). In other embodiments, the inlet body outer mounting shell first sensor coupling mount may be located in other locations.

The reductant delivery system 2900 may also include an inlet body outer mounting shell temperature sensor coupling. The inlet body outer mounting shell temperature sensor coupling may be coupled to the inlet body outer mounting shell first sensor coupling mount and configured to be coupled to the upstream temperature sensor 138. The inlet body outer mounting shell first sensor coupling mount may be configured to provide exhaust gas to the upstream temperature sensor 138 and/or to receive the upstream temperature sensor 138 such that the upstream temperature sensor 138 extends into the inlet body outer mounting shell 2910. The upstream temperature sensor 138 may determine a temperature of the exhaust gas prior to the exhaust gas flowing into the inner transfer tube 2980.

The inlet body outer mounting shell 2910 may also include an inlet body outer mounting shell second sensor coupling mount (e.g., projection, etc.). The inlet body outer mounting shell second sensor coupling mount may extend (e.g., projects, protrudes, etc.) from an outer surface of the inlet body outer mounting shell 2910. The inlet body outer mounting shell second sensor coupling mount may be centered on an axis that extends through the inlet body inlet 2906 (e.g., orthogonally to the inlet body inlet plane 2940, etc.). The reductant delivery system 2900 may also include an inlet body outer mounting shell pressure sensor coupling. The inlet body outer mounting shell pressure sensor coupling may be coupled to the inlet body outer mounting shell second sensor coupling mount and configured to be coupled to the pressure sensor 140. The inlet body outer mounting shell second sensor coupling mount may be configured to provide exhaust gas to the pressure sensor 140 and/or to receive the pressure sensor 140 such that the pressure sensor 140 extends into the inlet body outer mounting shell 2910. The pressure sensor 140 may determine a pressure of the exhaust gas prior to the exhaust gas flowing into the inner transfer tube 2980.

The outlet body shell 2988 may also include an outlet body shell sensor coupling mount (e.g., projection, etc.). The outlet body shell sensor coupling mount may extend from an outer surface of the outlet body shell 2988. The outlet body shell sensor coupling mount may be centered on an axis that extends across the outlet body shell 2988. The outlet body shell sensor coupling mount may be located such that the outlet body shell sensor coupling mount is opposite a target location on the outlet body shell inner surface 2994 (e.g., depending on an application of the reductant delivery system 2900, depending on space claim requirements for the reductant delivery system 2900, etc.).

The reductant delivery system 2900 may also include an outlet body shell temperature sensor coupling. The outlet body shell temperature sensor coupling may be coupled to the outlet body shell sensor coupling mount and configured to be coupled to the downstream temperature sensor 142. The outlet body shell temperature sensor coupling may be configured to provide exhaust gas to the downstream temperature sensor 142 and/or to receive the downstream temperature sensor 142 such that the downstream temperature sensor 142 extends into the outlet body shell 2988. The downstream temperature sensor 142 may determine a temperature of the exhaust gas after the exhaust gas flows into the outlet body shell (e.g., via the inner transfer tube 2980, etc.).

Rather than the inlet body outer mounting shell 2910 and the inlet body outer transfer shell 2916 being separate components that are coupled together, it is understood that the inlet body outer mounting shell 2910 and the inlet body outer transfer shell 2916 may also be structurally integrated (e.g., formed from a one-piece construction, etc.), in some embodiments.

VII. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, exhaust gas, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. A reductant delivery system comprising:
an inlet body comprising:
an inlet body coupler surrounding an inlet body inlet that is configured to receive exhaust gas;
an inlet body outer transfer shell coupled to the inlet body coupler, the inlet body outer transfer shell comprising:
an inlet body outer transfer shell inner surface, and
an inlet body outer transfer shell outlet extending through the inlet body outer transfer shell inner surface;
an inlet body outer mounting shell coupled to the inlet body coupler and the inlet body outer transfer shell, the inlet body outer mounting shell and the inlet body outer transfer shell defining an inlet body cavity, the inlet body outer mounting shell comprising an inlet body outer mounting shell inner surface; and
an inlet body inner shell, an entirety of which is contained within the inlet body cavity, the inlet body inner shell comprising:
an inlet body inner shell first flange coupled to the inlet body outer mounting shell inner surface,
an inlet body inner shell second flange coupled to the inlet body outer mounting shell inner surface, and
an inlet body inner shell wall contiguous with the inlet body inner shell first flange and the inlet body inner shell second flange, and separated from the inlet body outer transfer shell inner surface;
an outlet body comprising:
an outlet body coupler surrounding an outlet body outlet that is configured to provide the exhaust gas, and
an outlet body shell coupled to the outlet body coupler, the outlet body shell comprising an outlet body shell inlet; and
an outer transfer tube coupled to the inlet body outer transfer shell around the inlet body outer transfer shell outlet and coupled to the outlet body shell around the outlet body shell inlet.

2. The reductant delivery system of claim 1, further comprising:
an inner transfer tube positioned within and spaced apart from the outer transfer tube;
wherein the inlet body inner shell comprises an inlet body inner shell outlet extending through the inlet body inner shell wall; and
wherein the inner transfer tube is coupled to the inlet body inner shell wall around the inlet body inner shell outlet.

3. The reductant delivery system of claim 1, further comprising:
a dividing plate comprising:
a dividing plate coupling surface coupled to the inlet body inner shell wall; and
a dividing plate panel contiguous with the dividing plate coupling surface.

4. The reductant delivery system of claim 3, further comprising:
a diverter comprising:
a diverter base coupled to the dividing plate panel and the inlet body inner shell wall,
a diverter end contiguous with the diverter base and coupled to the dividing plate panel, and
a plurality of diverter end apertures disposed in the diverter end;
wherein the inlet body inner shell further comprises an inlet body inner shell endcap that is contiguous with the inlet body inner shell wall;
wherein the diverter base is coupled to the inlet body inner shell endcap; and
wherein the diverter end is coupled to the inlet body inner shell endcap.

5. The reductant delivery system of claim 1, wherein the inlet body outer mounting shell further comprises:
an inlet body outer mounting shell dividing surface contiguous with the inlet body outer mounting shell inner surface and extending from the inlet body outer mounting shell inner surface towards the inlet body inner shell,
an inlet body outer mounting shell projecting surface contiguous with the inlet body outer mounting shell dividing surface and the inlet body outer mounting shell inner surface, and
an injection aperture disposed in the inlet body outer mounting shell projecting surface and extending through the inlet body outer mounting shell.

6. The reductant delivery system of claim 5, further comprising:
a shroud assembly comprising:
a shroud flange coupled to the inlet body outer mounting shell projecting surface partially around the injection aperture, and
a shroud plate coupled to the shroud flange;
wherein a shroud inlet is defined between the shroud flange, the shroud plate, and at least one of the inlet body outer mounting shell inner surface or the inlet body outer mounting shell projecting surface; and
wherein a shroud outlet is defined between the shroud flange and the shroud plate, the shroud outlet located over the injection aperture.

7. The reductant delivery system of claim 5, further comprising:
a dosing module configured to receive reductant; and
an injection mount coupled to the dosing module;
wherein the inlet body outer mounting shell further comprises an inlet body outer mounting shell outer mounting surface opposite the inlet body outer mounting shell projecting surface;
wherein the injection aperture is disposed in the inlet body outer mounting shell outer mounting surface and extends through the inlet body outer mounting shell outer mounting surface; and
wherein the injection mount is coupled to the inlet body outer mounting shell outer mounting surface around the injection aperture.

8. A reductant delivery system comprising:
an inlet body comprising:
an inlet body coupler surrounding an inlet body inlet that is configured to receive exhaust gas,
an inlet body outer transfer shell coupled to the inlet body coupler, the inlet body outer transfer shell comprising:
an inlet body outer transfer shell inner surface, and
an inlet body outer transfer shell outlet extending through the inlet body outer transfer shell inner surface,
an inlet body inner shell comprising:
an inlet body inner shell first flange,
an inlet body inner shell second flange, and
an inlet body inner shell wall contiguous with the inlet body inner shell first flange and the inlet body inner shell second flange, and separated from the inlet body outer transfer shell inner surface, and
an inlet body outer mounting shell coupled to the inlet body coupler and the inlet body outer transfer shell, the inlet body outer mounting shell and the inlet body outer transfer shell defining an inlet body cavity, the inlet body outer mounting shell comprising:
an inlet body outer mounting shell inner surface,
an inlet body outer mounting shell dividing surface contiguous with the inlet body outer mounting shell inner surface and extending from the inlet body outer mounting shell inner surface towards the inlet body inner shell,
an inlet body outer mounting shell projecting surface contiguous with the inlet body outer mounting shell dividing surface and the inlet body outer mounting shell inner surface,
an inlet body outer mounting shell outer mounting surface opposite the inlet body outer mounting shell projecting surface, and
an injection aperture disposed in the inlet body outer mounting shell projecting surface and the inlet body outer mounting shell outer mounting surface and extending through the inlet body outer mounting shell and the inlet body outer mounting shell outer mounting surface; and
an injection mount coupled to the inlet body outer mounting shell outer mounting surface around the injection aperture and configured to be coupled to a dosing module;
wherein an entirety of the inlet body inner shell is contained within the inlet body cavity; wherein the inlet body inner shell first flange is coupled to or in contact with the inlet body outer mounting shell inner surface; and
wherein the inlet body inner shell second flange is coupled to or in contact with the inlet body outer mounting shell inner surface.

9. The reductant delivery system of claim 8, further comprising a dividing plate comprising:
a dividing plate coupling surface coupled to the inlet body inner shell wall, and
a dividing plate panel contiguous with the dividing plate coupling surface.

10. The reductant delivery system of claim 9, further comprising:
a diverter comprising:
a diverter base coupled to the dividing plate panel and the inlet body inner shell wall,
a diverter end contiguous with the diverter base and coupled to the dividing plate panel, and
a plurality of diverter end apertures disposed in the diverter end;
wherein the inlet body inner shell further comprises an inlet body inner shell endcap that is contiguous with the inlet body inner shell wall;
wherein the diverter base is coupled to the inlet body inner shell endcap; and
wherein the diverter end is coupled to the inlet body inner shell endcap.

11. The reductant delivery system of claim 9, further comprising:
a shroud assembly comprising:
a shroud flange coupled to the inlet body outer mounting shell projecting surface partially around the injection aperture, and
a shroud plate coupled to the shroud flange;
wherein a shroud inlet is defined between the shroud flange, the shroud plate, and at least one of the inlet body outer mounting shell inner surface or the inlet body outer mounting shell projecting surface; and
wherein a shroud outlet is defined between the shroud flange and the shroud plate, the shroud outlet located over the injection aperture.

12. A reductant delivery system comprising:
an inlet body comprising:
an inlet body coupler surrounding an inlet body inlet that is configured to receive exhaust gas and that is defined by an inlet body inlet center point,
an inlet body outer transfer shell coupled to the inlet body coupler, the inlet body outer transfer shell comprising:
an inlet body outer transfer shell inner surface, and
an inlet body outer transfer shell outlet extending through the inlet body outer transfer shell inner surface; and
an inlet body outer mounting shell coupled to the inlet body coupler and the inlet body outer transfer shell, the inlet body outer mounting shell and the inlet body outer transfer shell defining an inlet body cavity, the inlet body outer mounting shell comprising:
an inlet body outer mounting shell inner surface,
an inlet body outer mounting shell dividing surface contiguous with the inlet body outer mounting shell inner surface and extending from the inlet body outer mounting shell inner surface towards the inlet body inlet center point,
an inlet body outer mounting shell projecting surface contiguous with the inlet body outer mounting shell dividing surface and the inlet body outer mounting shell inner surface,
an inlet body outer mounting shell outer mounting surface opposite the inlet body outer mounting shell projecting surface, and
an injection aperture disposed in the inlet body outer mounting shell projecting surface and the inlet body outer mounting shell outer mounting surface and extending through the inlet body outer mounting shell and the inlet body outer mounting shell outer mounting surface;
an outlet body comprising:
an outlet body coupler surrounding an outlet body outlet that is configured to provide the exhaust gas, and an outlet body shell coupled to the outlet body coupler, the outlet body shell comprising an outlet body shell inlet;

an outer transfer tube coupled to the inlet body outer transfer shell around the inlet body outer transfer shell outlet and coupled to the outlet body shell around the outlet body shell inlet;

an inlet body inner shell, an entirety of which is contained within the inlet body cavity, the inlet body inner shell comprising:

an inlet body inner shell first flange coupled to or in contact with the inlet body outer mounting shell inner surface, an inlet body inner shell second flange coupled to or in contact with the inlet body outer mounting shell inner surface, and an inlet body inner shell wall contiguous with the inlet body inner shell first flange and the inlet body inner shell second flange, and separated from the inlet body outer transfer shell inner surface; and an injection mount coupled to the inlet body outer mounting shell outer mounting surface around the injection aperture and configured to be coupled to a dosing module.

13. The reductant delivery system of claim 12, further comprising:

a shroud assembly comprising:

a shroud flange coupled to the inlet body outer mounting shell projecting surface partially around the injection aperture, and a shroud plate coupled to the shroud flange;

wherein a shroud inlet is defined between the shroud flange, the shroud plate, and at least one of the inlet body outer mounting shell inner surface or the inlet body outer mounting shell projecting surface; and wherein a shroud outlet is defined between the shroud flange and the shroud plate, the shroud outlet located over the injection aperture.

14. The reductant delivery system of claim 12, further comprising a dosing module configured to receive reductant, the dosing module coupled to the injection mount.

15. The reductant delivery system of claim 12, wherein:

the inlet body inlet is disposed along an inlet body inlet plane;

the inlet body, the outlet body, and the outer transfer tube are bisected by a reductant delivery system body bisecting plane that is orthogonal to the inlet body inlet plane and intersects the inlet body inlet center point;

the outer transfer tube comprises:

an outer transfer tube curved portion coupled to the inlet body outer transfer shell, and an outer transfer tube straight portion contiguous with the outer transfer tube curved portion and coupled to the outlet body shell;

the outer transfer tube straight portion is centered on an outer transfer tube center axis; and the outer transfer tube center axis is angularly separated from the reductant delivery system body bisecting plane by between 20 degrees and 60 degrees, inclusive, when measured along the inlet body inlet plane.

16. The reductant delivery system of claim 12, wherein the inlet body is coupled to the outlet body only through the outer transfer tube.

17. The reductant delivery system of claim 12, further comprising a dividing plate comprising:

a dividing plate coupling surface coupled to the inlet body inner shell wall, and a dividing plate panel contiguous with the dividing plate coupling surface.

18. The reductant delivery system of claim 17, further comprising a diverter comprising:

a diverter base coupled to the dividing plate panel and the inlet body inner shell wall, a diverter end contiguous with the diverter base and coupled to the dividing plate panel, and a plurality of diverter end apertures disposed in the diverter end.

19. The reductant delivery system of claim 18, wherein:

the inlet body inner shell further comprises an inlet body inner shell endcap that is contiguous with the inlet body inner shell wall, the diverter base is coupled to the inlet body inner shell endcap, and the diverter end is coupled to the inlet body inner shell endcap.

* * * * *